AUTOMATIC TOLL TICKETING TELEPHONE SYSTEMS

Original Filed Feb. 11, 1955 22 Sheets-Sheet 1

INVENTOR.
IVAN V. COLEMAN
BY
C. A. Gullbrandsen
ATTY

INVENTOR.
IVAN V. COLEMAN
BY
C. A. Gulbrandsen
ATTY

INVENTOR.
IVAN V. COLEMAN
BY
C. A. Gulbrandsen
ATTY

INVENTOR.
IVAN V. COLEMAN
BY
C. A. Gulbrandsen
ATTY

Nov. 28, 1961 I. V. COLEMAN 3,011,027

AUTOMATIC TOLL TICKETING TELEPHONE SYSTEMS

Original Filed Feb. 11, 1955 22 Sheets-Sheet 5

INVENTOR.
IVAN V. COLEMAN
BY
C. A. Gulbrandsen
ATTY

Nov. 28, 1961 I. V. COLEMAN 3,011,027

AUTOMATIC TOLL TICKETING TELEPHONE SYSTEMS

Original Filed Feb. 11, 1955 22 Sheets-Sheet 6

INVENTOR.
IVAN V. COLEMAN

BY C. A. Gulbrandsen

ATTY

Nov. 28, 1961 I. V. COLEMAN 3,011,027

AUTOMATIC TOLL TICKETING TELEPHONE SYSTEMS

Original Filed Feb. 11, 1955 22 Sheets-Sheet 7

INVENTOR.
IVAN V. COLEMAN
BY
C. A. Gulbrandsen
ATTY

Nov. 28, 1961 I. V. COLEMAN 3,011,027

AUTOMATIC TOLL TICKETING TELEPHONE SYSTEMS

Original Filed Feb. 11, 1955

22 Sheets-Sheet 8

INVENTOR.
IVAN V. COLEMAN
BY
C. A. Gulbrandsen
ATTY

AUTOMATIC TOLL TICKETING TELEPHONE SYSTEMS

Original Filed Feb. 11, 1955 22 Sheets-Sheet 9

INVENTOR.
IVAN V. COLEMAN
BY
C. A. Gullbrandsen
ATTY

Nov. 28, 1961 I. V. COLEMAN 3,011,027

AUTOMATIC TOLL TICKETING TELEPHONE SYSTEMS

Original Filed Feb. 11, 1955 22 Sheets-Sheet 10

INVENTOR.
IVAN V. COLEMAN
BY
C. A. Gulbrandsen
ATTY

Nov. 28, 1961 I. V. COLEMAN 3,011,027

AUTOMATIC TOLL TICKETING TELEPHONE SYSTEMS

Original Filed Feb. 11, 1955 22 Sheets-Sheet 11

INVENTOR.
IVAN V. COLEMAN

BY C. A. Gulbrandsen

ATTY

Nov. 28, 1961 I. V. COLEMAN 3,011,027

AUTOMATIC TOLL TICKETING TELEPHONE SYSTEMS

Original Filed Feb. 11, 1955 22 Sheets-Sheet 12

INVENTOR.
IVAN V. COLEMAN
BY
C. A. Gulbrandsen
ATTY

INVENTOR.
IVAN V. COLEMAN
BY
C. A. Gulbrandsen
ATTY

Nov. 28, 1961 I. V. COLEMAN 3,011,027

AUTOMATIC TOLL TICKETING TELEPHONE SYSTEMS

Original Filed Feb. 11, 1955 22 Sheets-Sheet 14

INVENTOR.
IVAN V. COLEMAN
BY C. A. Gulbrandsen
ATTY

INVENTOR.
IVAN V. COLEMAN
BY
C. A. Gulbrandsen
ATTY

Nov. 28, 1961 I. V. COLEMAN 3,011,027

AUTOMATIC TOLL TICKETING TELEPHONE SYSTEMS

Original Filed Feb. 11, 1955 22 Sheets-Sheet 16

INVENTOR.
IVAN V. COLEMAN
BY
C. A. Gulbrandsen
ATTY

Nov. 28, 1961 I. V. COLEMAN 3,011,027

AUTOMATIC TOLL TICKETING TELEPHONE SYSTEMS

Original Filed Feb. 11, 1955

22 Sheets-Sheet 17

INVENTOR.
IVAN V. COLEMAN
BY C. A. Gulbrandsen
ATTY

AUTOMATIC TOLL TICKETING TELEPHONE SYSTEMS

Original Filed Feb. 11, 1955

22 Sheets-Sheet 18

INVENTOR.
IVAN V. COLEMAN
BY
C. A. Gulbrandsen
ATTY

INVENTOR
IVAN V. COLEMAN
BY C. A. Gulbrandsen
ATTY

Nov. 28, 1961 I. V. COLEMAN 3,011,027

AUTOMATIC TOLL TICKETING TELEPHONE SYSTEMS

Original Filed Feb. 11, 1955 22 Sheets-Sheet 20

INVENTOR.
IVAN V. COLEMAN
BY
C. A. Gulbrandsen
ATTY

Nov. 28, 1961 I. V. COLEMAN 3,011,027

AUTOMATIC TOLL TICKETING TELEPHONE SYSTEMS

Original Filed Feb. 11, 1955

22 Sheets-Sheet 21

INVENTOR.
IVAN V. COLEMAN

BY C. A. Gulbrandsen
ATTY

INVENTOR.
IVAN V. COLEMAN
BY
C. A. Gulbrandsen
ATTY

United States Patent Office 3,011,027

Patented Nov. 28, 1961

3,011,027
AUTOMATIC TOLL TICKETING TELEPHONE SYSTEMS

Ivan V. Coleman, Naperville, Ill., assignor to Automatic Electric Laboratories, Inc., a corporation of Delaware Original application Feb. 11, 1955, Ser. No. 487,500. Divided and this application May 18, 1959, Ser. No. 813,742

7 Claims. (Cl. 179—7.1)

Figure 1:
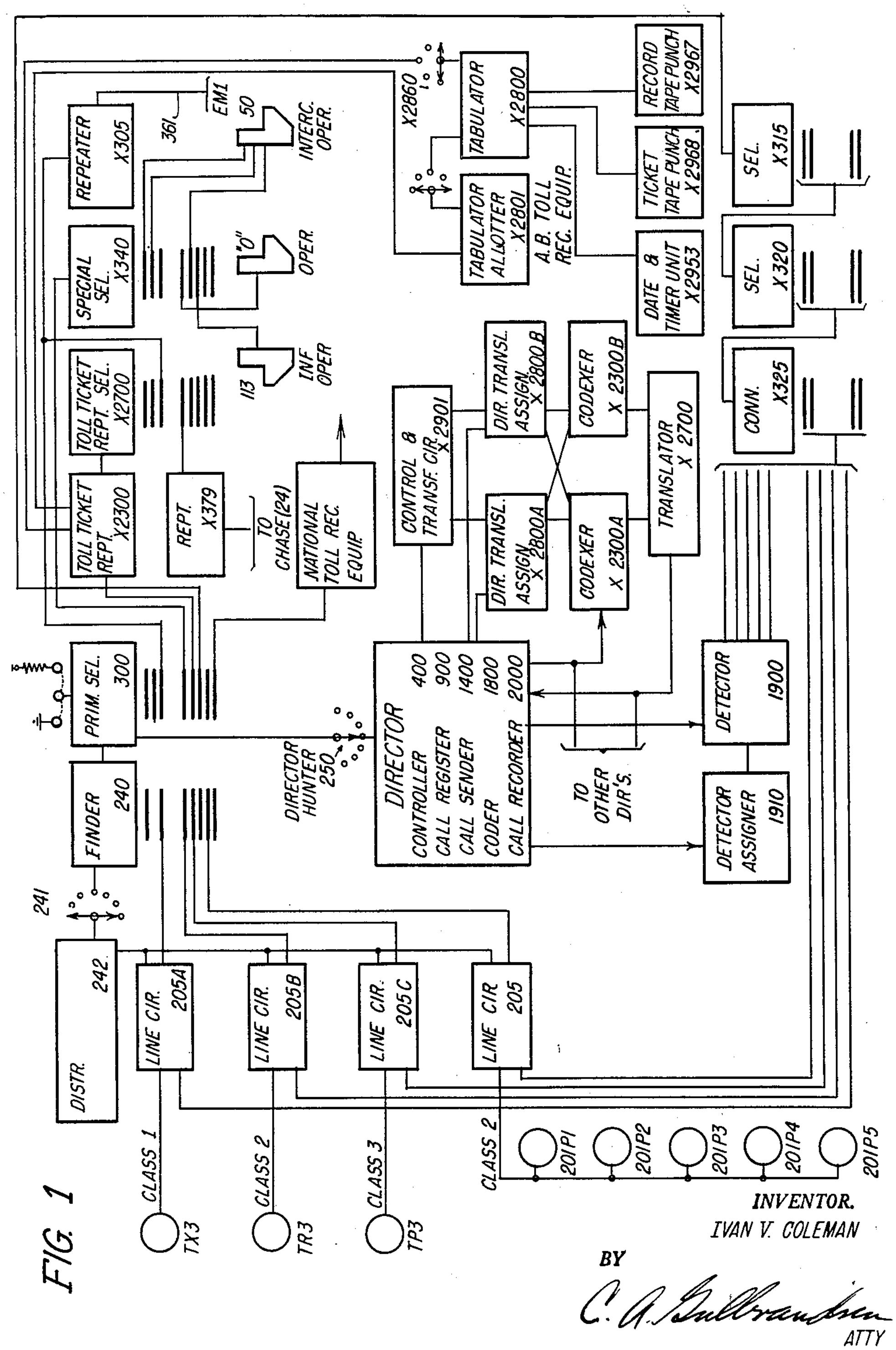

The present invention relates to automatic telephone systems in general and in particular to improvements in automatic toll ticketing telephone systems which are arranged to produce a record of certain of the items of information pertaining to each telephone connection. More particularly, the present invention relates to improvements in automatic toll ticketing telephone systems of the character disclosed in the John E. Ostline Patent No. 2,678,353, granted May 11, 1954.

An automatic toll ticketing telephone system of the type disclosed in the above-mentioned Ostline patent is divided into a plurality of zones and each zone includes one or more telephone exchanges. Telephone connections that are established between the subscribers of the different exchanges in the different zones and between subscribers in the different exchanges in the same zones are handled on a toll basis so the charges for the connections may be assessed against the calling subscriber substation in accordance with the distance between the exchanges and the time duration of the connections. Each telephone connection is established automatically under control of a director or register-sender and a record is produced containing the particulars concerning the connection including the office code digits identifying both the calling and called exchanges, the numerical digits identifying both the calling and the called subscriber lines, and other pertinent particulars including the duration of the connection, the date, and identity of certain of the appartus that has been used in establishing the toll connection. The charge for the call can then be determined either by the toll ticketing equipment utilized in the connection or by means of the conventional business machines which are controlled in accordance with the recorded information.

The telephone connections in the above identified Ostline patent, and also in the present system are automatically completed from a calling subscriber station to a desired called subscriber station under control of a register-sender or director apparatus provided in the originating exchange. In extending a connection, the calling subscriber merely operates his calling device in accordance with the directory number of the desired called subscriber station including the office code portion of the number which comprises the first two letters of the called exchange name and a digit identifying the particular called exchange in the zone. The directory number dialed by the calling subscriber also includes a numerical portion comprising four digits designating the called subscriber substation in the particular called exchange. Consequently, each subscriber directory number normally constitutes a seven-digit number. Certain exchanges in the system, however, are identified by an office code portion comprising the first two letters of the called exchange name and a numerical portion comprising four digits designating the called subscriber substation. Therefore, directory numbers of the subscriber substations in the exchanges identified by a two-digit office code constitute a six-digit number, instead of a seven-digit number. In either event, the first three digits dialed by a calling subscriber are registered in the register-sender and are translated into one or more routing digits so that the call will be properly routed to the particular called exchange.

The first three digits of a seven-digit called number will always include the first two letters of the called exchange name and the digit identifying the particular called exchange and the first three digits of a six digit number will always include the first two letters of the called exchange name and the thousands-digit of the numerical portion of the particular called subscriber number. In addition to determining the routing digits to be transmitted by the register-sender or director, the called office code will also control the sender to thereafter transmit certain of the first three digits identifying the called exchange and then all of the digits constituting the numerical portion of the called subscriber directory number. Thus, it will be understood that the register-sender will first transmit the routing digits, then the determined digits of the called exchange code, whether two or three digit, and finally the four digits constituting the numerical portion of the called subscriber directory number.

In the above-mentioned Ostline patent, as well as in the present system, an idle register-sender or director is automatically associated with the calling subscriber line and the digits of the called subscriber directory number, as dialed by the calling subscriber, are registered therein. In response to the registration of the first three digits, a common translator mechanism is automatically associated with the register-sender or director in order to perform the translation operations briefly noted above. In other words, the translator mechanism functions to translate the first three digits registered in the register-sender into one or more routing digits and it registers these routing digits in the register-sender or director. Thereafter, the translator mechanism is disconnected from the register-sender and is thus rendered available to other register-senders. Transmission of the routing digits is controlled by the register-sender and, depending upon the selective control by the translator, certain of the digits of the called exchange code, as registered in the register-sender, are then transmitted, and finally the four digits of the numerical portion of the called number are transmitted in order to control the switching apparatus to complete the telephone connection to the desired called subscriber. During the establishment of the above-mentioned connection, various items of record information pertaining thereto, such as the calling subscriber directory number, the called subscriber directory number and other pertinent items of information are transmitted by the register-sender and temporarily registered in a toll ticket repeater that is included in the connection. These items of information are subsequently utilized, upon the release of the telephone connection, to produce a record including the elapsed time of the connection.

In response to the release of the toll ticket repeater, an idle tabulator is associated therewith so that the items of record information may be transferred to the tabulator and temporarily stored therein until appropriate recording apparatus is associated with the tabulator to produce a record of the connection. The records produced by the recording apparatus may be utilized by the operating telephone company to control appropriate business machines to produce printed records of the various items of information pertaining to each toll call.

The main object of the present invention is to provide improved circuits and apparatus for an automatic toll ticketing system of the type noted above including register-sender or director apparatus having facilities for handling national toll calls. National toll calls that are to be automatically handled by the exchange apparatus include either ten or eleven dialed digits. The first three digits of a national toll call identify the particular called area of the United States in which the called exchange is located. The next seven digits usually include the three called office code digits and the four numerical digits identifying the called subscriber line in the particular called exchange. In some exchanges in the United States, the called subscriber number includes an additional digit that identifies the ringing frequency of the particular subscriber station on a party line. It is for this reason that the eleventh digit is required on certain national toll calls.

It is a further object of the present invention to provide improved circuit facilities in the register-sender or director for analyzing the first three digits of a dialed number to determine whether they identify a national code zone or a called exchange and, depending upon the analyses made, for controlling the operation of the switching apparatus so that the call may be automatically completed under control of the register-sender or director. In the event a determination is made that the call is a local call, then it may be completed under the direct control of the dial at the calling subscriber station and the register-sender or director is released from the connection.

Further objects and features of the present invention pertain to the particular arrangement of the circuit elements of the apparatus employed in the automatic toll ticketing system whereby the above-outlined and additional operating features are attained.

The present application is a division of the Ivan V. Coleman application, Serial No. 487,500, filed February 11, 1955, which shows and describes the detail operation of the codexers X2300A and X2300B, the translator X2700, the director translator assigners X2800A and X2800B, and the control and transfer circuit X2901, all of which have been omitted from this divisional application for the sake of brevity since such circuits are unnecessary for a complete understanding of the invention being claimed in this divisional application.

Figure 16:
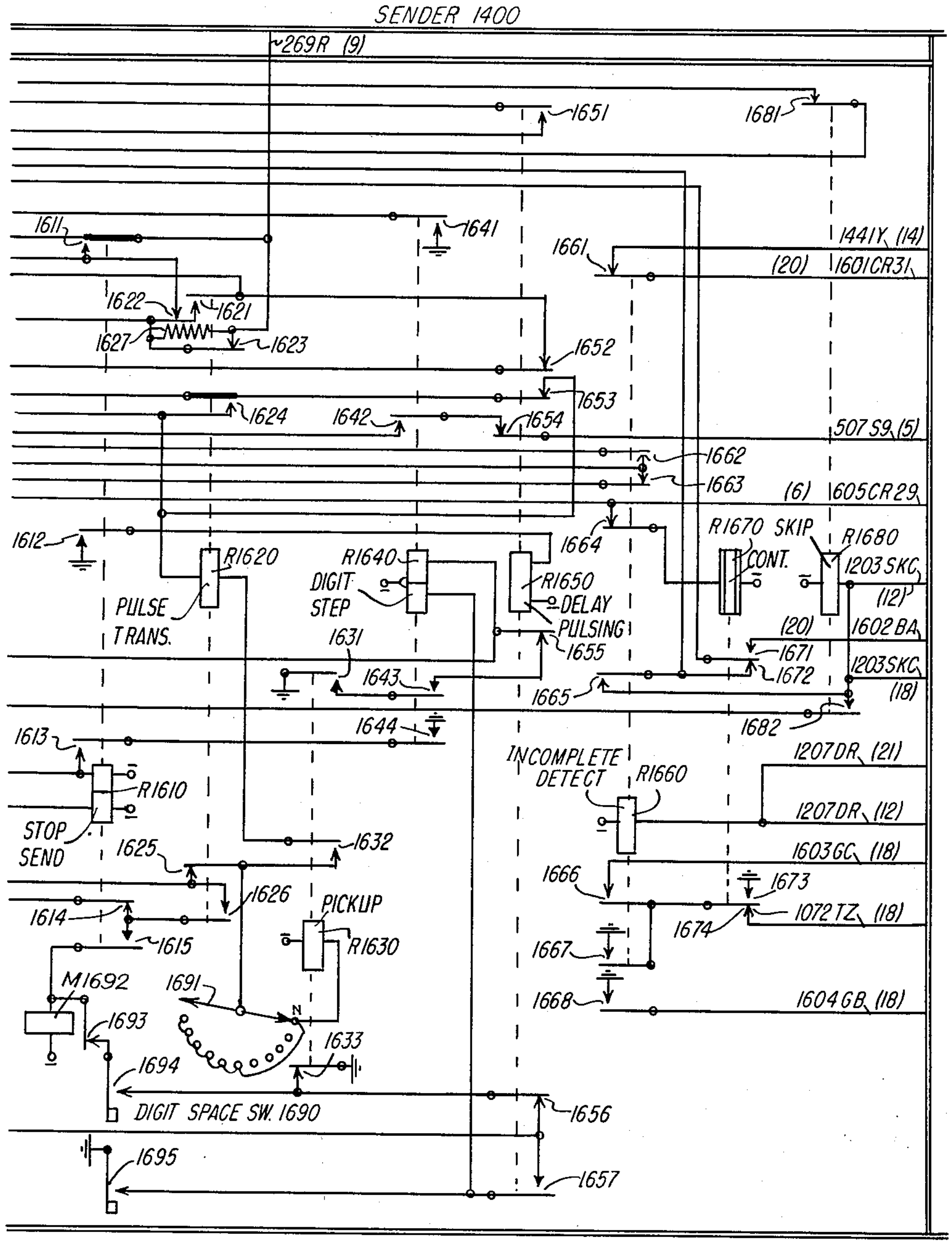
Figures 17, 23:
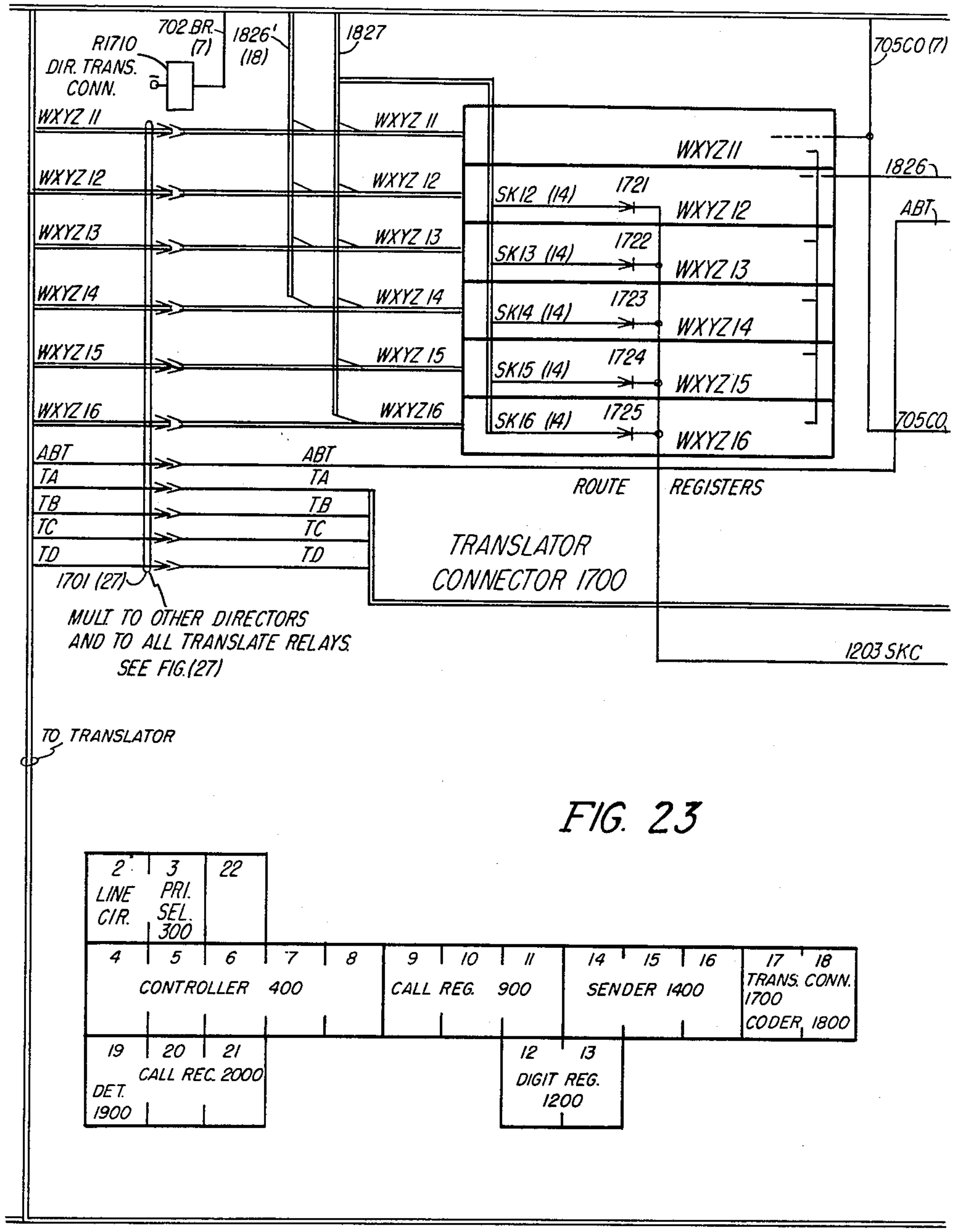

The invention, both as to its organization and method of operation, together with further objects and advantages thereof, will best be understood by reference to the following specification taken in connection with the accompanying drawings in which:

FIG. 1 is a trunking diagram illustrating the general arrangement of the switching apparatus incorporated in the FLorida 3 exchange of the present telephone system;

FIGS. 2 to 22, inclusive, when assembled together in the manner shown in FIG. 23, illustrate sufficient details of the switching apparatus included in the FLorida 3 exchange, to describe the apparatus having incorporated therein the features of the invention outlined above.

Certain of the apparatus schematically illustrated in the different drawings is identified by numerical designations, some of which are prefixed by the letter "X." The prefix X of the numerical designations will facilitate cross-referencing the corresponding equipment and apparatus shown in detail in the parent application and in the previously-mentioned Ostline patent wherein like equipment and apparatus is identified by the same numerical designations.

Figure 2:
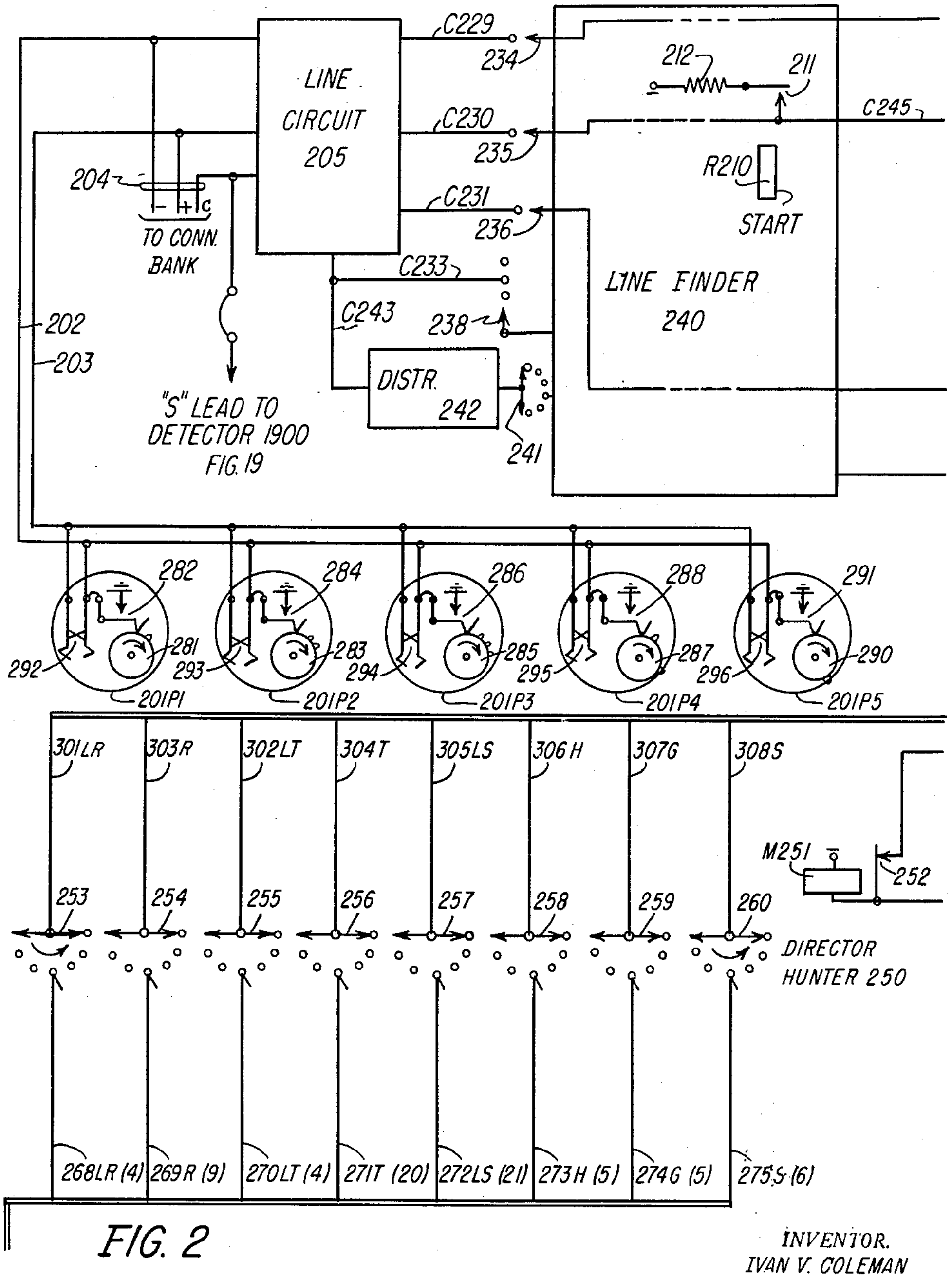

Referring now to the drawings, it will be seen that FIG. 2 schematically illustrates five subscriber substations 201P1 to 201P5, inclusive, on a five party line. These stations are connected by way of the line conductors 202 and 203 to the line circuit 205. This line crcuit is schematically illustrated in block diagram form and is connected to the bank contacts of a plurality of line finders, including the line finder 240, each of which is individually associated with the primary selector, such as the primary selector 300 shown in FIG. 3. The line finder 240 illustrated in block diagram form may be of the type illustrated in the Bakker Patent No. 2,289,896, granted July 14, 1942, or of the type shown in the Saunders Patent No. 1,849,694, granted March 15, 1932.

In the present system, the line finder 240 has been modified so that the start relay R210 thereof, when operated to initiate the usual vertical and rotary stepping of the associated wiper set, also applies resistance battery to the conductor C245 in order to complete an operating circuit for the line relay R330 in the primary selector 300. The distributor 242 illustrated in FIG. 2 and its associated rotary switch 241 are utilized to select an idle line finder selector link for use by the calling line circuit. The distributor 242 may also be of the type illustrated in the above-noted patents to Bakker or Saunders.

In addition to the foregoing, FIG. 2 also illustrates the director hunter 250 which has access by way of its associated wipers 253 to 260, inclusive, to a plurality of directors or register-senders.

Figure 3:
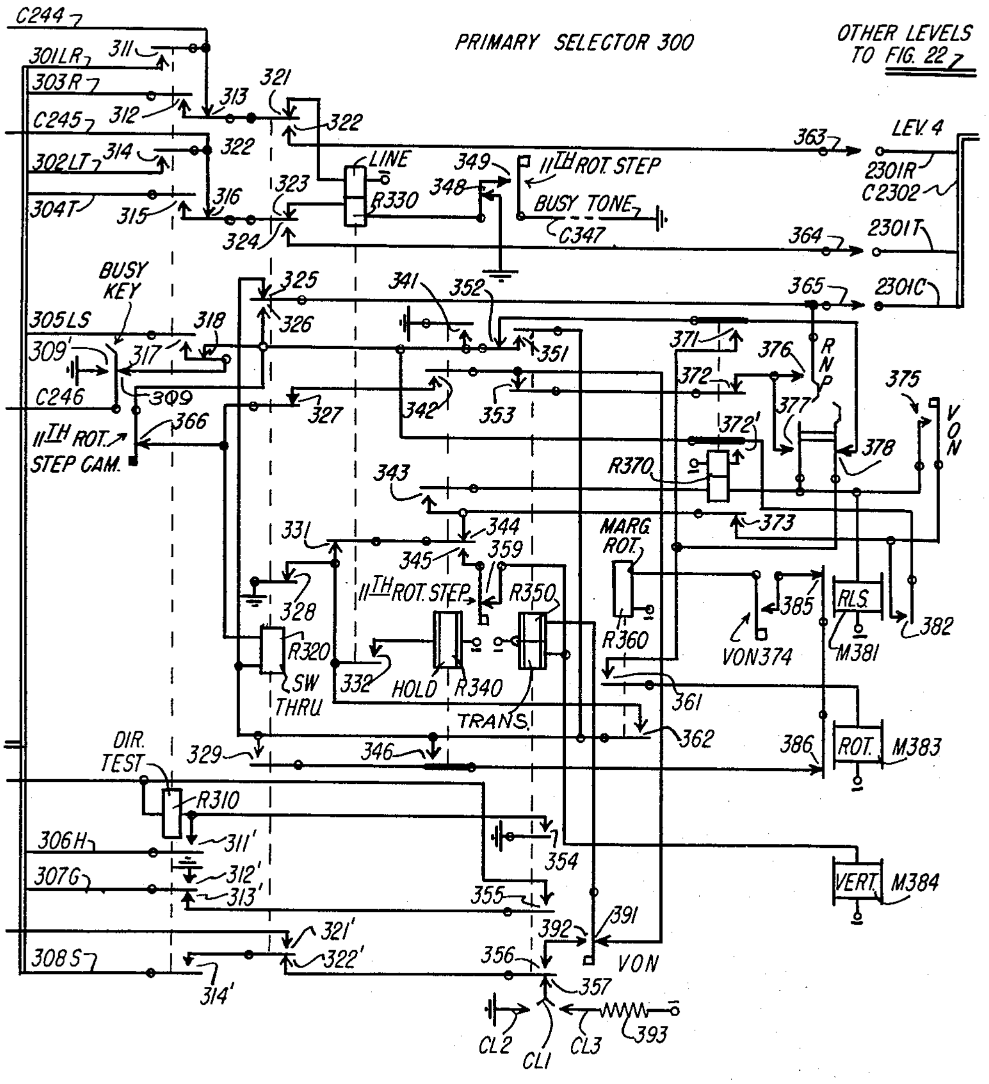

FIG. 3 shows the details of the primary selector 300 which forms the selector portion of the illustrated line finder selector link. This selector may be directly controlled by the dial at the calling subscribed substation when the director or register-sender has determined that the call is a local call and it is also directly controlled by the director or register-sender in setting up either short-haul toll calls or national toll calls.

Figure 9:
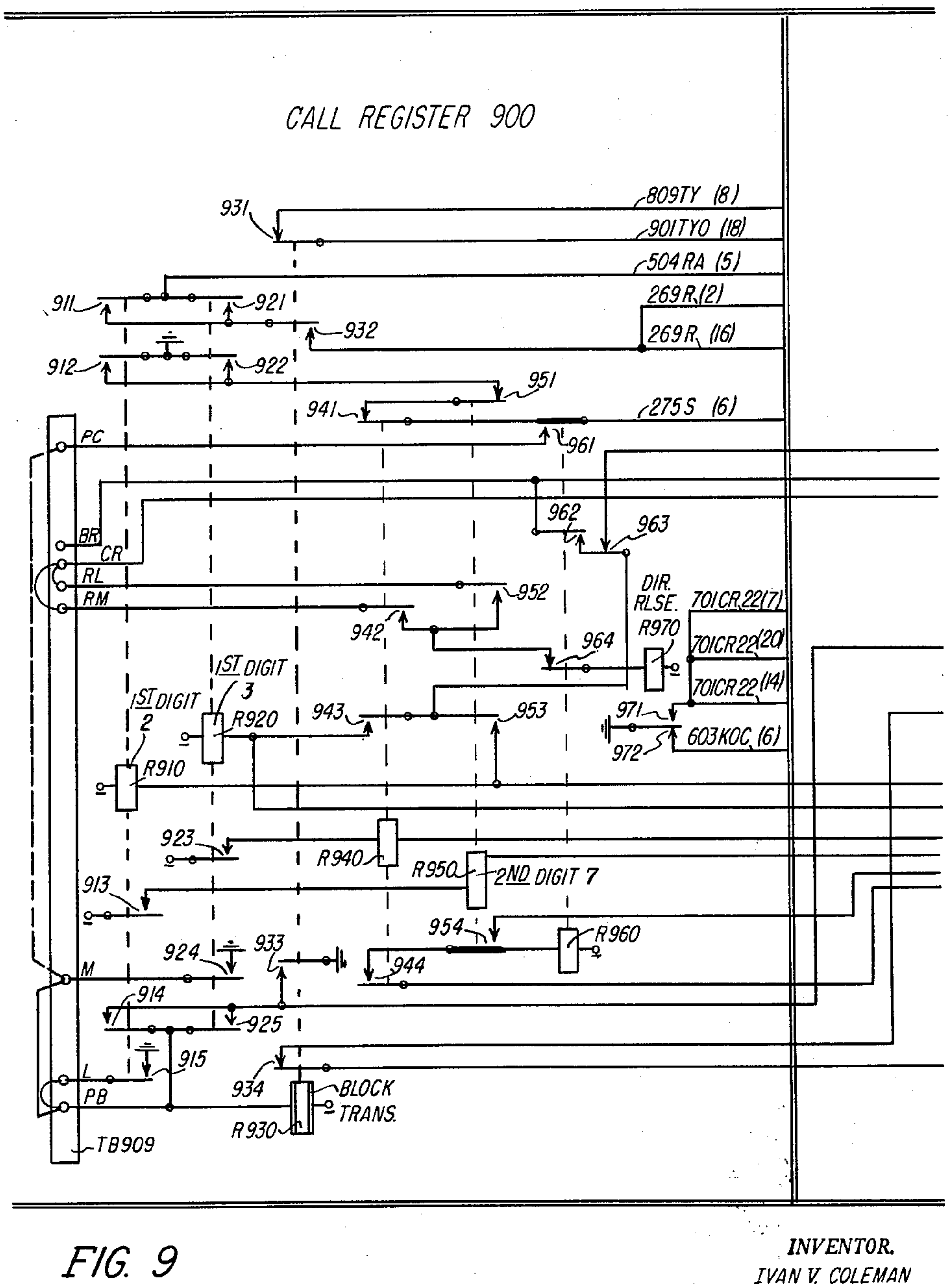
Figure 10:
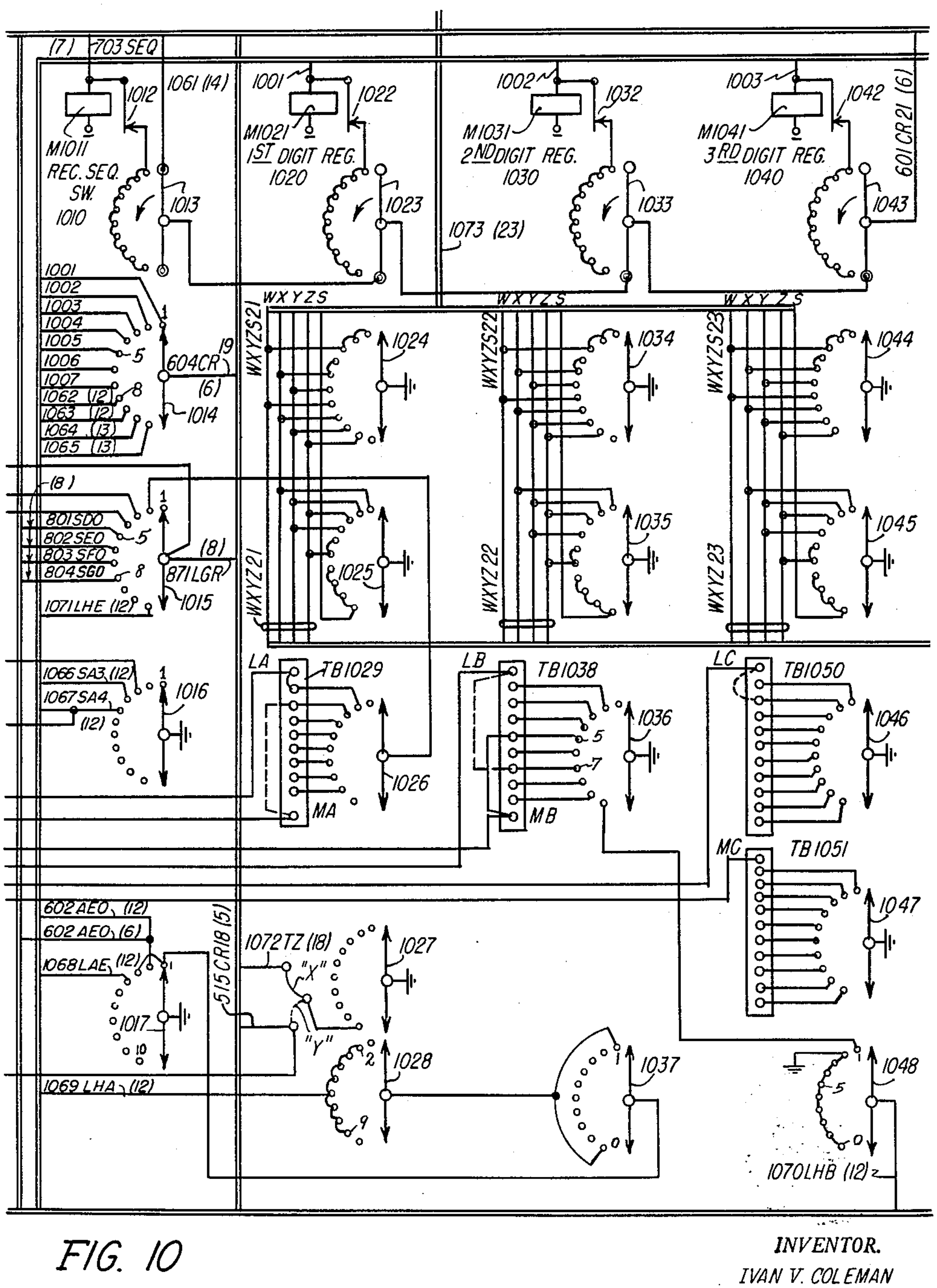
Figure 11:
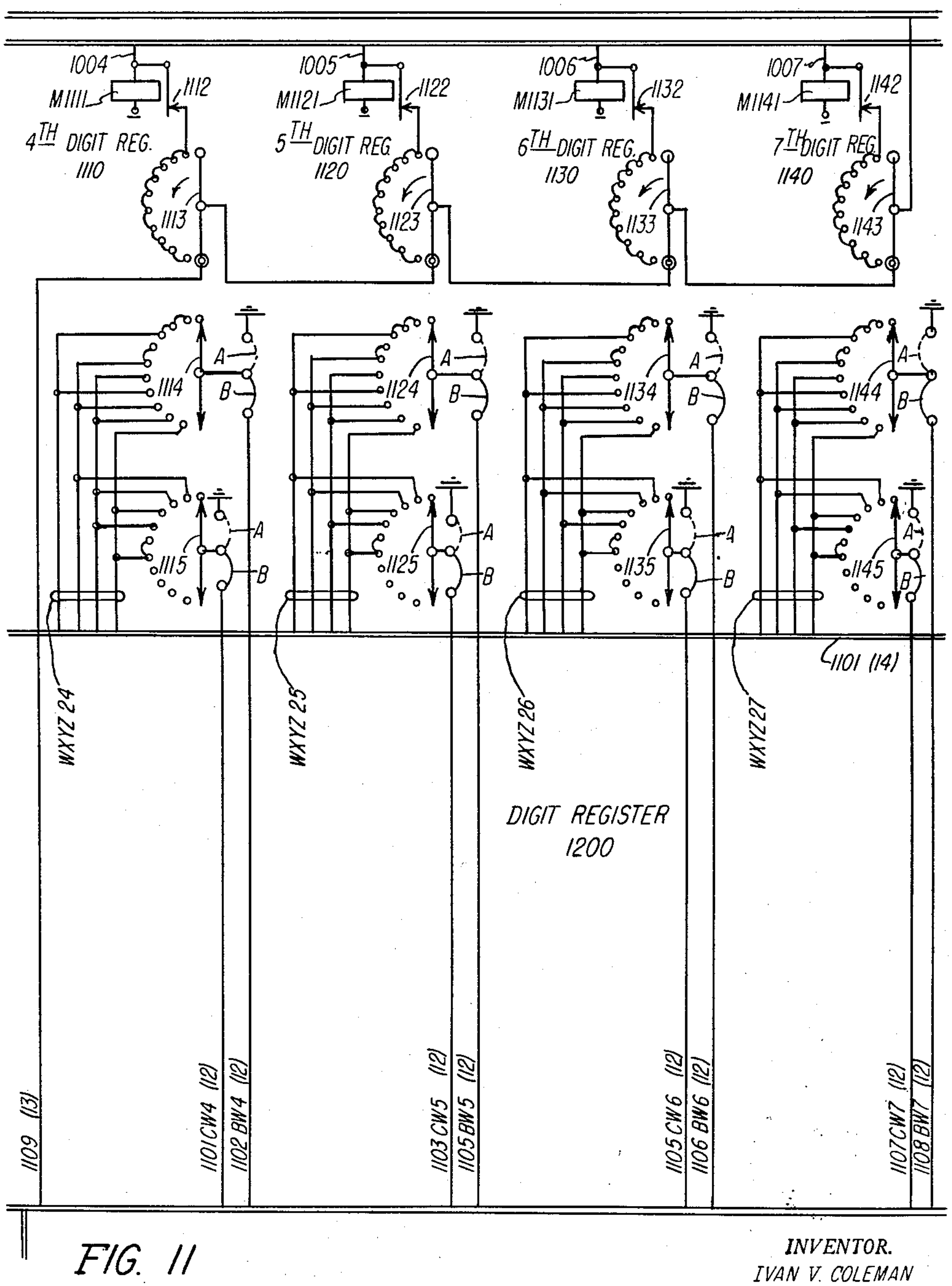
Figure 12:
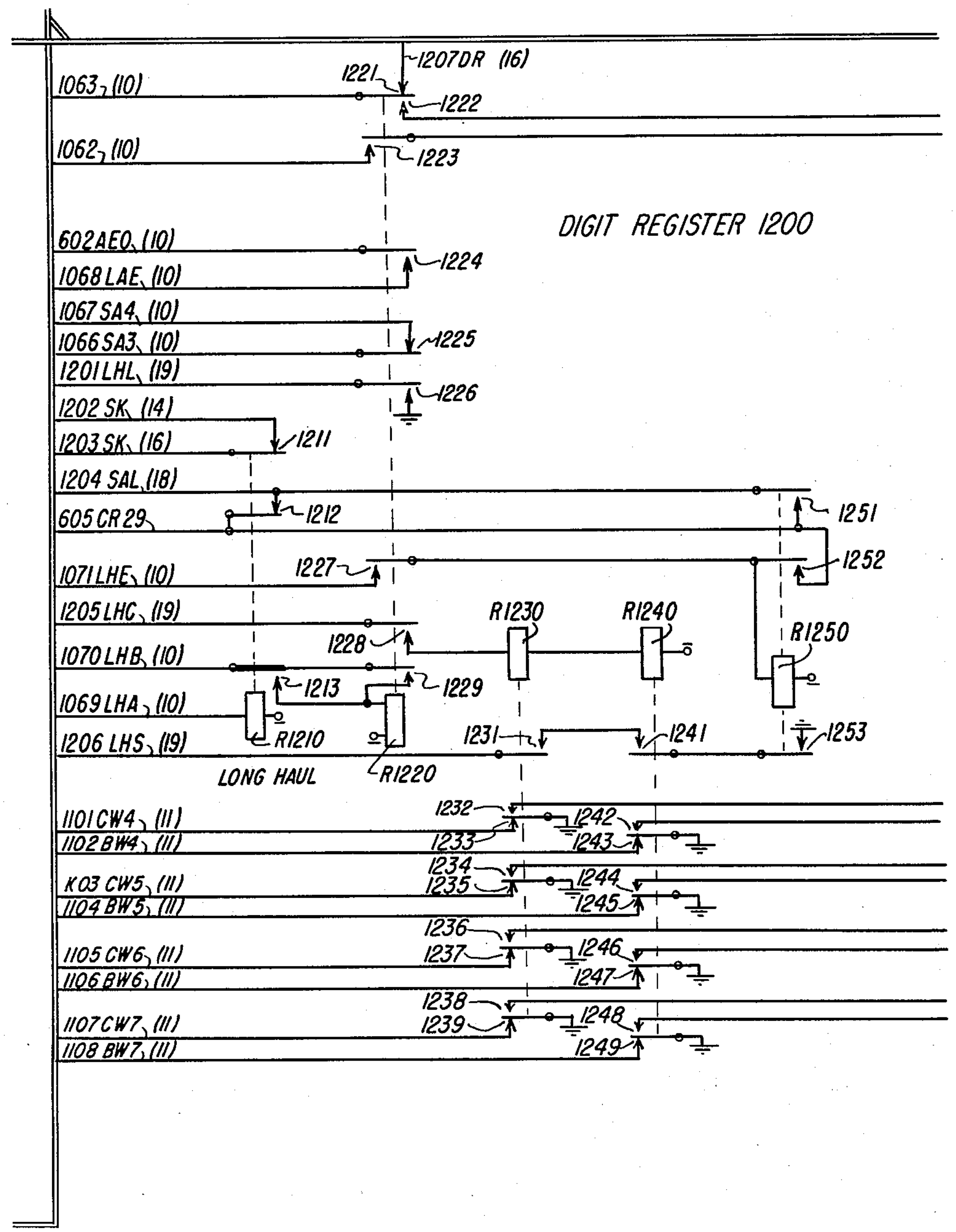
Figure 13:
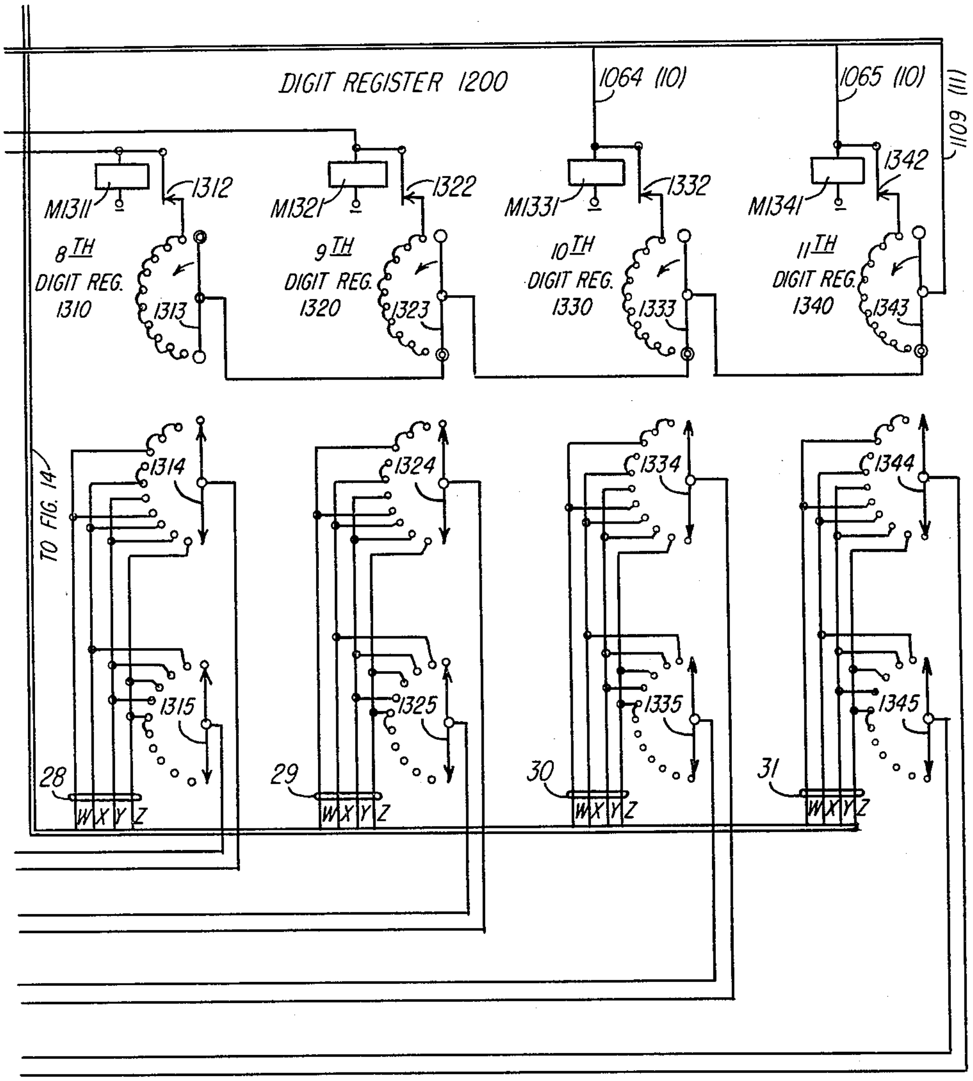
Figure 14:
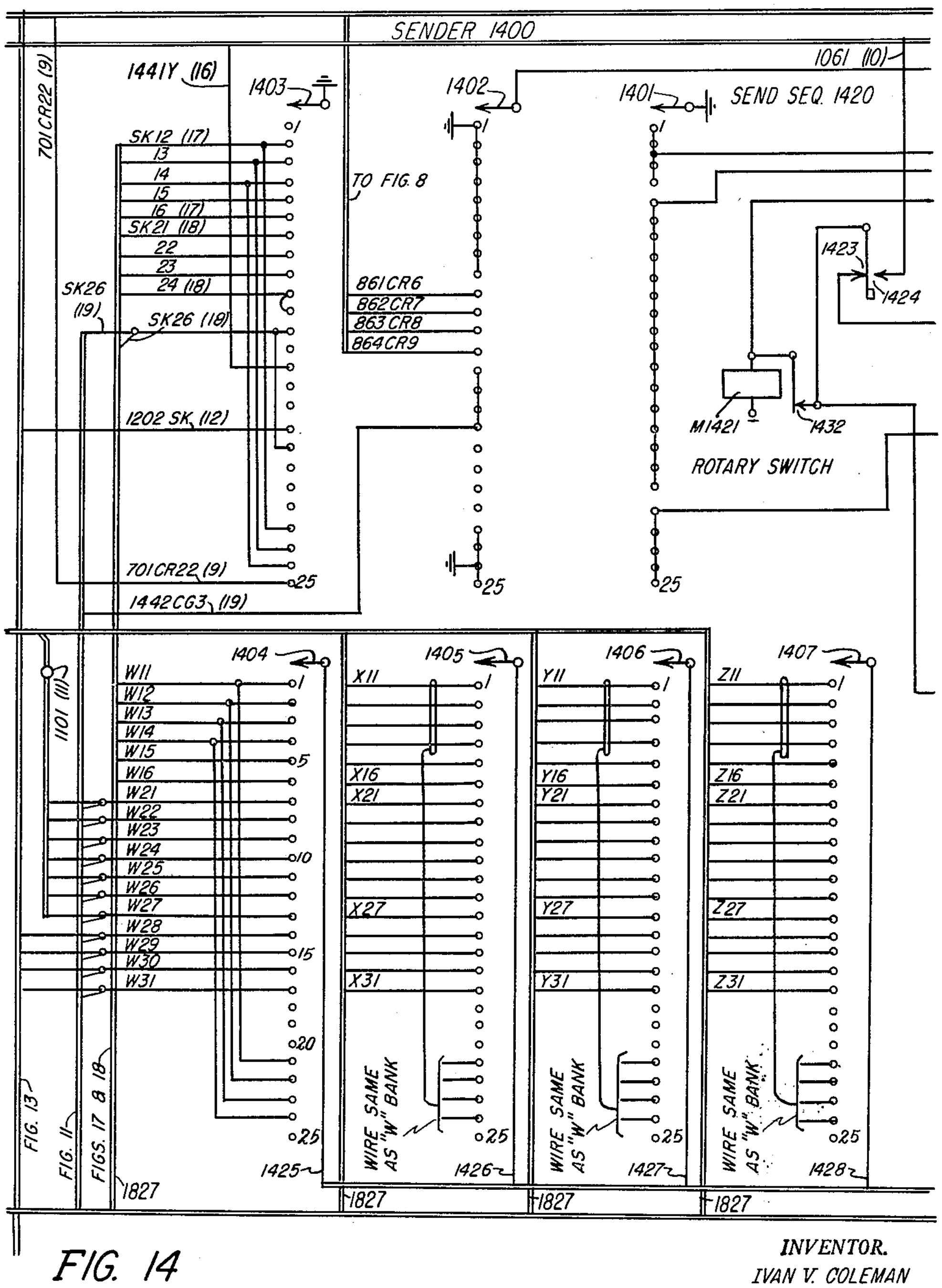
Figure 15:
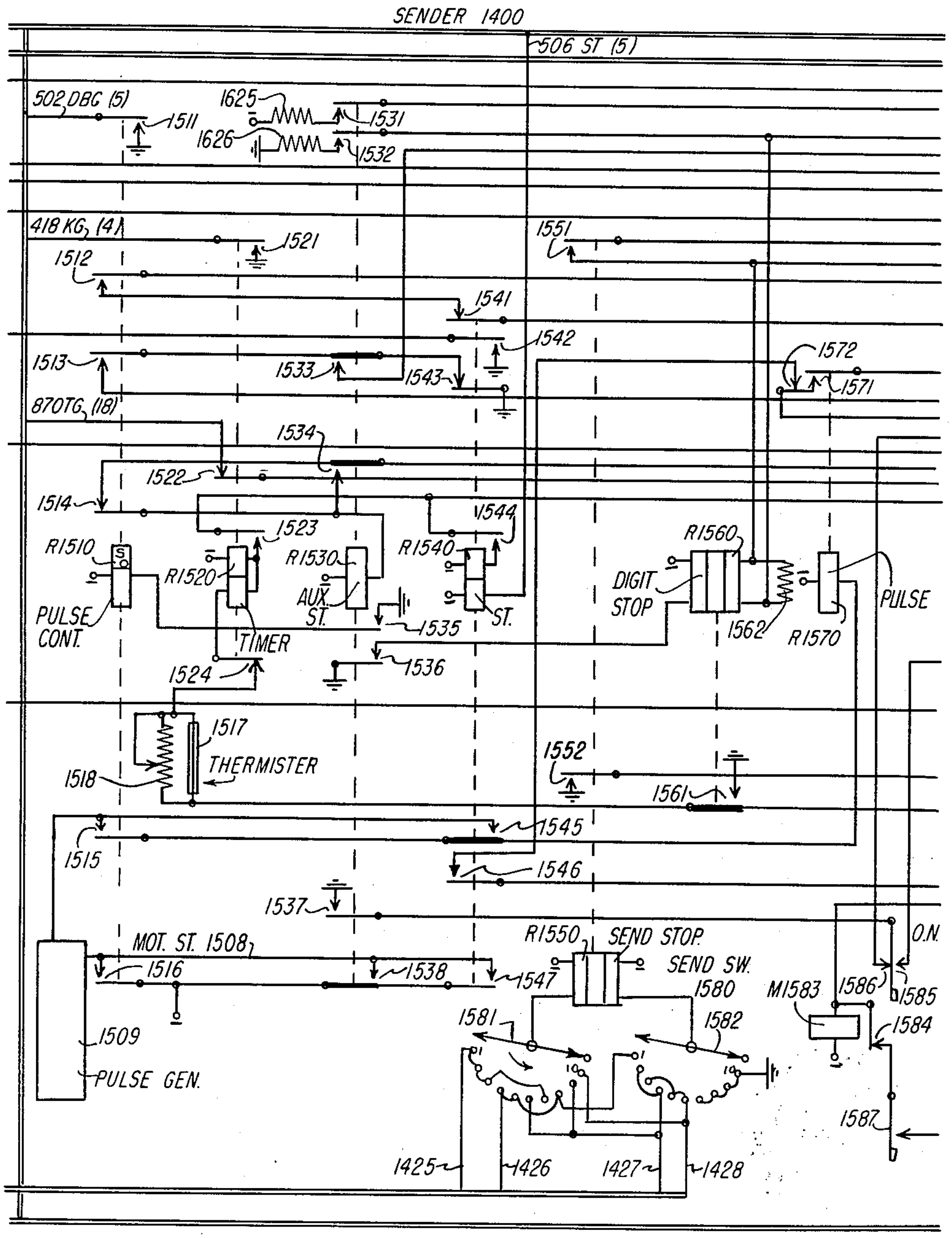
Figure 18:
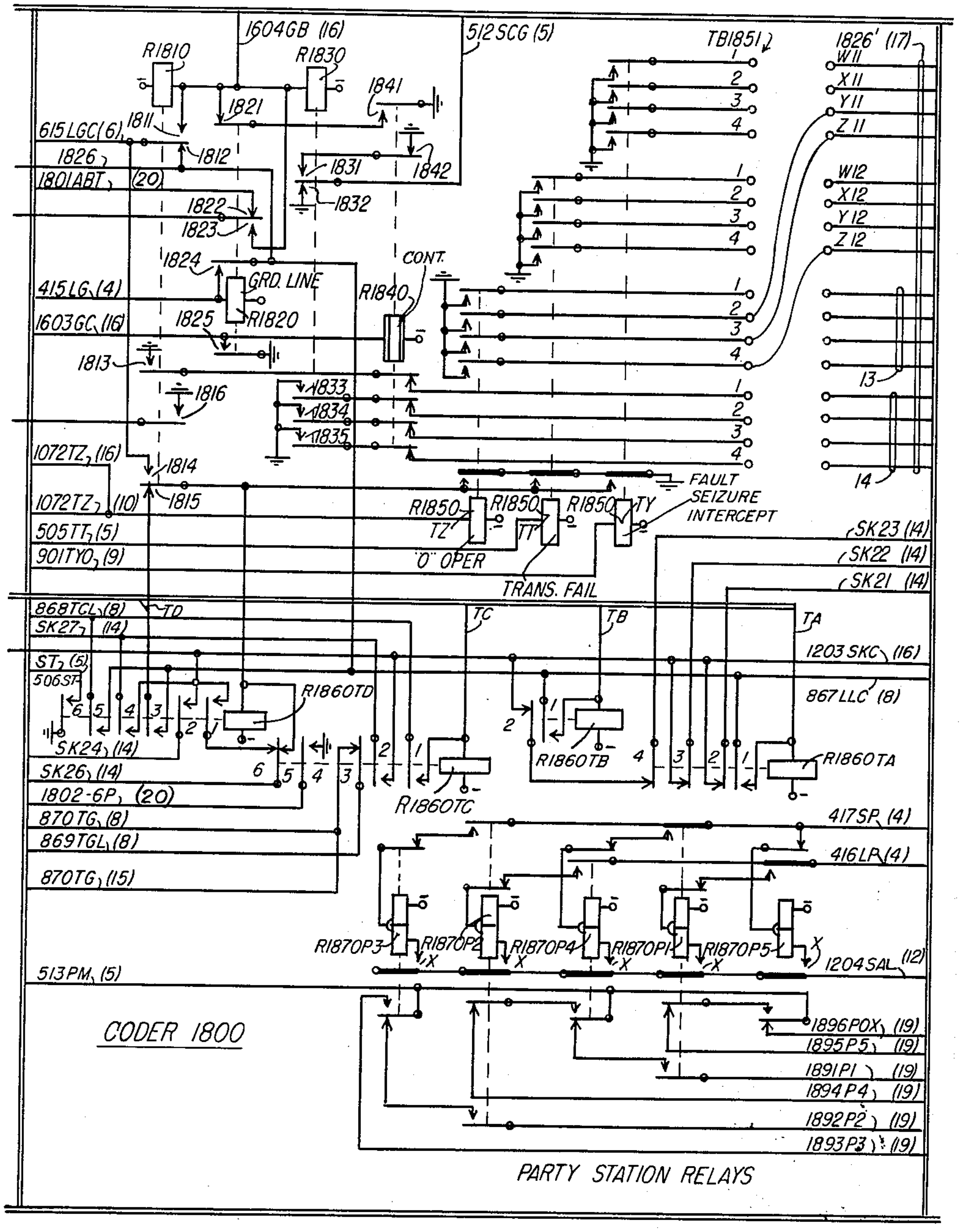

FIGS. 4 to 8, inclusive, show the controller 400 portion of the director or register sender; FIGS. 9 to 11, inclusive, show the call register 900 portion of the director; FIGS. 12 and 13 show the digit register 1200 portion of the director which is utilized only when the call being handled by the director is a national toll call instead of a short-haul toll call; FIGS. 14 to 16, inclusive, show the sender 1400 portion of the director and includes the send sequence switch 1420 that determines the sequence of transmission of the translated routing digits and registered digits; FIGS. 17 and 18 show the translator connector 1700 and the coder 1800 portions of the director; and FIGS. 19 to 21, inclusive, show the call recorder 2000 portion of the director. Thus, each director or register-sender provided in the FLorida 3 exchange includes the details of the separate units illustrated in FIGS. 4 to 21, inclusive.

The controller 400 portion of the director illustrated in FIGS. 4 to 8, inclusive, is used primarily for controlling the various component parts of the director during the receipt of the switch setting impulses from the calling subscribers dial. The call register 900 portion of the director illustrated in FIGS. 9 to 11, inclusive, shows the various control relays which are used to determine the operation of the director based on the particular digits that have been registered in the first, second, and third digit registers 1020, 1030, and 1040. The above-mentioned digit registers are shown in FIG. 10 and four additional registers 1110 to 1140 are shown in FIG. 11 for registering the last four digits of a seven digit called number. A sequence switch 1010 is also illustrated in FIG. 10 to determine the sequence in which the different digits of the dialed number are to be stored in the respective registers of the call register 900 and in the respective registers of the digit register 1200. The seven-digit registers shown in FIGS. 10 and 11 are normally used on all six or seven-digit called numbers. Consequently, the called office code digits will normally be registered in the first three digit registers and the numerical portion of the directory number will be registered in the fourth to the seventh digit registers. However, whenever a national toll number is dialed, the first three registers will be utilized to register the three code digits of the national code, the next three digit registers will be utilized to register the called office code and the seventh to the tenth digit registers (FIGS. 11 and 13) will be utilized to register the four numerical digits of the called number. The eleventh digit register 1340 shown in FIG. 13 is used whenever the numerical portion of the called directory number of a national toll call includes five instead of the usual four numerical digits. The fifth digit in this case is generally used to select the particular ringing frequency or the side of the line over which the selected ringing frequency is to be transmitted to ring the particular called station on a called party line.

Figure 19:
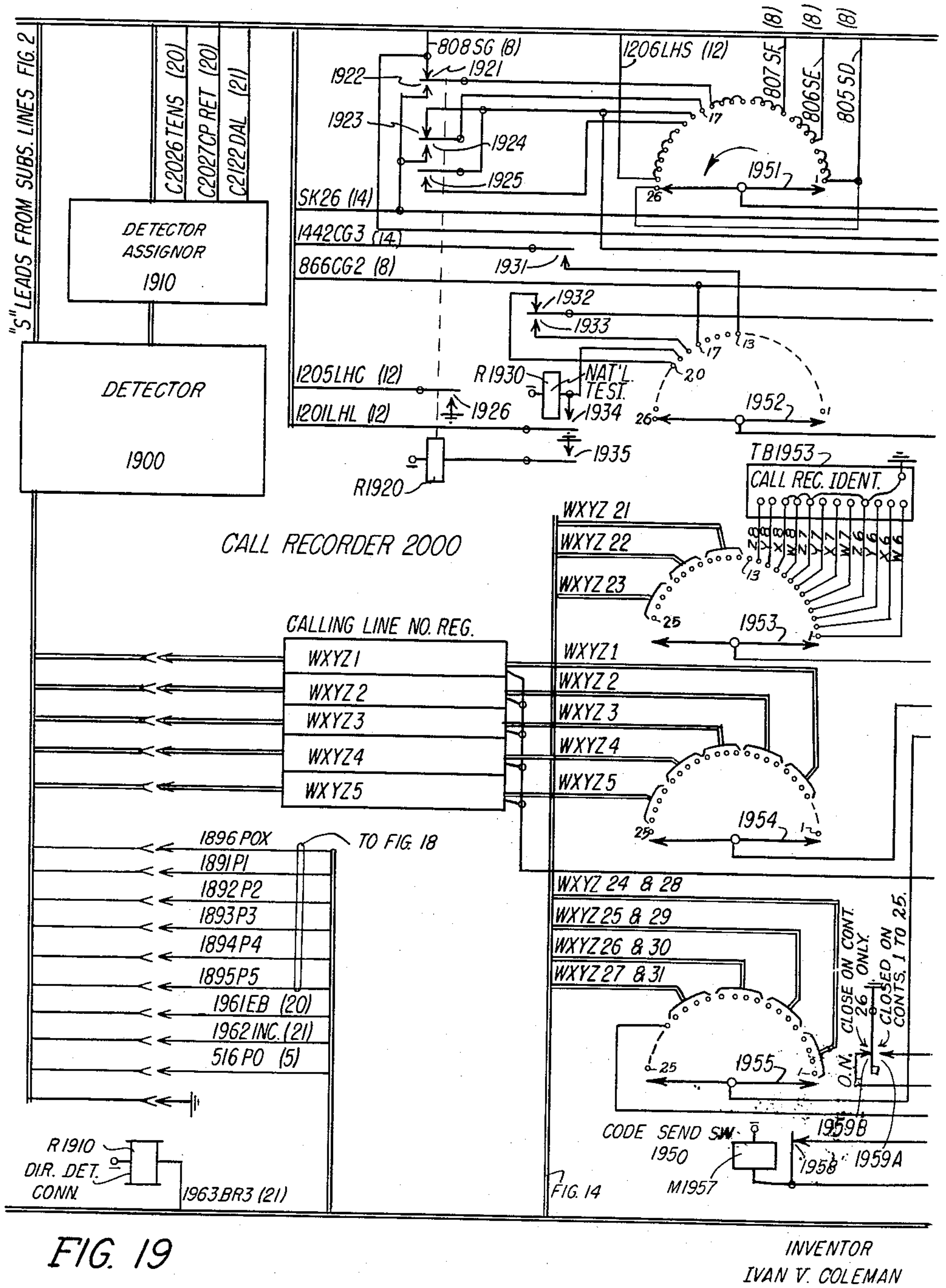
Figure 20:
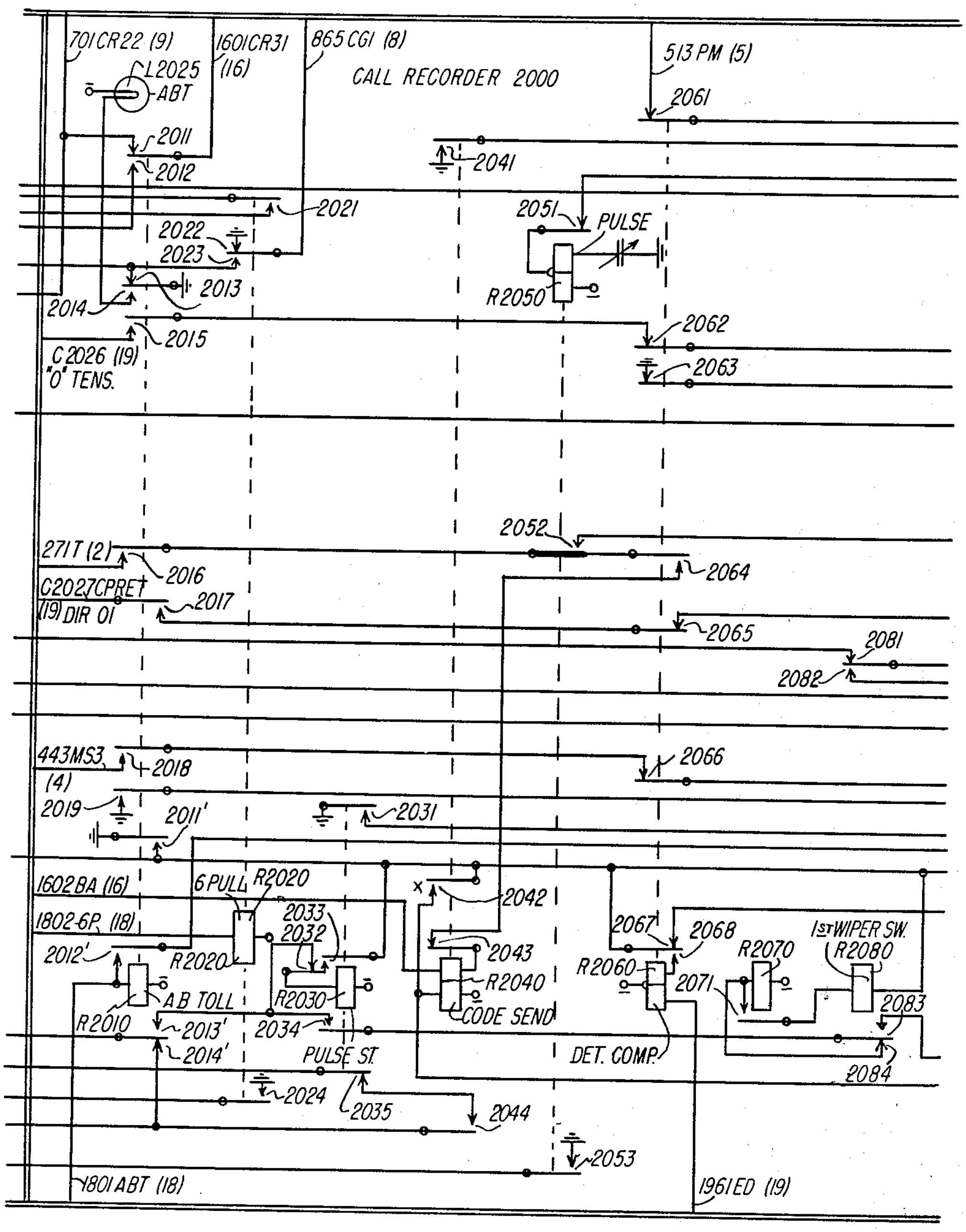
Figure 21:
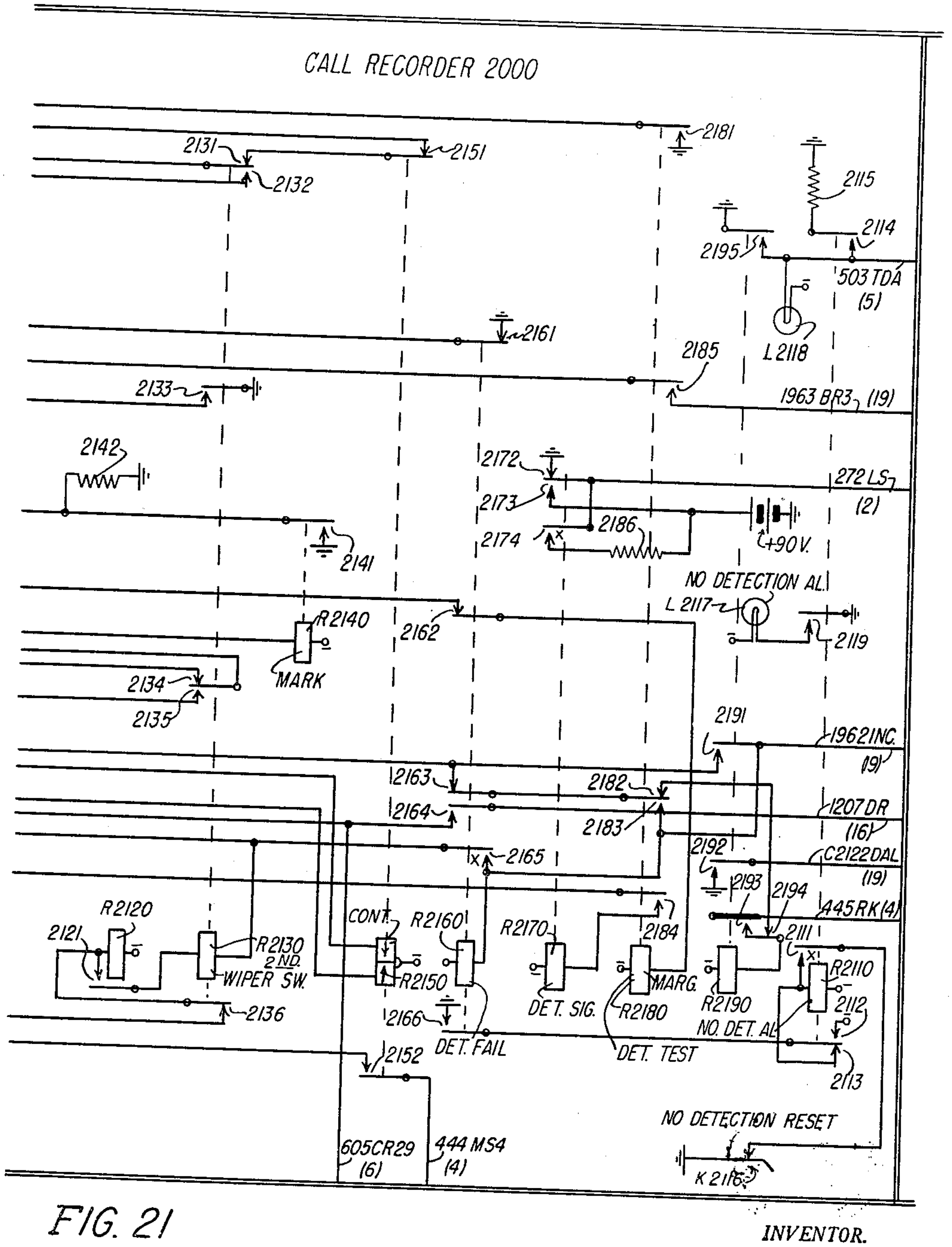

The send sequence switch 1420 illustrated in FIG. 14 determines the order in which the routing digits registered in the coder 1800 (FIGS. 17 and 18) are transmitted and the order in which the digits registered in the eleven digit registers in the call registers 900 and 1200 are to be transmitted by the director in the setting up of the connection. FIGS. 17 and 18 show the translator connector 1700, including the six WXYZ11 to WXYZ16, inclusive, route registers; the control relays of the coder 1800 which are operated in accordance with the selective control of the translator so that the call will be properly routed to its designation; and the party station relays that are operated to register the position of a calling station on a party line. FIGS. 19 to 21, inclusive, show the details of the call recorder 2000 which is called into use and associated with the director only in the event that the translator has determined that a record is to be produced of the particular call being handled. The call recorder 2000 is arranged so that it will control the sequence transmission of the various registered items of record information by means of the code send switch 1950, to the toll ticket repeater included in a connection for temporary storage. In addition to the foregoing, FIG. 19 schematically illustrates the detector 1900 and the detector assigner 1910 which may be of the type illustrated in FIGS. 29 to 38, inclusive, of the Ostline Patent No. 2,586,704, granted February 19, 1952, and also shown in the Ostline Patent No. 2,639,330, granted May 19, 1953. Preferably, the detector assigner 1910 and the detector 1900 may be of the type shown in the Ivan V. Coleman application, Serial No. 487,572, filed November 11, 1955, now Patent No. 2,773,127, granted December 4, 1956.

Figure 22:
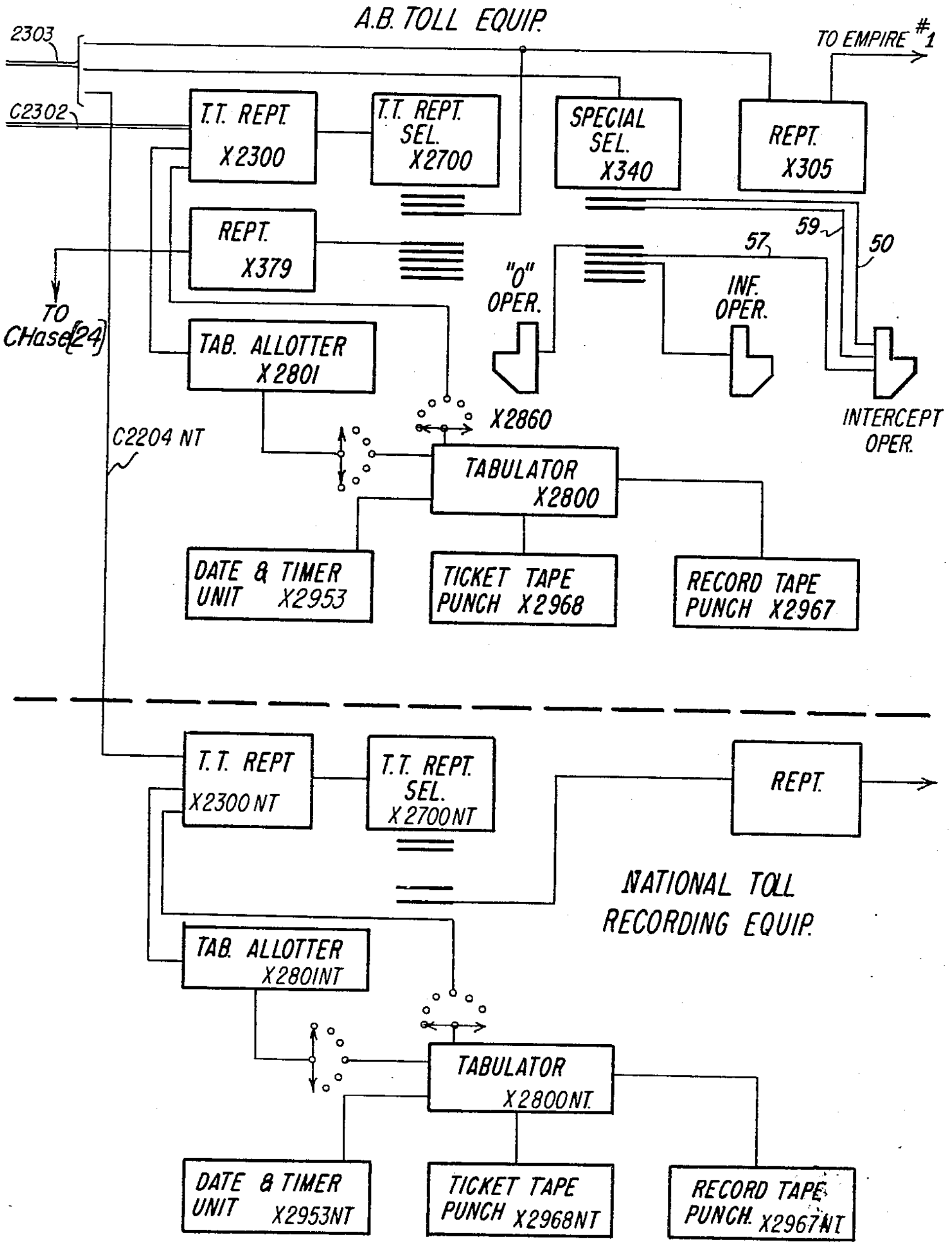

FIG. 22 illustrates in block diagram form the AB toll switching apparatus that is utilized in conjunction with the completion of any short-haul toll call and the recording apparatus that is temporarily associated with a toll ticket repeater for the purpose of making a record of the various items of information stored therein pertaining to a toll call. The details of the operations of the various schematically illustrated units of equipment for the purpose of storing and recording items of information pertaining to a telephone connection are shown and described in detail in the Ostline Patent No. 2,678,353, granted May 11, 1954. FIG. 22 also illustrates, in block diagram form, the national toll switching apparatus and the recording apparatus that is utilized in conjunction with the completion of any long-haul national toll call. This apparatus is substantially the same as that disclosed in the last-mentioned Ostline patent except that it is modified to store and to record the additional items of information forming the record of a national toll call.

FIG. 1 shows the codexer X2300A and the translator X2700 which are temporarily associated with the coder 1800 portion of a calling director and with the call register 900 portion of the director to translate the first three digits of a called number into one, or as many as six appropriate routing digits and for registering the corresponding routing digits in the route registers of the coder 1800. In addition to the foregoing, the particular selected translate relay in the translator X2700 will call in the call recorder 2000 if a record is to be made of the call and to control the coder 1800 portion of the director so that whatever necessary digits of the called number will be transmitted by the director to complete the setting up of the connection to the desired called destination.

Referring again to FIGS. 1, 3, and 22, it will be seen that the primary selector 300 (FIG. 3), which corresponds to the schematically illustrated primary selector 300 of FIG. 1, has access by way of its associated bank contacts to various trunk lines extending to other switching apparatus included in the FLorida 3 exchange. As best shown in FIGS. 1 and 22, level 1 of the primary selector 300 has access over cable C2204NT to ticket repeaters which are provided as a group to be used only in conjunction with calls that are to be completed on a national toll basis. The ticket repeaters included in the group accessible over level 1 of the primary selector 300, as well as the tabulating record producing apparatus are arranged so that they can record called exchange directory numbers that have been preceded by a three-digit national toll code. The national toll apparatus has been given the same reference characters as the corresponding apparatus provided for completing and recording short-haul AB toll calls except that the designations include the suffix NT to indicate apparatus used for national toll calls.

In FIG. 1, level 3 of the primary selector 300 has access to the local exchange switch train including the selectors X315 and X320 and the connectors, such as the connector X325, for completing local calls to other subscriber lines terminating in the illustrated FLorida 3 exchange.

As shown in FIGS. 1 and 22, level 4 of the bank contacts of the primary selector 300 has access by way of cable C2302 to the regular short-haul AB toll ticketing apparatus including the toll ticket repeater X2300 and the associated ticket repeater selector X2700 for extending toll connections, by way of the repeater X305, to the EMpire 1 exchange and by way of the repeater 379 to the CHase exchange. All calls completed over the trunks including toll ticket repeaters, such as the toll ticket repeater X2300, are recorded by means of the apparatus including the ticket repeater finder X2860, the tabulator allotter X2801, the tabulator X2800, the ticket tape punch X2968, the record tape punch X2967 and the date and timer unit X2953.

In level 5 in the associated bank contacts, the primary selector 300 has access to trunk lines extending to the special selectors, such as X340, so that connection may be established through the latter selector to the intercept operation position 50, the "0" operator position and the information operator position 113.

Over level 8, the primary selector 300 has access to the repeaters, such as X305, so that calls may be extended to the EMpire 1 exchange without including any of the toll ticketing repeaters, such as X2300, or the associated recording apparatus. In other words, certain calls may be completed to the EMpire 1 exchange from certain subscriber lines in the FLorida 3 exchange without the use of the toll ticketing apparatus.

It may be well to point out at this time that the tabulator allotter X2801 is arranged to select an idle tabulator X2800 and to cause it to be associated with a particular calling toll ticket repeater X2300 by means of the ticket repeater finder X2860. When the tabulator X2800 is associated with a calling toll ticket repeater various items of record information pertaining to the telephone connection including the calling subscriber directory number, the called subscriber directory number, the time duration of the conversational connection and certain other items of information pertaining to the particular connection are transferred from the toll ticket repeater to the tabulator X2800. In the event that the national toll ticketing apparatus of FIG. 22 is included in the connection, then the information transferred as noted above includes the three digit national toll code. The toll ticket repeater involved is generally released as soon as all of the items of information have been transferred. If the record tape and ticket tape punch mechanisms X2967 and X2968 are available, then the tabulator X2800 will control these mechanisms to perforate tapes in accordance with the items of record information that have been stored in the tabulator. Also, the date and time that the recording takes place is also registered by the punch mechanism. Thus, perforated tapes containing a record of the various items of information pertaining to each toll connection are produced for use by the telephone company.

All of the recording apparatus described above, including the ticket repeater X2300, the ticket repeater selector X2700, the tabulator allotter X2801, the tabulator X2800 and the ticket repeater finder X2860 are disclosed and described in detail in the above-mentioned Ostline Patent No. 2,678,353.

*The general arrangement of the telephone system*

The telephone system disclosed in the drawings and described herein, serves a large metropolitan area and the adjacent suburban areas which may be divided into a plurality of different zones, each zone including one or more different exchanges. The telephone equipment schematically illustrated in FIG. 1 is provided in the FLorida 3 exchange and certain of the apparatus is shown in greater detail in the remaining drawings. It should be understood, however, that each of the exchanges in the network of the telephone system may be substantially identical to the FLorida 3 exchange. It should also be understood that the equipment and apparatus provided in the FLorida 3 exchange is arranged so that it may be utilized in conjunction with the establishment of telephone connections on the national toll basis. In order to make a national toll call, the directory numbers of any desired called subscriber, for example, in the entire United States may be called without the aid of the toll operator by merely prefixing the desired called subscriber directory number (exchange name and line number) with a three digit national toll code assigned to the particular area in which the desired called exchange is located.

Each of the exchanges forming the network including FLorida 3 exchange serves 10,000 subscriber lines. All of the directory numbers of the subscribers in the FLorida 3 exchange, as well as the directory numbers of the subscribers in other exchanges are usually seven-digit numbers including a three-digit office code designation and a four-digit numerical designation. Subscriber stations in certain exchanges, including the CHase exchange, are identified by a two-digit office code, instead of the usual three-digit office code, and the usual four-digit numerical portion. Thus, it will be appreciated that the third digit of calls to subscribers in the CHase exchange will be the first digit of the numerical portion of the directory number, whereas, the third digit of calls to other exchanges will be the third digit of the office code.

At this point, it may be well to note that each of the subscriber dials or calling devices is arranged, in a conventional manner, with ten finger holes corresponding respectively to the digits 1 to 9 and 0, and that each of the digits has corresponding letters which may be dialed in accordance with the first two letters of any called exchange name. It should also be understood that if the office code of the called exchange includes three digits instead of the previously mentioned two letters and a digit, the called office code digits will correspond to the first three letters of the called exchange name. The ten digits of the dial and the corresponding letters for each of the digits are as follows:

| Digits: | Letters |
|---|---|
| 1 | ---------- |
| 2 | ABC |
| 3 | DEF |
| 4 | GHI |
| 5 | JKL |
| 6 | MNO |
| 7 | PRS |
| 8 | TUV |
| 9 | WXY |
| 0 | Z (operator) |

*The apparatus incorporated in the FLorida 3 exchange*

Preferably, each exchange of the telephone system comprises apparatus substantially identical to that provided in the FLorida 3 exchange as best illustrated in FIG. 1. This apparatus serves the terminals respectively terminating the private subscriber lines TX3 and TR3, the pay station line TP3 and the terminals commonly terminating the party line serving the substations 201P1 to 201P5, inclusive. The switching equipment included in the FLorida 3 exchange comprises a number of line circuits individually associated with the above-identified subscriber lines and including the line circuits 205, and 205A to 205C, inclusive. At this point it is noted that the private subscriber substation TX3 is rendered extended service facilities and is of the class 1 type. The private subscriber substation TR3 is rendered free local service and is of the class 2 type. The substation TP3 is a paystation and is of the class 3 type which is denied toll service. The five-party line is of the class 2 type.

The ordinary private subscriber substations TR3 of the class 2 type and the party subscriber substation of the class 2 type are rendered free local service to all subscriber substations terminating in the FLorida 3 exchange and they are rendered automatic short-haul toll service to all other exchanges served by the network and they are rendered national toll service to all other exchanges that may be reached on a long-haul toll basis. The extended service subscriber substation TX3 of the class 1 type is rendered free automatic local service, free automatic toll service to certain nearby exchanges, automatic short-haul toll service to other exchanges of the network and automatic long-haul toll service on national toll calls. The paystation subscriber TP3 of the class 3 type is rendered automatic local service provided the necessary coins have been deposited in the telephone instrument, and toll service to any other exchange on either a short-haul or a long-haul toll basis by means of the manual operator at the "0" operator position.

The various line circuits individual to the above-mentioned substations have been shown (FIG. 1) in a common group and terminate in the bank contacts accessible to the line feeder 240. However, as previously noted, it should be understood that the different line circuits actually terminate in different groups of line finders corresponding to the different classes of lines. The switching equipment in the telephone exchange also includes the line finder 240 and the distributor 242 and a primary selector 300. As illustrated, the primary selector 300 may be utilized by any one of the subscriber lines regardless of the class of service, but as actually used, the primary selectors are divided into three groups serving, respectively, the three different classes of service. The particular class of service to be handled by any primary selector is governed by the X and Y strapping shown in the lower portion of FIG. 3.

The FLorida 3 exchange is also provided with a group of directors, sometimes referred to as register-senders, including as many as 100 directors which are accessible to the various primary selectors by means of director hunters, such as 250, individual to each primary selector 300. Additional groups of directors may also be provided if the amount of traffic to be handled through the exchange is too great to be handled by one group of directors. Furthermore, each director comprises a controller 400, a call register 900, a digit register for use in connection with national toll calls, a sender 1400, a coder 1800, and a call recorder 2000.

The translator X2700 is common to all of the directors in the exchange and may be associated with any calling director by means of the director translator assigner X2800A and the codexer X2300A. In the event that either the director translator assigner X2800A or the codexer X2300A fail to properly operate, the alternate translator assigner X2800B and codexer X2300B will be automatically substituted in order to connect the translator X2700 to the proper calling director.

The exchange is also provided with a schematicaly illustrated detector 1900 and an associated detector assigner 1910 for associating the common deterctor with any calling director. The detector 1900 is provided to identify the directory number of any calling subscriber substation, whenever the director and the translator determine that a record is to be produced of the call, and to register the directory number in the call recorder 2000 of the particular director in use. The detector 1900 is common to all of the directors of the exchange and it may be of the type disclosed in the Ostline Patent No. 2,639,330, granted May 19, 1953, but preferably the detector 1900 should be of the type illustrated in the previously mentioned Coleman patent.

The FLorida 3 exchange is also provided with a local switch train including the local selectors X315 and X320 and a number of connectors, such as X325, for extending connections to the local subscribers in the FLorida 3 exchange. Additional local switches, including the special selector X340, are utilized to extend connections to the intercept, information, and "0" operator positions of the switchboard included in the exchange. It should be understood, however, that the connectors are of the party type and in the present system, such connectors may be utilized to extend connections to different party subscriber substations. If desired, the connectors may be regular individual type connectors but divided into separate groups corresponding to the five different stations on a party line wherein each group of connectors, in accordance with the different parties, will transmit different ringing frequencies seelctively to signal the substation on a party line having ringers that will respond to the corresponding frequency.

Furthermore, the FLorida 3 exchange includes the AB toll recording equipment which is utilized to make a recording of each short-haul toll call. This equipment includes the toll ticketing repeater X2300 and the associated ticket repeater selector X2700 which has access to different groups of trunks or toll lines interconnecting the FLorida 3 exchange with other exchanges of the telephone network including the EMpire 1 exchange and the CHase exchange. The AB toll recording equipment also includes a tabulator allotter X2801 for associating an idle one of the tabulators X2800 with a calling one of the ticket repeaters X2300 through the ticket repeater finder X2860. In this manner, various items of record information pertaining to the telephone connection stored in the toll ticket repeater are transferred to the selected tabulator. Each of the tabulators is individually associated with a record tape punch X2967 and a ticket tape punch X2968 to produce perforated tapes containing a record of the various items of information transferred to the tabulator. The exchange is also provided with a number of groups of ordinary repeaters, including the repeaters X305 and X379, which are accessible to the ticket repeater selector X2700 to complete connections to other exchanges, such as the EMpire 1 exchange and the CHase exchange. All of the foregoing AB toll recording equipment, as illustrated in the present system, is accessible from the fourth level of the bank contacts of the primary selector 300. However, it should be noted that substantially identical ticketing apparatus is provided for the national toll recording equipment which is accessible from the first level of the primary selector 300. The national toll recording equipment is arranged to handle the additional three toll code digits identifying the different areas to which the long-haul toll calls may be extended.

Each subscriber substation in the exchange is provided with the usual substation apparatus including a telephone substation instrument, a ringer, and a calling device or dial. The calling device provided at each ordinary subscriber substation, at each extended service subscriber substation, and at each paystation is of conventional construction and arrangement. However, the calling device disposed at each of the party subscriber substations is of special construction and arrangement in that it is provided with a special station identifying cam of substantially the same type as that disclosed in the Ostline Patent No. 2,410,520, granted November 5, 1946. The calling device of the special construction shown in the above-mentioned patent, in addition to the usual set of loop or switch controlling impulsing contacts, such as the contacts 292 (FIG. 2) also includes a set of cam springs, such as 282. In each of the special calling devices, impulsing contacts are operated to transmit a variable number of series of switch control loop impulses in accordance with the digit selected on the pull of the finger plate of the dial. Each of the calling devices of the special construction also includes cam springs which are operated by an associated cam during the return movement of the dial finger plate to transmit a number of station identifying ground impulses just prior to the full restoration of the finger plate to its normal position. When the calling device at the first party subscriber substation 201P1 is pulled in accordance with a digit 2 or more, the associated cam 281 operates the set of cam springs 282 to transmit one station identifying ground impulse over the party line conductors 202 and 203, after all of the switch control loop impulses have been transmitted. The same operations will take place at the second party subscriber substation 201P2 except that the cam thereat is arranged so that it will control the cam springs 284 to transmit two station identifying ground impulses after all of the loop impulses have been transmitted. At the third party subscriber substation 201P3, the cam 285 thereat will control the cam springs 286 to transmit 3 station identifying ground impulses during the last portion of the return movement of the dial. In the last-mentioned case, the first of the series of three ground impulses is transmitted just prior to the transmission of the last switch control loop impulse and the remaining two ground impulses are transmitted after the transmission of the last switch control loop impulse. At the fourth party subscriber substation 201P4, the cam 287 thereat will control the cam springs 288 so that two station identifying ground impulses are transmitted, in the same positions during the return movement of the finger plate as the first and third impulses are transmitted by the cam 285 at the third party subscriber substation 201P3. At the fifth party subscriber substation 201P5, the cam 290 thereat is arranged so that it will control cam springs 291 to transmit the single station identifying ground impulse in the same position as the third impulse transmitted by the cam 285 at the third party subscriber substation 201P3.

It should be noted that in the present telephone system, code storage registering apparatus and code marking conductors are employed for the purpose of registering various digits and for transferring registered digits from one unit to another. The combinational code employed is generally referred to as a four pulse of WXYZ code and is of the type wherein any digit from 1 to 9, inclusive, and 0 may be registered and transmitted by operating any one or any two of four relays or by marking any one or any two of four marking conductors in accordance with the following code:

| Digit: | Code |
|---|---|
| 1 | WX |
| 2 | WY |
| 3 | WZ |
| 4 | XY |
| 5 | XZ |
| 6 | YZ |
| 7 | W |
| 8 | X |
| 9 | Y |
| 0 | Z |

*Initiation of a call*

A description will now be given of the operation of the switching apparatus included in the FLorida 3 exchange and for this purpose it will be assumed that a call is initiated by a party subscriber at one of the substations on the party line shown in FIG. 2.

When a calling subscriber removes a receiver at his telephone instrument, the usual loop circuit, including the line conductors 202 and 203 and the impulsing springs at the calling station is completed for operating the lines circuit 205. In response to the completion of the loop circuit the line circuit 205 initiates operations whereby the distributor 242 will select a line finder, such as 240, by way of the rotary switch 241 and the line circuit will mark the terminals of the calling party line in the bank contacts accessible to a group of line finders including the line finder 240.

It will be assumed that the rotary switch 241 selects the line finder 240 and as a result thereof completes a circuit including the start relay R210. This start relay corresponds to the relay R140 shown in FIG. 1 of the previously noted Bakker Patent No. 2,289,896 and reference may be had to this patent for the complete description of the operation of the line finder. As soon as the relay R210 operates, at its contacts 211, it applies battery potential by way of the resistor 212, conductor C245, contacts 316 and 323, the lower winding of the line relay R330, eleventh rotary step cam contacts 348 and ground. The line relay R330 in the primary selector 300 now operates to initiate operations whereby the director hunter 250 will search for an idle director.

In addition to the foregoing, the start relay R210 completes circuits (not shown) for controlling the line finder 240 to operate its wipers 234 to 238, inclusive, in a vertical direction to search for the level in the associated banks terminating the calling party line and then in a rotary direction to find and connect with the bank contacts terminating the calling line circuit 205 all in a well known manner. Thus, it is apparent that the start relay R210 in the line finder 240 simultaneously operates the line relay R330 in the primary selector 300 and it initiates the hunting operation of the line finder 240 to search for a calling line. As soon as the line relay R330 operates it completes a circuit including the contacts 328 and 332 for operating the hold relay R340. At its contacts 341, the hold relay R340 applies ground potential by way of the contacts 318, the busy key contacts 309 and the conductor C246 to the line finder 240 in order to retain the latter switch and the line circuit 205 in their operated positions after the line finder finds the calling line circuit. Also, at its contacts 341, the hold relay R340 applies ground potential by way of the eleventh rotary step cam contacts 366, contacts 327 and 342, vertical off-normal contacts 391 and the upper winding of the transfer relay R350 to battery. The relay R350 operates over this circuit and at its contacts 354 completes a circuit including the winding of the test relay R310, contacts 252 and the winding of the magnet M251 to battery. However, due to the circuit including the contacts 355, 313', the conductor 307G and the wiper 259 on the director hunter 250, the above circuit for operating the director test relay R310 is short circuited as long as the wiper 259 encounters a grounded bank contact.

The ground potential encountered by the wiper 259 will complete a circuit for the magnet M251 which is independent of the previously traced cricuit, including the winding of the relay R310, so that the magnet M251 can advance the wipers 253 to 260, inclusive, step-by-step to search for an idle director. An idle director will be indicated by an absence of ground on the conductor corresponding to the conductor 274G and, therefore, the stepping circuit for the magnet M251 is interrupted. When this occurs, the short circuit for the director test relay R310 is removed therefrom so that the previously traced circuit, including the contact 354, the relay R310 and the magnet M251 is completed. The relay R310 operates in series with the magnet M251 but due to the resistance of the relay R310, the magnet M251 does not operate at this time. As a further result of the operation of the director test relay R310, at its contacts 312', it now applies ground potential to the conductor 307G in order to mark the seized director busy to all other director hunters, such as the director hunter 250, having access thereto. Furthermore, at its contacts 311 and 314, the relay R310 transfers the conductors C244 and C245 from the circuit including the windings of the line relay R330 to a circuit including the conductors 301LR and 302LT extending by way of the director hunter 250 to the controller 400 of FIG. 4. Simultaneously therewith, the relay R310, at its contacts 312 and 315, connects the circuit including the windings of the relay R330 to the conductors 303R and 304T of the director hunter 250 to the call register (FIGS. 9 to 11, inclusive) and to the call recorder (FIGS. 19 to 21, inclusive).

Figure 4:
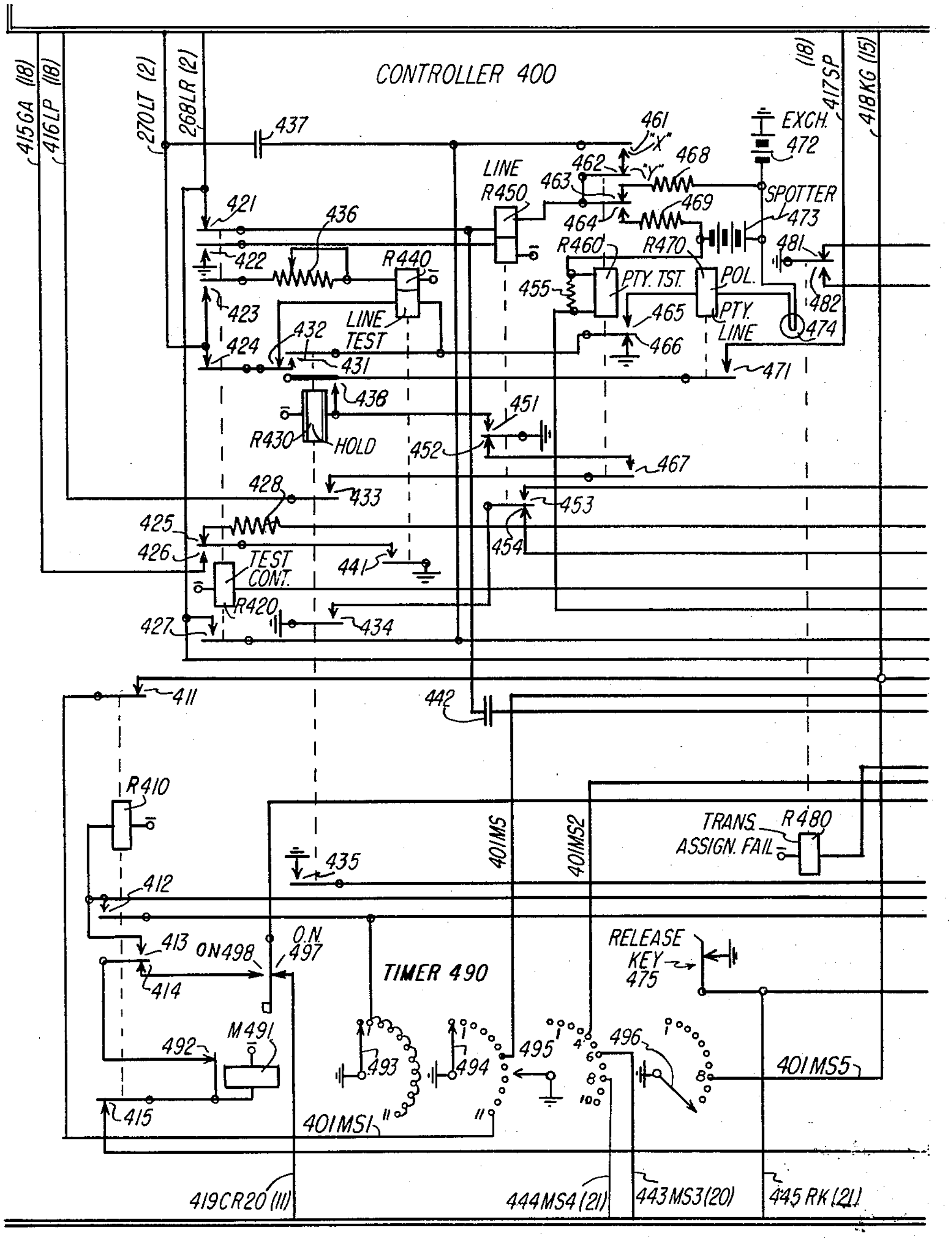

More specifically, the loop circuit from the calling subscriber line now extends over a first branch including the conductor C244, contacts 311, conductor 301LR, wiper 253, conductor 268LR extending to FIG. 4, contacts 421, the upper winding of the line relay R450, contacts 463, resistor 468 and the negative terminal of the 50 volt exchange battery 472 to ground. The other branch of the loop circuit from the calling subscriber line includes the conductor C245, contacts 314, conductor 302LT, wiper 255, conductor 270LT extending to FIG. 4, contacts 424 and 432, the lower winding of the line test relay R440 and ground at contacts 466.

It will be appreciated that during the time that the director hunter 250 is searching for an idle director, the line finder 240 is also searching for the calling subscriber line. If the director hunter 250 finds an idle director before the line finder 240 finds the calling line, then the resistance battery applied to the conductor C245 by the operated start relay R210 is extended by way of the contacts 314, conductor 302LT, wiper 255, conductor 270LT extending to FIG. 4, contacts 424 and 432, the lower winding of the test relay R440 to ground at contacts 466. This will cause the line test relay R440 to operate at this time and apply ground potential by way of its contacts 441, contacts 425, resistor 428, conductor 273H extending to FIG. 2, wiper 258, conductor 306H, contacts 311', winding of the director test relay R310, contacts 252 and the winding of the magnet M251 to battery. This circuit will hold the director test relay R310 locked in its operated position under control of the director during the time that the line finder 240 continues to search for the calling subscriber line.

As soon as the line finder 240 finds the calling subscriber line, it switches through, in a conventional manner, and connects the calling subscriber loop circuit including the conductor C229 and C230 to the conductors C244 and C245. In addition to the foregoing, the line finder also dismisses the distributor 242 so that the latter mechanism is available for use in distributing line finders for use by other calling subscriber lines. Furthermore, the switch-through operation of the line finder 240 causes the restoration of the start relay R210 in order to remove the resistance battery potential from the conductor C245. This operation would normally cause the restoration of the line test relay R440 in the controller 400, but due to the fact that the line finder has switched through the calling subscriber loop circuit to the conductors C244 and C245, the above-traced circuit is now completed for the upper winding of the line relay R450 in series with the circuit for the lower winding of the line test relay R440. Consequently, the line relay R450 now operates and completes at its contacts 451 an obvious circuit for operating the hold relay R430 and the latter relay, at its contacts 431 and 432, disconnects the lower winding of the line test relay R440 from the previously traced loop circuit including the upper winding of the line relay R450. The line test relay R440 now restores to normal and, at its contacts 441, will interrupt a point in the previously traced circuit for locking the director test relay R310 in its operated position, but a holding ground potential will be maintained on the conductor 273H as soon as the seizure relay R640 operates.

As a further result of the operation of the hold relay R430, at its contacts 435, it completes an obvious circuit for operating the seizure relay R640. The relay R640, at its contacts 644, now connects the hold relay R720 by way of the contacts 684 and 644, conductor 273H extending to FIG. 2, wiper 258, conductor 306H, contacts 311', the winding of the director test relay R310, contacts 252 and the winding of the rotary magnet M251 to battery. In this circuit the relay R310 is retained in its locked position and the hold relay R720 operates in series therewith.

In view of the foregoing description, it will be understood that the line relay R450 in the controller 400 portion of the director operates as soon as the line finder 240 switches through to connect with the calling subscriber line. The latter relay in turn operates the hold relay R430 and the hold relay R430 in turn operates the seizure relay R640 and the latter relay causes the operation of the hold relay R720.

Referring again to the primary selector 300, it should be noted that as soon as the director test relay R310 operates and connects the line relay R330 to the conductors 303R and 304T, the line relay R330 restores to normal. As a result thereof, it interrupts at its contacts 332, the circuit for the hold relay R340 and the latter relay slowly restores to normal to interrupt, at its contacts 341, the previously traced circuit for the transfer relay R350 which also restores to normal. Consequently, the primary selector 300 is now fully restored to normal except for the operated director test relay R310. The holding ground potential that was applied to the conductor C246 by the contacts 341 on the primary selector 300 is now applied to the conductor C246 over a circuit including the busy key contacts 309, contacts 317, conductor 305LS, wiper 257, conductor 272LS extending to FIG. 21 and ground at contacts 2172. Thus, the line finder 240 and the line circuit 205 are held in their operated positions under control of the holding ground applied to the conductor C246 from the call recorder 2000 portion of the director.

Referring now to the controller 400 portion of the director, it will be recalled that the seizure relay R640 operated as described above in response to the completion of the circuit therefor by the operation of the hold relay R430. As soon as the seizure relay R640 operates, it prepares at its contacts 645, a point in the circuit for the digit relay R740 which will remain in its operated position during the transmission of the pulses under control of the contacts 454 on the line relay R450. At its contacts 641, the relay R640 completes a circuit for operating the director busy relay R510 and the latter relay, at its contacts 511, applies ground potential to the conductor 274G extending to FIG. 2 in order to mark the present director busy in the bank contacts of all of the director hunters, such as 250.

As a further result of the operation of the seizure relay R640, at its contacts 642', it applies ground potential to the conductor 605CR29 extending to FIG. 16 in order to operate the relay R1670 in the sender portion of the director. Other contacts controlled by the operation of the seizure relay R640 provide various relay holding and locking ground potentials which need not be explained at the present time.

Finally, at the contacts 643', the seizure relay R640 connects the two-second pulse conductor C656 to a circuit including the contacts 415 and the winding of the magnet M491 on the timer 490. A ground pulse of short duration is applied to the conductor C646 every two seconds by a time interrupter (not shown) so that the magnet M491 will operate and restore every two seconds as long as the above mentioned circuit is retained. Each time the magnet M491 operates and restores it advances its wipers 493 to 496, inclusive, one step in the clockwise direction. The timing circuit, as will be understood from a later description, allows approximately 24 to 36 seconds for the calling subscriber to dial a called number after the controller 400 portion of the director has been seized. Other controls are exercised under control of the timer 490 to determine whether or not the first digit has been dialed by the calling subscriber within 12 seconds, to determine whether or not the translator assigner has been operated to assign a translator within 22 seconds, and various other time controls to be described subsequently.

As soon as the hold relay R720 operates in the manner described, it locks itself by way of its contacts 722 to the previously traced circuit, including the conductor 273H, by way of a circuit that is independent of the contact 684. As a further result of the operation of the hold relay R720, at its contacts 723, it completes a circuit including the contacts 655 and 634 for operating the class test relay R620. The operation of the relay R620 initiates a test whereby a determination is made of the class of the calling line as is indicated by the particular potential applied to the conductor 308S in the primary selector 300 being used in the present call by the calling subscriber.

It was previously mentioned that the calling subscriber line may be provided with any one of three different classes of service. The class of service of the particular calling subscriber line is indicated to the director by a marking placed on the conductor 308S. Different groups of primary selectors will have different potentials applied to the conductor 308S to indicate corresponding different groups of lines of different classes. In the primary selector 300, the contacts 357 may be disconnected to indicate class 1; it may be connected to the ground potential to indicate class 2; and it may be connected to battery potential by way of the resistance 393 to indicate class 3. Thus three different classes of service may be indicated respectively by a connection of a ground potential, by the connection of a resistance battery potential or by the absence of any potential connected by way of the contacts 357, 322', and 314' to the conductor 308S and then by way of the wiper 260, conductor 275S extending to FIG. 6 and the contacts 622 and the winding of the class 2 test relay R580 to battery. A test is consequently made at this time to determine whether or not the ground potential of a class 2 calling line has been applied by the primary selector 300 to this circuit. If the class 2 test relay R580 operates, it will lock itself in its operated position over a circuit including its contacts 582 and ground at contacts 642. Also, at its contacts 583 a circuit including ground at contacts 614, conductor 519CL2 extending to FIG. 23 is prepared whereby the class indication is transmitted to the translator. A similar circuit may also be completed for illuminating a lamp (not shown) indicative of a class 2 call.

In the event that the calling line is not a class 2 line, the class 2 test relay R580 will remain in its restored position. Within a short period of time after the initial operation of the class test relay R620, the slow-to-operate control relay R630 operates and at its contacts 634 opens the circuit for the relay R620 which now restores to normal. As a result of the latter restoration, the class marking on the conductor 275S is now connected by way of the contacts 621, 631, and 611, winding of the class 3 test relay R610 and ground at contacts 642. If the calling line is of the class 3 type, the conductor 275S will have resistance battery potential thereon in order to operate the class 3 test relay R610. At its contacts 612, the relay R610 will lock itself by way of the resistance 615 to battery and, at its contacts 611, it will interrupt its initial energizing circuit. Furthermore, at its contacts 613, the class 3 test relay R610 will apply ground potential to the conductor 519CL3 extending to FIG. 23 in order subsequently to indicate the class of the calling line to the translator. Furthermore, the relay R610 may be provided with additional contacts, such as 613, to illuminate a lamp to indicate the class 3 calling subscriber line.

In the event that neither the class 2 test relay R580 nor the class 3 test relay R610 is operated due to the fact that no potential has been applied to the conductor 275S from the primary selector 300, a circuit including the contacts 614 and 584 would be completed for grounding the conductor 519CL1 extending to FIG. 23 to indicate that the call is of the class 1 type. Also, a similar circuit may be completed for illuminating a class 1 lamp individual to the calling director.

As a further result of the restoration of the class test relay R620 and before the restoration of the control relay R630, a circuit including the contacts 623 and 632 is completed for operating the class control relay R650 which locks itself by way of its contacts 651 to ground at contacts 642. Additional controls exercised in response to the operation of relay R650 will be described hereinafter.

In the above description, it was noted that the relay R630 operated under control of the class test relay R620. At its contacts 633, the relay R630 completes a circuit for operating the test control relay R240 in order to connect the upper winding of the line test relay R440 to the previously traced circuit including the conductor 270LT.

More specifically, as soon as the test control relay R420 operates it completes, at its contacts 422, an abvious circuit for energizing the lower winding of the line relay R450 in order to hold the latter relay operated when the circuit for the upper winding thereof is opened at contacts 421. As a further result of the operation of relay R420, at its contacts 421, it disconnects the battery potential from the exchange battery 472 through the line relay R450 from the conductor 268LR; and, at its contacts 424, it disconnects the ground potential at the contacts 466 from the conductor 270LT. At its contacts 423, the relay R420 connects battery potential by way of the upper winding of the relay R440 and the resistor 436 to the conductor 270LT to test the tip side of the calling subscriber line to determine whether or not the line has been falsely grounded. If there is a low resistance ground leak on either the tip conductor 203 of the calling subscriber line or the ring conductor 202 of the calling subscriber line, the line test relay R440 will now operate. As a result of the operation of relay R440, ground potential, at its contacts 441, will be extended by way of the contacts 426 and conductor 415GA extending to FIG. 18 to operate the grounded line relay R1820 in the coder 1800. This relay, upon operating, will lock itself by way of the contacts 1824, contacts 1812, conductor 615LGC extending to FIG. 6 to ground at contacts 641′ on the operated seizure relay R640. The line test relay R440 is adjusted so that it will operate only when the ground resistance values of the resistance ground leak on a calling line is less than 10,000 ohms.

Shortly after the above-traced circuit is completed for opertaing the test control relay R420, whereby the above-described line test may be made by the relay R440, the slow-to-operate control relay R630 restores to normal and, at its contacts 633, opens the circuit for the test control relay R420. The relay R420 now restores to normal in order to reconnect the conductors 268LR and 270LT to the previously traced circuits including the upper winding of the line relay R450 to battery and to ground at contacts 466. Therefore, the line relay R450 is retained operated from ground at contacts 422 when the grounded line test is being made and it is retained operated over the loop circuit including the conductors 268LR and 270LT as soon as the test is terminated. Also, the restoration of the test control relay R420 will cause the restoration of the line test relay R440 in the event that the latter relay has been operated. It will be appreciated, however, that if no ground potential is found on the calling subscriber line at the time the relay R420 is operated to perform the test, the relay R440 will remain in its restored position and will thus prevent the registration of a false ground condition on the relay R1820 in the coder 1800.

After the foregoing class test and grounded line test has been made, the class control relay R650 is operated and locked in its operated position in the manner previously described. As soon as the latter relay operates, it interrupts, at its contacts 655, a point in the previously described initial operating circuit for the class test relay R620 thereby to prevent the latter relay from operating incident to the restoration of the control relay R630. Finally, at its contacts 654, the relay R650 connects the dial tone signal applied to the dial tone conductor C527 by way of the contacts 532, 654, 664, tone condenser 442 to the previously traced loop circuit, including the calling subscriber line. In this manner the dial tone signal is transmitted to the calling subscriber to indicate that the digits of the called subscriber number may be dialed.

*Dialing the called number*

When the calling subscriber hears the dial tone signal, he may manipulate the dial at his substation in accordance with the code portion and the numerical portion of the called subscriber directory number. More specifically, the calling subscriber may dial the first two letters of the desired called exchange, then the numerical digit of the particular called exchange followed by the four digits of the numerical portion of the called number. The two letters and the digit designating the called exchange are referred to as the called office code and are sometimes identified as the ABC digits of the called number.

From the above description, it will be understood that each subscriber number comprises seven digits and in certain instances, as previously pointed out, certain exchanges are identified by only a two digit code instead of the usual three digit code. In other words, the called subscriber will then be identified by a six digit instead of a normal seven digit number.

When the first digit is dialed by the calling subscriber, the line relay R450 (FIG. 4) follows the pulses of the digit in the well known manner to register this digit in the call register 900.

In response to the interruption of the calling subscriber loop circuit by the impulsing contacts, such as the contacts 292, the line relay R450 (FIG. 4) will restore and reoperate the same number of times as the number of interruptions of the digit dialed. On the first interruption of the loop circuit, that is the first impulse, the line relay R450 will momentarily restore to normal to complete, at its contacts 454, a circuit for operating the first digit register 1020 of the call register 900. This circuit may be traced from ground, and then by way of the contacts 434, 454, 662, and 686, conductor 604CR19 extending to FIG. 10 wiper 1014 of the receive sequence switch 1010 in engagement with the contact 1 in the associated contact bank, conductor 1001 and the winding of the magnet M1021 of the first digit register 1020 to battery. In this circuit particular attention is directed to the fact that the sequence switch 1010 is arranged so that it will transfer the above-mentioned impulsing circuit, including the conductor 604CR19 to each of the digit registers 1020 to 1140, inclusive, so that the seven digits dialed by a calling subscriber will be registered respectively in each of the seven digit registers over the conductors 1001 to 1007, respectively. The conductors 1062 to 1065, inclusive, are utilized whenever more than seven digits have been dialed by the calling subscriber and in particular when a ten or an eleven digit national toll call is dialed.

The above-mentioned impulsing circuit includes a branch circuit which is completed from ground at contacts 434, 454, 662, and 645, rectifier 733 and the winding of the digit relay R740 to battery, whereby, the latter relay is operated and maintained operated during the dialing of each digit and restores to normal during the interdigital pause between the transmission of successive digits. As soon as the digit relay R740 operates, it completes, at its contacts 741, an obvious circuit for operating the sequence control relay R730. Since the digit relay R740 is of the slow-to-release type, it remains in its operated position during the pulsing of each digit and, consequently, retains the sequence control relay R730 operated during the dialing of each digit.

In view of the impulsing circuit traced above for controlling the magnet M1021 of the first digit register 1020, it will be understood that each time the line relay R450 restores it will cause the restoration of the magnet M1021 a corresponding number of times. Therefore, the impulses of the first digit will control the magnet M1021 to register the first dialed digit in the first digit register 1020 In other words, the wipers 1023 to 1028, inclusive, will be advanced step-by-step in a counter-clockwise direction to a position corresponding to the number of impulses constituting the first digit.

At the end of the dialing of the first digit, the line relay R450 remains in its operated position to interrupt at the contacts 454 the above-described impulsing circuit to the magnet of the first digit register 1020. Also, it will open the multiple circuit for the digit relay R740 which slowly restores to normal, and, at its contacts 741, causes the restoration of the sequence control relay R730.

It will be recalled that the sequence control relay R730 operated as soon as the first impulse was transmitted to the register 1020 under control of the line relay R450. At its contacts 732, the relay R730 completes a circuit for operating the tone control relay R530. Also, at its contacts 731 the sequence control relay R730 applies ground potential to the conductor 703SEQ extending to FIG. 10 in order to operate the magnet M1011 of the receive sequence switch 1010. This magnet is retained in its operated position during the dialing of each digit and is restored at the end of the dialing of each digit to advance its wipers 1013 to 1017, inclusive, one step in a counter-clockwise direction.

Referring now to the tone control relay R530, it will be seen that in response to its operation it interrupts, at its contacts 532, the previously described circuit whereby dial tone is transmitted to the calling subscriber. Also, at its contacts 531, the relay R530 interrupts a point in the circuit including the conductor 401MS from the timer 490 to prevent the timer from transmitting the signal at the end of 12 seconds indicative of the failure of a calling subscriber to dial the first digit within this period of time.

Finally, at its contacts 533, the relay R530 locks itself to ground potential at the contacts 643 on the operated seizure relay R640.

At the end of the dialing of the first digit, the digit relay R740 and the sequence control relay R730 restore to normal, as noted above, and at its contacts 731, ground is removed from the conductor 703SEQ to permit the receive-sequence switch 1010 to advance its wipers into engagement with the contacts 2 in the associated contact banks. The wiper 1014 of the receive sequence switch 1010 is now in a position to cause the impulses of the second digit dialed by the calling subscriber to be transmitted over the conductor 1002 to the second digit register 1030. When the wiper 1017 of the receive sequence switch 1010 engages contacts 2 in the associated contact bank, ground potential is extended by way of the conductors 602AEO to FIG. 6 and then by way of the contacts 652 and the winding of the relay R460 in multiple with the resistor 455 to the negative terminal of the 50 volt spotter battery 473 in series with the negative terminal of the exchange battery 472. The party test relay R460 is operated over this circuit to prepare the controller 400 to receive the loop digits constituting the second digit dialed by the calling subscriber and also the special ground pulses identifying the particular calling station on the party line.

The party test relay R460 quickly operates over the above-traced circuit to prepare, at its contacts 465, a point in the circuit for controlling the party line relay R470. Also, the relay R460 closes its X contact 461 before the Y contacts 462 are opened in order to bridge the condenser 437 across the line relay R450 by way of the conductors 270LT and 268LR. The condenser discharges through the winding of the relay R450 to retain the same in its operated position during the momentary interruption of its initial circuit by the opening of contacts 463 before contacts 464 close. At its contacts 463 and 466, the party test relay R460 disconnects the exchange battery 472 and the ground potential from the previously traced loop circuit, including the calling subscriber line and, at its contacts 464 and 465, it now connects the subscriber's loop to a circuit including in series, high speed polarized party line relay R470, lamp 474, the 50 volt spotter battery 473 and the resistor 469.

Attention is directed to the fact that the party line relay R470 is connected in the calling subscriber line loop only after the dialing of the first digit and it will be disconnected from the loop circuit after the second digit has been dialed. The direction of current flow through the party line relay R470, however, is in a direction that will prevent operation of the relay until a ground pulse is transmitted from the calling subscriber substation on a party line.

Since each party station is provided with a special calling device of the type disclosed in the previously noted Ostline Patent No. 2,410,520 having the special cams of the type schematically illustrated in FIG. 2, ground pulses indicative of the particular station on the party line will be transmitted during the return movement of the calling device as a second digit is transmitted.

If the calling subscriber substation involved in the present connection happens to be one that is provided with a regular calling device having conventional construction without the station identifying cam contacts, then the pulses transmitted by the impulsing springs, such as 292, will only control the line relay R450 over the above-mentioned loop circuit, but no control will be exercised over the party line relay R470. In other words, impulses corresponding to the second digit dialed will be repeated by the line relay R450, at its contacts 454, to the second digit register 1030 (FIG. 10) in substantially the same manner that the first digit was transmitted to the first digit register 1020. The pulses of the second digit will also be repeated by way of the contacts 452, 467, and 433 to the conductor 416LP but these pulses will be disregarded.

*Dialing the second digit from the party station*

If the calling station is provided with a special calling device, as previously noted, then the party line relay will respond to the ground pulses transmitted during the return movement of the dial.

More specifically, the dial, for example, at the substation 201P1 during its return movement will cause the cam 281 to close the contacts 282 to transmit a single ground pulse over the line conductors 202 and 203 and the previously-traced loop circuit to the conductors 268LR and 270LT (FIG. 4). The ground pulse on the conductor 270LT will be transmitted by way of the contacts 424, 431, 465, winding of the party line relay R470, lamp 474 and the negative terminal of the exchange battery 472 to ground. The current flow in the winding of the relay R470 will be in a direction to quickly operate the same. The ground pulse appearing on the conductor 268LR will retain the line relay R450 operated by way of a circuit including the contacts 421, 464, resistor 469, and the negative terminal of the spotter battery 473. At the end of the transmission of the single ground pulse over the above-traced circuit, the party line relay R470 will restore because the direction of the current flow through the relay will be such that it will immediately restore to normal.

It should be understood from the foregoing description of the transmission of a station identifying ground pulse by the dial at the party station 201P1 that the ground pulses transmitted from the dials provided respectively at the remaining party subscriber substations will control the party test relay R460 and also the line relay R450 in substantially the same manner.

Each time the party line relay R470 operates it completes, at its contacts 471, a circuit that includes ground at contacts 451, contacts 438 and 471, conductor 417SP extending to FIG. 18, upper break contact and upper winding of relay R1870P5 to battery. The relay R1870P5 operates and locks itself by way of its lower X contact to the conductor 1204SAL extending to FIG. 12, contacts 1212, conductor 605CR29 extending to FIG. 6 and contacts 642' to ground.

During the return movement of the calling subscriber dial, the above-mentioned single station identifying ground impulse is transmitted just prior to the time that the loop impulsing contacts 292 are opened to transmit the next to the last loop impulse.

The next to the last loop impulse controls the line relay R450 in the usual manner and, at its contacts 452, will complete a circuit including the contacts 452, 467, 433, conductor 416LP extending to FIG. 18, inner upper make contacts on the operated relay R1870P5, inner upper break contact and upper winding of the relay R1870P1 to battery in order to operate the last-mentioned relay. At its inner X make contact, the relay R1870P1 also locks itself to the grounded conductor 1204SAL. The last loop impulse transmitted by the calling subscriber dial will control the relay R450 in the usual manner but inasmuch as the conductor 416LP is not connected to any of the party station relays in FIG. 18, only the relays R1870P1 and P5 will be in their operated positions at the end of the dialing of the second digit to identify station 1 as the calling station on a party line.

The relays R1870P1 to R1870P5, inclusive, shown in FIG. 18, are operated in a predetermined sequence by the pulses transmitted over the conductors 416LP and 417SP under control of the different party subscriber dials. The R1870 relays are operated by the different pulses to identify the different stations on a five-party line as follows:

| Pulses | First ground | Next to last loop | Second ground | Last loop | Third ground |
|---|---|---|---|---|---|
| Station: | | | | | |
| 1 | P5 | P1 | ----- | ----- | ----- |
| 2 | P5 | P1 | P4 | P2 | ----- |
| 3 | P5 | P1 | P4 | P2 | P3 |
| 4 | P5 | P1 | ----- | ----- | P4 |
| 5 | ----- | ----- | ----- | ----- | P5 |

From the foregoing, it will be seen that station 1 is identified in response to the operation of relay R1870P5 by the first ground pulse and the operation of relay R1870P1 by the following loop pulse, which is the next to the last loop impulse transmitted during the return movement of the dial. Station 2 is identified by the transmission of two ground pulses and two loop pulses which cause the operation of relays R1870P5, R1870P1, R1870P4, and R1870P2 in the order named. Station 3 is identified by the transmission of three ground pulses and two loop pulses which cause the operation of relays R1870P5, R1870P1, R1870P4, R1870P2, and R1870P3 in the order named. Station 4 is identified by the transmission of two ground pulses and one loop pulse, with the second ground pulse being transmitted after the last loop impulse during the return movement of the dial to operate relays R1870P5, R1870P1, and R1870P4 in the order named. Finally, the station 5 is identified by the transmission of a single ground pulse immediately after the last loop impulse during the return movement of the dial to operate only the relay R1870P5.

With the different party station relays R1870P1 to R1870P5 operated as shown above, the different station identifying marking conductors 1891P1 to 1895P5 will be marked to identify the different stations. Also, the conductor 1896POX will be marked if all of the party station relays R1870P1 to R1870P5, inclusive, remain in their restored positions. These conductors extend to FIG. 19 where the markings thereon are utilized to control the operation of the detector 1900.

After the impulses constituting the second digit of the called subscriber directory number have been transmitted from the calling station, the line relay R450 and the hold relay R430 are retained in their operated positions and cause the digit relay R740 and sequence control relay R730 to restore to normal in the same manner previously described. The sequence control relay R730, at its contacts 731, removes the ground potential from the conductor 703SEQ extending to FIG. 10 so that the magnet M1011 of the receive sequence switch 1010 will restore to normal and advance its wipers 1013 to 1017, inclusive, from engagement with the contacts 2 into engagement with the contacts 3 in the associated bank. The disengagement of the wiper 1017 from the second bank contact, including the conductor 602AEO extending to FIG. 6, interrupts the previously traced circuit for the party test relay R460. This relay now restores to normal and disconnects the party line relay R470 from the subscriber loop circuit and it re-establishes, at its contacts 466 and 463, the original loop circuit for the line relay R450.

Incident to the advancement of the wiper 1014 into engagement with the contacts 3 in the associated bank, a circuit is prepared including the conductor 1003 for controlling the magnet 1041 of the third digit register 1040.

*Dialing the third digit*

The third digit of the called subscriber number dialed by the calling subscriber will now control the line relay R450 in the same manner as previously described in connection with the operations resulting from the first dialed digit, to register the third digit of the called number in the third digit register 1040.

At the present time, the called office code digits are registered in code form in the first, second, and third digit registers 1020, 1030, and 1040. For this purpose, the wipers 1024 and 1025 of the first digit register 1020 are arranged so that they will ground the conductors WXYZ21 in the cable 1101 extending to FIG. 14 in accordance with the previously described WXYZ code.

The wipers 1034 and 1035 of the second digit register will mark the WXYZ22 conductors in accordance with the second digit and the wipers 1044 and 1045 will mark the WXYZ23 marking conductors in the cable 1101 in accordance with the third dialed digit. The same code markings are also applied to the conductor WXYZS21 to WXYZS23, inclusive, extending in the cable 1073 to the codexer X2300A where they will be further extended to register the first three dialed digits in the register relays provided in the codexer X2300A.

In the description thus far of the operation of the call register 900, it has been assumed that each of the first three digits dialed by the calling subscriber have been registered respectively in the three digit registers 1020, 1030, and 1040. However, FIG. 9 shows a plurality of control relays and a terminal block that are utilized in conjunction with the above-noted registers so that various controls may be exercised over the primary selector 300 involved in the connection depending upon the values of the different digits registered in the above-noted registers.

By means of suitable strappings on the terminal block TB909, and responsive to certain of the called office code numbers which are used only in completing local calls in the FLorida 3 exchange and which never require a translation, the primary selector 300 can be controlled to operate during the dialing of the second or during the dialing of the third digit and the director will be released from the director hunter 250 after the primary selector 300 has been stepped to the level corresponding to the controlling digit.

Another condition that may exist, involves the operation resulting when the called office code digits are shared with other exchanges and in which it is not necessary to make a translation of the registered code digits to complete a connection. Under this condition, the primary selector 300 may be controlled during the dialing of the second or during the dialing of third digit, but the director will be released only after the dialing of the third digit. In this type of operation, the primary selector 300 may be stepped during the dialing of the second digit and as a result thereof will seize a subsequent switch train whereupon a switch in the latter switch train will be controlled during the dialing of the third digit.

Under still other conditions, it may be necessary to translate the called office code and at the same time operate the primary selector 300 during the dialing of the second digit or the dialing of the third digit. Under this condition the primary selector will be released at the end of the third digit, but the director is retained in its operated condition until all subsequent digits are registered therein and the call is processed with the regular translation to complete the connection to the desired destination.

In order to describe the operation of the primary selector 300 to control its wipers during the dialing of the second digit and its subsequent action depending upon the value of the third digit dialed, it will be assumed that the called office code digits dialed by the calling subscriber are included in the code block "27".

Referring now to FIG. 10 it will be seen that if the first digit 2 of the code block 27 is registered in the first digit register 1020, the wiper 1026 will be in engagement with the contact 2 and the terminal 2 on the terminal block TB1029 will be strapped to the LA terminal on the terminal block to complete a circuit for operating the first digit 2 relay R910. To complete the operating circuit for this relay, it will be recalled that the receive sequence switch 1010 during the dialing of the first digit 2 has its wipers in engagement with the contacts 1 and during the interdigital pause between the dialing of the first and second digits, the sequence switch 1010 advances its wipers into engagement with the contact 2. When this occurs, ground potential applied to the wiper 1015 over the conductor 871LGR is now connected by way of the engaged contact 2, wiper 1026 of the first digit register 1020, engaged contact 2 in the associated contact bank and then over the above-traced circuit to operate the relay R910. As soon as the relay R910 operates it prepares, at its contacts 914, a point in a circuit traced hereinafter for locking the block translation relay R930 in its operated position and it also prepares, at its contacts 913, a point in the circuit for operating the relay R950 in the event that the second digit 7 is dialed.

Figure 6:
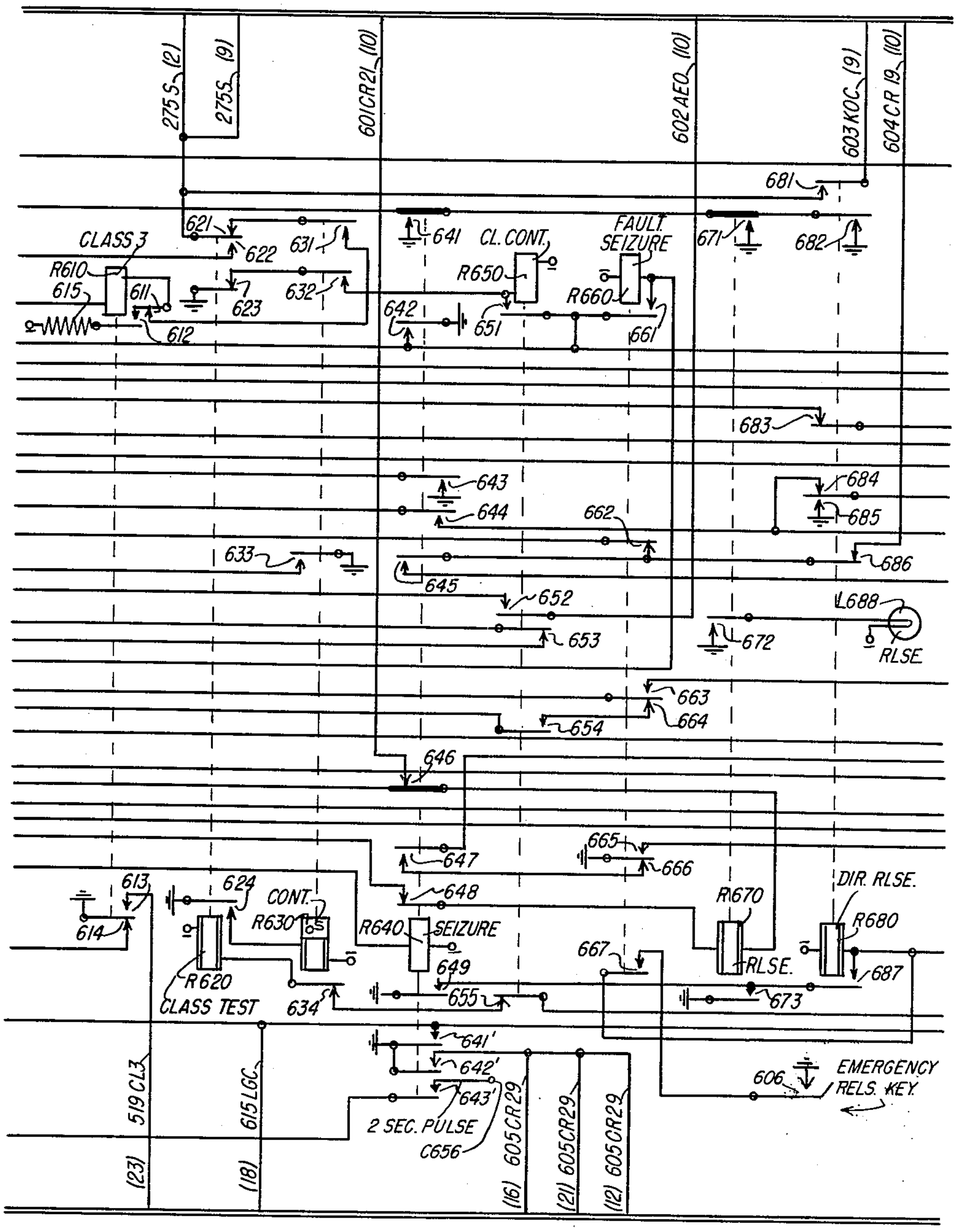

At its contacts 912, the relay R910 applies ground potential by way of the contacts 951, 941, and conductor 275S extending to FIG. 6, the conductor 275S extending to FIG. 2, wiper 260, conductor 308S, contacts 314′ and 322′ to prepare a point in the circuit for controlling the transfer relay R350 in the primary selector 300 so that the latter relay will remain in its operated position and prevent rotation of the wipers 363 to 365, inclusive.

As a further result of the operation of relay R910, at its contacts 915, the ground is applied to the conductor which is connected to the terminal L on the terminal block TB909 that in turn is jumpered to the terminal PB thereon to complete a circuit for operating the block translation relay R930. The latter relay upon operating completes, at its contacts 933, a locking circuit for itself which includes the contacts 914. Also, at its contacts 934, it interrupts a point in the circuit including respectively, the conductors 515CR18 and 1067SA4 in order to prevent the director from requesting the use of a translator 2700. Also, at its contacts 931, the relay R930 interrupts a point in the circuit including the conductor 809TY and 901TYO to prevent the operation of the relay R1850TY in the coder 1800 portion of the director.

Finally, at its contacts 932, the relay R930 connects the pulsing circuit including the conductor 504RA to the conductor 269R so that the primary selector 300 will be controlled during the dialing of the second digit. This pulsing circuit can best be traced by referring to the upper winding of the line relay R330 in the primary selector 300 (FIG. 3). It will be seen that the circuit for operating the line relay R330 includes battery, the upper winding of the relay, contacts 321 and 312, conductor 303R, wiper 254, conductor 269R extending to FIG. 9, contacts 932 and 911, conductor 504RA extending to FIG. 5, resistor 535, contacts 554, 453 and 434 to ground. Since the line relay R450 in the controller 400 is in its operated position during the interdigital pause between the dialing of the first and the dialing of the second digits, the line relay R330 in the primary selector 300 immediately operates when the above-traced circuit is completed.

At its contacts 332, the relay R330 completes an obvious circuit for operating the hold relay R340 and the latter relay completes, at its contacts 341, a circuit including the contacts 366, 327, 342, and vertical off-normal contacts 391 to operate the transfer relay R350 over its upper winding. The relay R350 in turn, at its contacts 351, prepares a point in the circuit for operating the marginal rotary stepping relay R360. The latter relay, however, does not operate at this moment.

The second digit dialed by the calling subscriber will control the line relay R450 in the controller 400, whereby the contacts 453 will repeat the impulses to the line relay R330 of the primary selector 300 at the same time the contacts 454 are repeating the impulses over the previously tracted circuit to the second digit register 1030.

In response to the registration of the second digit 7 in the second digit register 1030, the wipers 1033 to 1037, inclusive, will be in engagement with the contacts 7 in the associated contact banks. The grounded wiper 1036 in engagement with the contact 7 will complete a circuit including the terminal LB of the terminal block TB1038, the winding of the relay R950 and battery at contacts 913 in order to operate the relay R950.

At its contacts 953, the relay R950 connects the circuit including the winding of the relay R910 by way of the contacts 963 to the grounded conductor 871LGR in order to hold the relay R910 in its operated position after the wiper 1015 on the receive sequence switch 1010 is advanced into engagement with the contacts 3 at the end of the interdigital pause between the dialing of the second and the third digits. As a further result of the operation of relay R950, at its contacts 952, it prepares a point in the circuit traced hereinafter for controlling the director release relay R970 and it also prepares, at its contacts 954, a point in the circuit for the relay R960. Finally, at its contacts 951, it will remove ground potential from the conductor 275S to permit the primary selector to hunt for an idle trunk in the selected seventh level. This circuit control, however, will be explained shortly in connection with the operation of the primary selector 300 by the dialing of the second digit 7.

Referring to the primary selector 300, it was pointed out above that the line relay R330 will be controlled by the impulses repeated thereto by the contacts 453 on the line relay R450. At the contacts 331, the line relay R330 will transmit seven impulses to the vertical magnet M384 over a circuit including, in series, the contacts 328, 331, 345, 359, and, in multiple, the lower winding of the transfer relay R350 and the vertical magnet M384. On the first vertical stepping of the wipers 363 to 365, inclusive, under control of the vertical magnet M384, the vertical off-normal contacts 391 are opened and the vertical off-normal contacts 392, 374, and 375 are closed. Consequently, the ground potential applied to the conductor 308S, as previously explained, is now connected by way of the contacts 314', 322', 356, and 392 to hold the transfer relay R350 operated by way of the circuit including its upper winding. Inasmuch as the transfer relay R350 is of the slow-to-release type, it is retained operated by the intermittent pulses transmitted thereto by the contacts 331 on the line relays R330.

At the vertical off-normal contacts 374, the marginal stepping relay R360 is operated over a circuit including contacts 385, 386, 346, 351, and 341. The latter relay now locks itself in its operated position over a circuit including battery, winding of the relay R360, vertical off-normal contact 374, contacts 385, 386, 346, 362, and 328 to ground. As a further result of the operation of relay R360, at its contacts 361, it prepares a point in the circuit for operating the rotary magnet M383. The last-mentioned circuit, however, is not completed until the transfer relay R350 restores to normal at the end of the transmission of the impulses to the vertical magnet M384.

In the present example, however, the transfer relay R350 is retained operated during the dialing of the seven impulses to the vertical magnet M384 which raises the wipers 363 to 365, inclusive, to the seventh level.

It will be recalled that in response to the registration of the digit 7 in the second digit register 1030, the relay R950 operated to remove, at its contacts 951, the ground potential applied to the conductor 275S. As a result thereof, the transfer relay R350 in the primary selector 300 will restore to normal and complete, at its contacts 352, a circuit including contacts 341, 378, and 361 for operating the rotary magnet M383. The rotary magnet M383 upon operating, steps the wipers 363 to 365, inclusive, in a rotary direction into engagement with the first contact set in the selected seventh level and, at its contacts 386, it interrupts a point in the above-traced circuit for the relay R360 which now restores to normal and, at its contacts 361, opens the circuit for the magnet M383 which also restores to normal. The restoration of the magnet M383, at its contacts 386, now connects the winding of the rotary stepping relay R360 to the C wiper 365 so that a circuit will be completed for operating the relay only in the event that the contact engaged by the wiper 365 is grounded to indicate that the corresponding trunk is busy. In other words, the ground potential encountered by the wiper 365 will be extended by way of the contacts 325 to short circuit the winding of the switch-through relay R320 and to complete a circuit including the contacts 346, 386, 385, and VON374 for again operating the relay R360. The relay R360 again operates and, at its contacts 361, recompletes the circuit for the rotary magnet M383. The latter magnet, at its contacts 386, interrupts a circuit for the relay R360 and the latter relay, at its contacts 361, interrupts the circuit for the rotary magnet M383 so that it will again restore to normal to complete, at its contacts 386, the circuit for reoperating the relay R360 in the event that another busy contact is engaged by the wiper 365. The rotary stepping of the wipers 363 to 365, inclusive, under control of the rotary magnet M383 in conjunction with the stepping control of the relay R360 will continue until the wiper 365 engages an ungrounded contact in the associated contact bank or until the wipers have been stepped to the eleventh rotary step position because all of the ten trunks in the selected level are busy.

An idle trunk in the selected level will be indicated to the primary selector 300 by an absence of ground potential upon the bank contact engaged by the wiper 365. When this occurs, the switch-through relay R320 will operate in series with the relay R360 over a circuit which includes battery, the winding of the relay R360, vertical off-normal contacts 374, contacts 385, 386, and 346, winding of the switch-through relay R320, eleventh rotary step cam contacts 366 and contacts 341 to ground. In this circuit, the winding of the switch-through relay R320 is no longer short circuited by a busy marking ground potential on the wiper 365 and, consequently, the relay R320 operates. However, the relay R360 does not operate at this time due to the high resistance of the relay R320. At this time, the relay R320 at the contacts 321 and 323 disconnects the line relay R330 and, at its contacts 322 and 324, it connects the control circuit including the conductors 303R and 304T from the director by way of the wipers 363 and 364 to the next switch in the switch train that is selectable over a trunk in the seventh level of the selector 300. The extension of the foregoing circuit to the next switch will cause the latter switch to return a holding ground potential over the circuit including the wiper 365 and contacts 326 for holding the switch-through relay R320 operated in series with the relay R360 over a circuit which is independent of the ground potential at the contacts 341.

The line relay R330 restores to normal as a result of being disconnected at the contacts 321 and 323 and it interrupts, at its contacts 332, the circuit for the hold relay R340 which also restores to normal. The only relays in the primary selector 300 that remain in their operated position after the above-described switch-through operation is the switch-through relay R320 and the director test relay R310. It should be noted, however, that the circuit for holding the switch-through relay R320 in its operated position in series with the rotary stepping relay R360 now includes the contacts 329. Also, at the contacts 321', the relay R320 prepares a point in the circuit for connecting the conductor 308S to the magnet M251.

In the foregoing description, it was assumed that the primary selector 300 switched through to seize an idle trunk to the next switch in the train when an absence of ground potential is encountered by the wiper 365. If all ten trunks in a selected level are busy, the interaction of the rotary magnet M383 and the rotary stepping relay R360 will cause the wipers 363 to 365, inclusive, to be rotated into engagement with the eleventh rotary step cam position. When this occurs, the eleventh rotary step cam contacts 349 are closed to transmit the busy tone signal on the conductor C347 to the winding of the line relay R330 and the ground potential at the cam contacts 348 is removed from this circuit. Also, at the eleventh rotary step cam contacts 366, a point in the previously traced circuit for operating the switch-through relay R320 is interrupted in order to prevent operation of this relay. Finally, at the eleventh rotary step cam contact 359, a point in the stepping circuit for the vertical magnet M384 is interrupted so that the transmission of any subsequent digits to the line relay R330 will merely be absorbed. After the director is disconnected from the primary selector 300, the busy tone signal on the conductor C347 will be transmitted to the calling subscriber as an indication that the connection should be released.

Under certain conditions, the primary selector 300 may be operated to absorb a digit transmitted thereto if the digit is one that raises the wipers to a critical level. For example, the left-normal post springs 377 and 378 may be arranged to actuate when a critical level is reached during the vertical stepping of the wipers 363 to 365. If, for example, these contacts are actuated when the seventh level of the selector is dialed, the left-normal post springs 378 will interrupt a point in the stepping circuit for the rotary magnet M383 to prevent any rotary stepping of the wipers from taking place. Also, the transfer relay R350 will restore to normal after the last pulse of the digit 7 has been transmitted to operate the release magnet M381 over a circuit which includes the winding of the magnet, the left-normal post springs 377, contacts 372, 353, 342, 327, 366, and 341.

Operation of the magnet M381, at its contacts 385, interrupts a point in the circuit for the relay R360 so that the latter relay restores to normal and, at its contacts 382, the release magnet M381 completes a locking circuit for itself which includes its windings, the vertical off-normal contacts 375, contacts 382 and ground at contacts 341. As soon as the wipers of the switch are restored to normal as a result of the operation of the release magnet M381, the vertical off-normal contacts 375 will be opened to interrupt the locking circuit for the magnet M381. However, as soon as the vertical off-normal contacts 375 are opened, a short circuit is removed from the lower winding of the relay R370 so that a circuit is now completed from ground at contacts 341, contacts 382, 373, 343, lower winding of the relay R370 and the winding of the release magnet M381 to battery. The relay R370 closes its X contacts 372' to lock the relay R370 over a circuit including its upper winding to ground at contacts 341. Also, at its contacts 373, it interrupts a point in the locking circuit of the release magnet M381 which now restores to normal. It should be understood, however, that in connection with the above operation, the left-normal post springs 377 are opened as soon as the wipers 363 to 365, inclusive, start to fall away from the seventh or critical level. Thus, the initial operating circuit for the release magnet M381 is opened as soon as the wipers start to drop from the seventh level, but the magnet is retained operated first over the circuit including the vertical off-normal circuit 375 which are opened when the wipers reach their normal rest position and, thereafter, the release magnet M381 is retained operated until the relay R370 is operated and locked. In this manner, the primary selector 300 has absorbed the digit 7 and has restored its wipers to normal. The relay R370, however, remains in its locked position during the time that the next digit is transmitted to the primary selector 300.

If the succeeding digit transmitted to the selector 300 happens to be another critical digit 7, the left-normal post springs will be operated when the seventh level is reached, but inasmuch as the contacts 372 are opened by the relay R370, the release magnet M381 can not be operated. Also, at the contacts 371, at the end of the vertical stepping in response to the second digit 7, the relay R370 will complete a circuit including the contacts 341, 352, 371, and 361, whereby the rotary stepping relay R360 and the rotary magnet M383 will cause the wipers of the selector to be rotated over the bank contacts of the seventh level. It should be apparent from the foregoing description that if the left-normal post springs 377 and 378 are arranged to operate on the critical level 7, the switch will restore its wipers to normal to absorb the first digit 7 but it will respond to any succeeding digit, including the digit 7, and will rotate its wipers over the selected level to seize the idle trunk line in the selected level in the manner previously described.

Before leaving the operation of the primary selector 300, attention is directed to the fact that it is also provided with right-normal post contacts 376 which are adjusted so that they will operate on the particular level corresponding to a particular second digit dialed into the selector 300. It should be understood that the second digit dialed into the selector need not be the same digit 7 that was suggested above in the illustrated example. If the right-normal post springs are arranged, for example, to close on the eighth level, the receipt of the digit 8 as a second digit dialed into the selector 300, after the first digit is absorbed, it will raise the wipers 363 to 365, inclusive, in the conventional manner to the eighth level, at which point the right-normal post springs 376 are operated. Inasmuch as the first digit 7 has been absorbed, the relay R370 is in its operated position to render the closing of the contacts 376 ineffective. The normal operations resulting from the digit 8 dialed into the primary selector 300 will cause the wipers to be rotated over this level in the manner previously explained. However, the provision of the right-normal post contacts 376 will prevent the selector 300 from ever responding to a first digit 8. Whenever a first digit 8 is received by the selector 300, the right-normal post contacts 376 will be closed and ground potential at the contacts 341 will be connected by way of the contacts 366, 327, 342, 353, 372, and 376 to the wiper 365 to simulate an all-trunks busy condition to this wiper. Consequently, the restoration of the transfer relay R350 at the end of the dialing of the first digit 8 will automatically cause the rotary magnet M383 and the stepping relay R360 to rotate the wipers 363 to 365 step-by-step over the selected eighth level until they reach the eleventh rotary step position. This will prevent any dialing short cuts from being performed to skip, for example, a digit that must be absorbed by the primary selector 300.

In the foregoing description it was pointed out that as a second digit 7 of the called number is registered in the digit register 1030, the impulses are also repeated to the primary selector 300 so that it will raise its wipers to the seventh level. At the end of the dialing of the second digit, the magnet M1011 of the receive sequence switch 1010 will advance its wipers 1013 to 1017, inclusive, an additional step in the counterclockwise direction into engagement with the contacts 3 so that the third digit 2 dialed by the calling subscriber will now be registered in the third digit register 1040 and it will also be repeated to the primary selector 300 or to a succeeding switch seized by the primary selector 300.

At the end of the dialing of the third digit, but before the receive sequence switch 1010 advances its wipers from the third bank contact into engagement with the fourth bank contact, it will be understood that the digits 272 are registered respectively in the digit registers 1020, 1030, and 1040; that the primary selector 300 has its wipers in engagement with an idle selector in the seventh level and that an additional selector (not shown) is seized over the seventh level. When the wiper 1046 of the third digit register 1040 engages contact 2 in the associated contact bank, it completes a circuit including the terminal LC on the terminal block TB1050 and contacts 954 for operating the control relay R960. At its contacts 964, the relay R960 interrupts a point in the circuit for the relay R970 thereby to prevent at this time, operation of the relay R970 and the resulting release of the director. As a further result of the operation of relay R960, it transfers the locking circuit for the relay R910 at the contacts 963 from the grounded conductor 871LGR to a circuit including its contacts 962, the BR conductor and the contact 3 engaged by the wiper 1015 on the receive sequence switch 1010 and the grounded conductor 871LGR.

During the interdigital pause following the dialing of the third digit, the receive sequence switch 1010 will advance its wipers from engagement with the third contacts into engagement with the contacts 4 in the associated contact banks. Consequently, the wiper 1015 removes ground potential from the BR conductor thereby causing the relay R910 now to restore to normal. At its wipers 1016, the receive sequence switch 1010 applies ground potential to the conductor 1066SA3 extending to FIG. 12, contacts 1225, conductor 1067SA4 extending to FIG. 10 to the contacts 934 on the slow-to-release relay R930.

In response to the restoration of the relay R910, as noted above, at its contacts 911, it disconnects the impulsing conductor 504RA from the circuit including the conductor 269R so that the line relay in the subsequent selector seized by the primary selector 300 will restore to normal and thereby release the said selector. The last-mentioned selector in turn will remove the holding ground potential from the wiper 365 of the primary selector 300 so that the switch-through relay R320 thereat will restore to normal and cause the full release of the primary selector 300.

As a further result of the restoration of the relay R910 (FIG. 9) it will interrupt at its contacts 914 and 915, points in the circuit for the relay R930 which slowly restores to normal. As soon as the latter relay restores, it closes its contacts 934 thereby to further extend the ground potential applied thereto from the wiper 1016 by way of the conductor 515CR18 extending to FIG. 5, contacts 572, 713, and 683 in order to operate the assigner start relay R550. The operation of the latter relay will complete circuits whereby the translator X2700 is associated with the calling director to translate the called office code digits 272 registered in the first, second, and third digit registers 1020 to 1040, inclusive (FIG. 10) into appropriate routing digits so that the director can control the setting-up of the connection in accordance with the said routing digits.

From the foregoing, it will be apparent that if the digits 272 of a called office code are registered in the director, the primary selector 300 will be operated in accordance with the digit 7 as it is registered in the director and a subsequent switch will be operated in accordance with the third digit 2 as it is registered in the third digit register of the director. However, due to the strapping arrangements on the terminal blocks associated with the first, second, and third digit registers 1020, 1030, and 1040, the operated primary selector 300 and the associated selector will be restored to normal and the translator assigner relay R550 will be operated so that a translation will be obtained of the office code digits 272.

Before continuing with the operations controlled by the assigner start relay R550, further controls of the director, depending upon the office code digits registered therein, will first be described.

In accordance with the office code block 27, if the third digit of the code is 0, 1, or 3 to 9, inclusive (instead of the third digit 2), the primary selector 300 will be stepped in a vertical direction in accordance with the second digit 7 in the same manner as previously described and another selector will be seized by the primary selector 300 and it will respond to any one of the third digits. However, the third digit (except the digit 2) will cause the director to be released from the primary selector 300 so that all subsequent digits dialed by the calling subscriber will directly control the switch train.

Referring to the call register 900 (FIGS. 9, 10, and 11) it should be understood that the digits 2 and 7 registered respectively in the digit registers 1020 and 1030 will cause the operations of the relays R910, R930, and R950 all in the manner previously described. Also, the primary selector 300 will be operated in accordance with the second digit 7 in the manner previously described to seize a trunk line extending to a subsequent selector.

If it is assumed for the purpose of describing the present operation of the director that a local office code, for example 276, is dialed and the digit 6 registered in the third digit register 1040 (instead of the digit 2 as previously described) the digit will control the selector seized by the primary selector 300. At the end of the dialing of the third digit, the receive sequence switch 1010 will advance its wipers from engagement with the third contacts in the associated contact banks into engagement with the fourth set of contacts. When this occurs, ground potential on the conductor 871LGR is connected by way of the CR conductor, terminals on the terminal block TB909 and strapping thereon, to the RL conductor, contacts 952 and 964 and the winding of the director release relay R970, to battery. This relay, at its contacts 971, applies ground potential to the conductor 701CR22 extending to FIG. 7 in order to operate the director release relay R680. The director release relay R680 will cause the restoration and ultimate disconnection of the director from the primary selector 300 so that all of the remaining digits of the called number that are dialed by the calling subscriber will be transmitted directly from the calling subscriber dial through the line finder circuit 240 and the primary selector 300 to the switches in the local exchange to complete the connection to the called subscriber line. The manner in which the director is released will be described subsequently.

In the foregoing description of the operation of the primary selector 300 wherein the left-normal post contacts 377 and 378 and the right-normal post contacts 376 are utilized in connection with the digit absorbing features of the switch, it was assumed that the operation resulted during the control of the primary selector 300 by the director. However, it should be specifically noted that the digit absorbing features controlled by the right and left-normal post contacts are never utilized when the primary selector 300 is controlled from the director. Under the latter condition, the left and right-normal post contacts are provided as part of the switch but they are not actuated on any level to which the wipers of the switch may be operated. The primary selector of the type noted will be installed in an exchange that is non-director operated but which contemplates the installation of director operation within the near future. The primary selector 300 will accordingly be dial-operated until the director is installed and from then on the primary selector 300 may be operated under control of the director.

In order to complete the description of the primary selector 300, the release thereof, as a result of a dismissal of the connection by the interconnected subscribers will now be explained. When, for example, the calling subscriber places his receiver on the switch hook of the associated instrument, the primary selector 300 will be released in a conventional manner in response to the removal of the holding ground potential from the wiper 365 by one of the succeeding switches utilized in the established connection. This ground potential, as previously noted, retains the switch-through relay R320 operated, in series, with the rotary stepping relay R360. However, the latter relay remains in its restored position. All other relays in the primary selector will be in their restored position at the time the holding ground potential is removed from the above-mentioned circuit. Consequently, the switch-through relay R320 will restore to normal when the connection is dismissed and complete, at its contacts 323, a circuit including contacts 331, 344, 373, and the vertical off-normal contacts 375 for operating the release magnet M381. Upon its energization, the magnet M381 will cause the wipers 363 to 365, inclusive, to restore to normal, first in a rotary direction and then by gravity in a vertical direction. As soon as the wipers are restored to normal, all of the vertical off-normal contacts are restored to the positions illustrated in the drawings, at which time the vertical off-normal contacts 375 interrupt the operating circuit for the magnet M381 to complete the restoration of the primary selector 300.

In the previous description regarding the operation of the director and the associated primary selector 300, it was pointed out that these units of equipment cooperated in a predetermined manner when the digits 27 of a first code block were registered in the director. It was also pointed out that if the third digit dialed was the digit 2, the primary selector 300 and the next succeeding switch, which responded to the last digit 2, would restore to normal so that the director would control the setting-up of the entire connection. If any other digit but the digit 2 is dialed as the third digit of the code block 27, then the primary selector and any subsequent switch would remain in its operated position and the director would be automatically released.

The call register 900 portion of the director may also be arranged with special strapping for a second code block, for example, corresponding to the digits 35. These digits when dialed into the call register 900 portion of the director are registered respectively in the first digit register 1020 and in the second digit register 1030. Since the terminal block TB1029 associated with the wiper 1026 is strapped so that the registration of the digit 3 will interconnect the wiper 1026 with the MA terminal on the block, a circuit is completed for operating the first digit 3 relay R920. At this point, it should be noted that the control relays shown on FIG. 9 that form a part of the call register 900 include the first code block relays R910 and R950 which are selectively operative under certain conditions to selectively control the relays R930, R960, and R970. Also, the control relays include the second code block relays R920 and R940 which also may be utilized to selectively control the relays R930, R960, and R970. Additional sets of code block relays, such as those named above, may be provided, if desired, to also selectively control the relays R930, R960, and R970.

In view of the foregoing, it will be apparent that if the relay R920 responds by the registration of the digit 3 in the first digit register 1020, it will perform the same operations that were heretofore performed by the operation of the relay R910 by the registration of the digit 2. The registration of the second digit 5 in the second digit register 1030 completes a circuit from ground at the wiper 1036 by way of appropriate strapping on the terminal block TB1038 to the MB terminal on the block so that the relay R940 is operated. This relays performs the same functions as those described above in connection with the operation of relay R950 as a result of the dialing of the second digit 7. The remaining operations whereby the relays R930, R960, and R970 are selectively controlled are substantially the same as those previously described in connection with the operations resulting from the dialing of the different third digits of the code block 27. Accordingly, the dialing of the code block 35 followed by any one of the third digits 1 to 9 and 0 will control the primary selector 300 in the same manner as the code block 27 followed by any one of the third digits 1 to 9 and 0.

In the foregoing description of the operation of the primary selector 300 and the call register 900 portion of the director, it was assumed that when either the code block 27 or the code block 35 are used, the L and M strapping on the terminal block TB909 (FIG. 9) are strapped to the PB terminal so that the block translation relay R930 would be operated. The operation of the relay R930 controlled the primary selector 300 so that it will step its wipers in a vertical direction simultaneously with the registration of the second digit dialed by the calling subscriber in the second digit register 1030. In some exchanges of a telephone network, it may be desirable to have the primary selector, such as 300, step in a vertical direction during the dialing of the third digit of a called number. When this type of operation is desired, the M terminal and the L terminal on the terminal block TB909 may be disconnected from the PB terminal and instead connected to the PC terminal. This will control the primary selector, such as 300, to step in a vertical direction during the dialing of the third digit instead of during the dialing of the second digit.

In order to describe this operation, it will be assumed that the L terminal remains connected to the PB terminal so that the primary selector 300 will respond to the second digit whenever the first digit of a called office code is the digit 2. It will also be assumed that the terminal M is disconnected from the terminal PB and instead is connected to the terminal PC.

In order to describe the operations under the foregoing circumstances, it will again be assumed that the calling subscriber has dialed the digits 352 designating a particular called office. The digit 3, as previously noted, will be registered in the first digit register 1020 to complete the previously described circuit for operating the first digit 3 relay R920. At its contacts 922, the latter relay will prepare a circuit including contacts 951, 941, conductor 275S extending to FIG. 6, conductor 275S extending to FIG. 2, wiper 260, conductor 308S, contacts 314', 322', 356, VON392 and the upper winding of the transfer relay R350, to battery. This prevents the relay R350 from permitting automatic rotation of the wipers of the selector after the selector has been raised in a vertical direction to close the vertical off-normal contacts VON392.

Also, at the contacts 924, the relay R920 applies ground potential to the M terminal on the terminal block TB909. In the previous description it was assumed that this terminal was interconnected with the terminal PB in order to operate the relay R930. However, in the present description it is now assumed that the terminal M is instead connected to the terminal PC. Consequently, the relay R930 remains in its restored position even though the critical first digit 3 has been dialed. Also, at its contacts 923, the relay R920 prepares a point in the circuit for the relay R940 so that the latter relay can operate if the second digit 5 is dialed by the calling subscriber. The subscriber now dials the second digit of the called office code which is assumed to be the digit 5. As a result thereof, the second digit 5 is registered in the second digit register 1030 in the manner previously explained. However, the impulses of the second digit are not repeated to the line relay of the primary selector 300 inasmuch as the contacts 932 on the relay R930 are in an open position at this time. The registration of the digit 5 in the second digit register 1030 applies ground potential at the wiper 1036 to the MB terminal on the terminal block TB1038 in order to complete the operating circuit for the relay R940.

As soon as the relay R940 operates, it locks the relay R920 in its operated position over a circuit including the winding of the relay R920, contacts 943 and 963 and the grounded conductor 871LGR. Also, at the contacts 942, the relay R940 prepares a point in the circuit for controlling the director release relay R970. At its contacts 941, the relay R940 removes ground potential from the conductor 275S and at its contacts 944 it prepares a point in the circuit for the relay R960 so that the latter relay may be operated, if desired, if the digit 2 is registered in the third digit register 1040.

During the interdigital pause between the dialing of the second digit 5 and the dialing of the third digit of a called office code, the receive sequence switch 1010 advances its wipers into engagement with the contacts 3 in the associated contact banks. When this occurs, the wiper 1016 completes a circuit including the contacts 925 for operating the relay R930. The latter relay, at its contacts 933, locks itself in its operated position, at its contacts 931 it disconnects the conductor 809TY from the conductor 901TYO; and at its contacts 932 it completes the pulsing circuit including the conductors 504RA and 269R so that the primary selector 300 can respond to the impulses of the third digit.

The third digit dialed by the calling subscriber will be registered in the third digit register 1040 and, as previously described, the impulses will be transmitted over the impulsing circuit including the conductors 504RA and 269R to the primary selector 300.

If the third digit dialed by the calling subscriber is a critical digit that causes the ground potential on the wiper 1047 to be extended by way of the MC terminal on the terminal block TB1051, the relay R960 will be operated to cause the release of the relays R920, R930, R940, and R960 in the manner previously described so that the primary selector 300 will be restored to normal. It should be noted, however, that if the M terminal and the PC terminal on the terminal block TB909 are interconnected, the ground potential at the contacts 924 will be extended by way of the contacts 961 to the conductor 275S. The grounding of this conductor will prevent the release of the transfer relay R350 in the primary selector 300 after the latter selector responds to the critical digit 2 registered in the third digit register 1040. Thus, the selector 300 is prevented from rotating its wipers over the selected level in the associated contact bank. The grounding of the conductor 275S has been previously explained in considerable detail and will not be repeated. In the latter event, the director will select the translator X2700 to receive a translation of the called office code digits 352.

If no critical digit is included in the third digit of the called office code, the bank contacts accessible to the wiper 1047 will not be jumpered to the MC terminal on the terminal block TB1051. Therefore, the relay R960 will not operate as a result of the registration of the third digit in the register 1040. However, as soon as the receive sequence switch 1010 advances its wipers from engagement with the contacts 3 in the associated contact banks into engagement with the contacts 4, ground potential on the wiper 1015 will be extended by way of the CR terminal and RM terminal on the terminal block TB909 and then by way of contacts 942 and 964 to operate the director release relay R970. The associated primary selector 300 will respond to the third digit and will raise its wipers to the corresponding level. The operation of the relay R970, however, will cause the director to be released from the primary selector 300 so that the subsequent digits dialed by the calling subscriber will now be dialed directly through the line circuit 205, line finder 240 and the primary selector 300 to the subsequent switch in the switch train that has been seized by the primary selector 300.

If it is desired to always release the director from the primary selector whenever the digits 35 of a called office code block are dialed, it is merely necessary to strap the RM terminal on the terminal block TB909 to the BR terminal thereon instead of to the CR terminal as is illustrated. Under this condition, and assuming further that the M terminal is strapped to the PB terminal, the relays R920 and R930 will be operated as a result of the registration of the first digit 3; the second digit 5 will be repeated to the primary selector 300 and simultaneously registered in the second digit register 1030 to complete the circuit for operating the relay R940.

After the registration of the digit 5, the receive sequence switch 1010 will advance its wipers into engagement with the contacts 3 in the associated contact banks, as previously described, and will complete a circuit which may be traced from the grounded conductor 871LGR, wiper 1015, contact 3 in the associated contact bank, the BR terminal strapped to the RM terminal on the terminal block TB909, contacts 942 and 964 and the winding of the director release relay R970 to battery. This will cause the release of the director in the manner noted hereinbefore and the primary selector 300 will be connected directly to the calling subscriber line so that each of the remaining digits of a called number dialed by a calling subscriber will be transmitted to the primary selector 300 to the subsequent switches.

In the foregoing description of the operation of the call register 900 (FIGS. 9 to 11, inclusive) it may be appreciated that by means of the various terminal blocks TB1029, TB1038, TB1050, TB1051, and TB909 and the various control relays shown in FIG. 9, the primary selector, such as 300, associated with the director can be controlled so that it will be operated either as the second digit of the called number is registered in the second digit register 1030 or as the third digit is registered in the third digit register 1040. In addition to the foregoing, the operated selector may be released at the end of the second digit or at the end of the third digit depending on the value of the digit that is registered in the call register 900. Also, it will be appreciated that the director release relay R970 may be operated to cause the director to be disconnected from the associated primary selector, such as 300, after the dialing of a second critical or after the dialing of the third critical digit.

In order to continue the description of the operation of the system, it will be assumed that the called office code digits registered respectively in the first, second, and third digit registers 1020, 1030, and 1040 are of such values that they do not in any way cause any control of the relays shown in FIG. 9 or cause any control of the associated primary selector 300. Under the foregoing conditions, the receive sequence switch 1010 will, during the interdigital pause between the dialing of the third digit and the dialing of the fourth digit, step its wipers into engagement with the contacts 4 in the associated contact banks. In this position the wiper 1016 will apply ground potential over the previously described circuit including the conductor 1066SA3 in order to operate the assigner start relay R550 in the controller 400 portion of the director. Also, the wiper 1014 transfers the impulsing circuit including the conductor 604CR19 from the conductor 1003 extending to the third digit register 1040 to the conductor 1004 extending to the fourth digit register 1110. It will accordingly be appreciated that the fourth digit dialed by the calling subscriber will control the magnet M1111 to register the fourth dialed digit in the register 1110. The fifth, sixth, and seventh digit registers 1120, 1130, and 1140 will be respectively controlled to register the corresponding dialed digits as the receive sequence switch 1010 advances its wipers during the interdigital pause between the dialing of the successive digits to select the conductors 1005 to 1007, inclusive.

As noted above, the receive sequence switch 1010 will advance its wipers after each digit is registered in the respective digit registers 1010 to 1040, inclusive. When the wiper 1015 advances from the fourth contact to the fifth contact in the associated contact bank at the end of the dialing of the fourth digit, the ground potential on the conductor 871LGR will be connected to the conductor 801SDO extending to FIG. 8 in order to operate the first numerical send relay R820. Furthermore, as the wiper 1015 advances over the sixth, seventh, and eighth contacts in the associated contact banks, the conductors 802SEO, 803SFO, and 804SGO will be sequentially grounded to operate respectively the second, third, and fourth numerical send relays R830, R840, and R850.

Figure 8:
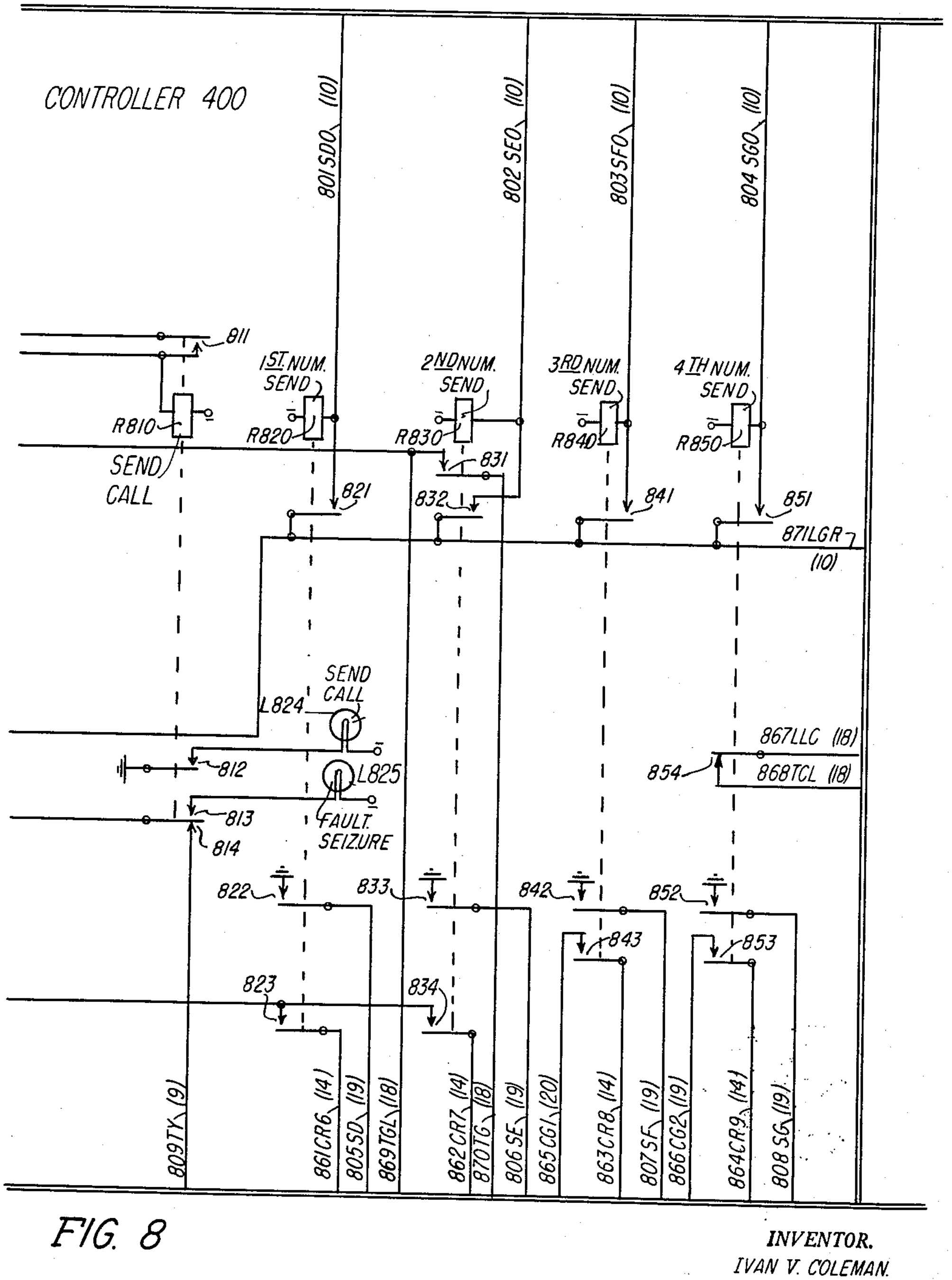

By referring to FIG. 8 it will be seen that as each of the above-mentioned relays R820 to R850, inclusive, are operated, they immediately lock themselves by way of the respective contacts 821, 832, 841, and 851 to the circuit including contacts 647 on the operated seizure relay R640 and contacts 666 to ground on the deenergized fault seizure relay R660. It will be appreciated that these relays will ground respectively the conductors 805SD, 806SE, 807SF, and 808SG extending to FIG. 19 at the respective contacts 822, 833, 842, and 852 as an indication of the respective fourth, fifth, sixth, and seventh dialed digits.

In FIG. 19 these conductors terminate in the bank contacts accessible to the wiper 1951 so that the pulsing relay R2050 can only be operated in the event that the corresponding digits have been registered in the respective digit registers of the call register 900.

After the seventh dialed digit has been registered in the seventh digit register 1140, the receive sequence switch 1010 will advance its wipers from engagement with the contacts 7 into engagement with the contacts 8 in the associated contact bank to cause the operation of the relay R850 over the conductor 804SGO as noted above. Thus, a seven digit called number has now been registered in the digit registers of the call register 900 portion of the director.

*Registration of a national toll code*

The present system is arranged so that it may be utilized in conjunction with a national automatic toll dialing telephone network so that a calling subscriber may, by means of the dial at his instrument establish a telephone connection with any subscriber within, for example, the United States, who also is connected to an automatic telephone exchange. For this purpose, the United States has been divided into different zones, each identified by a three digit national toll code. Also, each of the telephone exchanges located within each of the national toll code areas is provided with the usual seven digit number comprising the three digits identifying the called office within an identified zone and four or five digits identifying the particular subscriber station in the identified zone and exchange.

When different types of systems, that is, systems manufactured and designed by different manufacturers, are interconnected to form the national toll network, each manufacturer must provide facilities to transmit the necessary control signals to the next type of system installed by another manufacturer. These signals must be arranged so that they will control the switching apparatus in the different tandem related systems to set-up the desired connection to whatever called zone, exchange and subscriber line that is identified by the originating or calling subscriber. As previously noted, the subscriber directory numbers will include, in addition to the three digit office code designation, either four or five digits forming the numerical portion of the directory number.

In the present system, facilities are provided for registering the three digits identifying the particular national toll zone followed by three digits identifying the called exchange within the zone followed by either a four or a five digit identifying the particular called subscriber station in the particular exchange. Thus, at least as many as eleven digits may be necessary to identify the called subscriber on a national toll call basis which digits must be dialed and registered in the digit registers provided in the present system.

In the description thus far, it has been assumed that a seven digit number has been registered in the first to the seventh digit registers 1020 to 1140, inclusive. It has also been assumed that the first three digits dialed by the calling subscriber identified a particular exchange which could be reached on what has been referred to as a short haul toll call. In calls of this character it is not necessary to prefix the called number with the national toll code comprising three digits. Whenever it is necessary to prefix a called subscriber directory number with a national toll code, additional registers must be available to register at least the last four digits of the maximum of eleven digits to be dialed by the calling subscribers.

In the present system, these registers have been designated as the eighth, ninth, tenth, and eleventh digit registers 1310 to 1340, inclusive, and have been illustrated in FIG. 13. The transfer relays of the call register 1200, shown in FIG. 12, are utilized whenever the first three digits dialed by a calling subscriber correspond to one of the special codes identifying a national toll call. On ordinary short haul toll calls, however, the call register 1200 shown in FIGS. 12 and 13 will not be utilized.

The national toll codes as assumed in the present system are three digits and the first of the three digits may be any one of the digits 2 to 9, inclusive; the second digit may be either the digit 1 or 0 and the third digit may be any one of the digits 2 to 9 and 0. Under certain conditions, the digit 1 may also be used as the third digit of a national toll code provided, however, that the second digit is the digit 0 and the first digit is any one of the digits 2 to 9, inclusive. The digits 1 and 0 have been selected as a second digit of the national toll code because all office or exchange codes identifying the different exchanges of the different networks never use the digit 1 or 0 as the second digit. Consequently, all national toll codes can be identified by the fact that the second digit is the digit 1 or the digit 0. It will be appreciated, however, that there are some special codes, for example, using the digits X11 that may be used in connection with special service calls to special service operator positions in a local exchange. The letter X, noted above, is representative of any digit 1 to 9 and 0.

In order to test the first three digits dialed by a calling subscriber and registered in the call register 900 to see whether or not they correspond to a national toll code, the first, second, and third digit registers 1020, 1030, and 1040 are provided respectively with the wipers 1028, 1037, and 1048 and associated bank contacts which are interconnected in a predetermined manner to control the relays in the digit register 1200 (FIGS. 12 and 13) so that the eighth, ninth, tenth, and eleventh digit registers 1310, 1320, 1330, and 1340 are rendered available. To describe this operation, it will be assumed that a three digit national toll code is registered in the first three registers 1020, 1030, and 1040, inclusive.

The operation of the receive sequence switch 1010 during the dialing of the first three digits is exactly the same as has been previously described. However, it should be noted that during the dialing of the first digit to register the same in the digit register 1020, the wipers of the receive sequence switch 1010 will be in engagement with the contacts 1. During the interdigital pause, the wipers of the receive sequence switch 1010 will be advanced into engagement with the contacts 2 whereupon the ground at the wiper 1017 will be applied to the conductor 602AEO extending to FIG. 6 to control the party test relay R460 in the controller 400 in the previously described manner. In other words, the party test relay R460 is operated so that during the dialing of the second digit, the ground or spotter pulses from the special dials at party subscriber substations will control the party line relay R470 in the manner previously described to indicate the particular position of the calling station on a calling party line.

In connection with the identification of a calling station on a party line by means of the special ground pulses, as previously described, it is essential that the second digit of a called number be the digit 2 or greater. This limitation is based on the proposition that all office or exchange codes have a second digit that is any one of the digits 2 to 9, inclusive. This can be verified by referring to a standard calling device where it will be found that the finger holes 2 to 9, inclusive, are provided with the different letters of the alphabet in the manner shown in the previously illustrated table. Accordingly, if the second digit is based on a regular exchange code, the appropriate pulses of the dial for registering the position of a calling station on a party line will be transmitted and registered in the manner previously described. In the event the second digit is the digit 1 of a national toll code and the calling subscriber happens to be at a party station, then the station identifying pulses may be mutilated inasmuch as only a single loop pulse indicative of the digit 1 will be transmitted from the calling subscriber dial to register the second digit 1 in the second digit register 1030. Of course, if the second digit of the national toll code dialed by the calling subscriber is the digit 0 instead of the digit 1, then the proper registration of the identity of the calling station on the party line will be made in exactly the same manner as described hereinbefore.

After the dialing of the second digit and the registration thereof in the second digit register 1030, the receive sequence switch 1010 will advance its wipers into engagement with the contacts 3 in the associated contact banks. When this occurs, the ground potential on the wiper 1017 will be extended by way of the wiper 1037 in engagement with either the contact 1 or the contact 10 (depending upon whether the second digit is 1 or 0), wiper 1028 in engagement with any one of the contacts 2 to 9, inclusive (depending upon the registration of any one of the digits 2 to 9, inclusive, in the first digit register 1020), conductor 1069LHA extending to FIG. 12 and the winding of the long haul relay R1210 to battery. The operation of this relay is an indication that the first two digits dialed by the calling subscriber are indicative of a national toll code. Upon operating, the relay R1210, at its contacts 1213, prepares a point in the circuit for operating the relay R1220 provided the third digit dialed by the calling subscriber is that of a national toll code.

Finally, at the contacts 1212, the relay R1210 disconnects the grounded conductor 605CR29 (grounded at contacts 642′ on the operated seizure relay R640) from the conductor 1204SAL extending to FIG. 18.

Referring to FIG. 18 it will be seen that the conductor 1204SAL provides the locking ground potential for any one of the operated party station relays R1870P1 to R1870P5, inclusive. In other words, whatever party relay has been operated in FIG. 18 as a result of pulses transmitted from the calling subscriber dial during the dialing of the second digit will now restore to normal. This is done at this time inasmuch as the second digit on a national toll code may be the digit 1, as previously noted, and thus mutilates the pulses that are necessary to accurately register the identity of the different calling stations on a party line. The registration of the party station on a calling party line will, in the case of national toll code, be again registered during the dialing of the fourth digit by the calling subscriber.

The calling subscriber will now dial the third digit which in this case may be any one of the digits 2 to 9 and 0, and if the second digit has been the digit 0, the third digit may also include the digit 1. In any event, if the digit 2 to 9 or 0 is registered in the third digit register 1040, ground potential encountered by the wiper 1048 will be extended by way of the conductor 1070LHB extending to FIG. 12 and then by way of contacts 1213 in order to operate the relay R1220. Upon operating, the latter relay, at its contacts 1229, will lock itself over a circuit that is independent of the contacts 1213. It should be noted that if the second and third digits of the national toll code are respectively the digits 0 and 1, the circuit for operating the relay R1220 will instead include ground at wiper 1036, the engaged tenth contact, contact 1 engaged by the wiper 1048 and conductor 1070LHB extending to FIG. 12.

As soon as the relay R1220 operates it closes its contacts 1223 and 1222 in order to connect the eighth and ninth digit registers 1310 and 1320 to the conductors 1062 and 1063 extending to FIG. 10 which terminate respectively in the contacts 8 and 9 accessible to the wiper 1014 on the receive sequence switch 1010. In other words, the above-noted eighth and ninth digit registers will now be connected to the impulsing circuit through the wiper 1014 when the eighth and ninth digits of the number are dialed by the calling subscriber. Also, at the contacts 1224, the relay R1220 interconnects the conductor 602AEO and 1068LAE. These conductors will be utilized as soon as the receive sequence switch 1010 advances its wipers into engagement with the contacts 4 during the interdigital pause between the dialing of the third and the fourth digit, and will complete the circuit for operating the party test relay R460 in the manner to be described hereinafter. As a further result of the operation of the relay R1220, at its contacts 1225, it disconnects the conductor 1066SA3 from the conductor 1067SA4 in order to delay the operation of the assigner start relay R559 until after the fourth digit is dialed by the calling subscriber instead of after the third digit as is the usual procedure.

At its contacts 1226, the relay R1220 applies ground potential to the conductor 1201LHL extending to FIG. 19 to provide a locking potential for the relay R1930 when the latter relay is subsequently operated.

Finally, at its contacts 1227 and 1228, the relay R1220 prepares points in circuits for subsequently operating the relay R1250 and, in series, the relays R1230 and R1240. The operation of the latter relays, however, is delayed until the code switch 1950 in the call recorder 2000 (FIGS. 19 to 21, inclusive) is operated.

During the interdigital pause following the registration of the third digit in the third digit register 1040, the receive sequence switch 1010 will advance its wipers into engagement with the contacts 4 in the associated contact banks. Thus, the wiper 1014 will connect with the bank contact terminating the conductor 1004 so that the impulses of the fourth digit (the first digit of a called office code) may now be registered in the fourth digit register 1110. Also, the wiper 1017 now applies ground potential to the conductor 1068LAE extending to FIG. 12, then by way of the contacts 1224, the conductor 602AEO extending to FIG. 10, conductor 602AEO extending to FIG. 6, contacts 652, winding of the party test relay R460 and, in series, the spotter battery 473 and the exchange battery 472. In this manner, the controller 400 is now conditioned so that the fourth digit dialed by the calling subscriber will be registered in the fourth digit register 1110 in the usual manner, and, in addition thereto, the party line relay R470 may be controlled so that the party station relays R1870P1 to R1870P5, inclusive (FIG. 18), may be controlled in the manner previously described to register the position of the particular calling station on a party line. However, in order again to provide the locking circuit to retain the operated ones of the party relay R1870P1 to R1870P5, inclusive, in their operated positions to maintain the registration of the particular calling station on any calling line, the conductor 1204SAL must again be grounded. This is accomplished as a result of the advancement of the wipers of the receive sequence switch 1010 from engagement with the contacts 3 into engagement with the contacts 4.

By referring to wiper 1017, it will be seen that when the wiper leaves the associated contact 3, it removes ground potential from the previously traced circuit for operating the long haul relay R1210 (FIG. 12). Consequently, during the interdigital pause between the dialing of the third and fourth digits, the relay R1210 will restore to normal to interconnect, at its contacts 1212, the conductor 605CR29 and 1204SAL. In this manner the ground potential on the conductor 605CR29 will retain any operated party relay (FIG. 18) in its operated position to register the identity of the particular calling station on a party line.

From the foregoing it should be clearly understood that during the dialing of the fourth digit, the fourth digit register 1110 will be operated to register the corresponding digit and that the party relays R1870P1 to R1870P5, inclusive, will also operate to register the identity of the calling station on a party line. In this connection it may be well to note the fact that the calling device at the different calling stations on the party lines are arranged so that they will transmit the station identifying ground pulses during the dialing of each digit but the party test relay R460 is selectively controlled so that the station identifying ground pulses are only registered during the dialing of the second digit if the first, second, and third digits of a called number correspond to a called office or exchange code. However, if the first, second, and third digits correspond to a national toll code, then the station identification made during the dialing of the second digit is canceled and the party test relay R460 is again operated during the dialing of the fourth digit so that the station identification is again registered in the party station relays of FIG. 18.

As a subscriber continues to dial the digits of the desired called station, they are registered respectively in the fourth, fifth, sixth, and seventh digit registers 1110, 1120, 1130, and 1140 as the receive sequence switch 1010 advances over the contacts 4 to 7, inclusive. As the wipers engage the respective eighth, ninth, and tenth contacts of the receive sequence switch 1010, the impulses of the eighth, ninth, and tenth dialed digits will be transmitted respectively to the magnet M1311 of the eighth digit register 1310, the magnet M1321 of the ninth digit 1320 and to the magnet M1331 of the tenth digit register 1330. Thus, the last three digits of a ten digit call will be registered in the eighth, ninth, and tenth digit registers. Under certain conditions it may be necessary to dial an additional eleventh digit which will be registered in the manner noted above in the eleventh digit register 1340 as soon as the receive sequence switch 1010 has advanced its wipers into engagement with the contacts 11 in the associated contact banks.

At the present time the three digits of a national toll code are registered respectively in the first, second, and third digit registers 1020, 1030, and 1040; the three digits of a called office code are registered respectively in the fourth, fifth, and sixth digit registers 1110, 1120, and 1130; and the four digits of the numerical portion of a called subscriber directory number are now registered respectively in the seventh, eighth, ninth, and tenth digit registers 1140, 1310, 1320, and 1330. If the additional fifth digit of the numerical portion of a subscriber number is necessary, it is registered in the eleventh digit register 1340.

When the receive sequence switch 1010 advances from engagement with the tenth contact into engagement with the eleventh contact during the interdigital pause between the dialing of the tenth and eleventh digits, the ground potential applied to the wiper 1015 over the conductor 871LGR is extended by way of the conductor 1071LHE to FIG. 12 where it completes a circuit including the contacts 1227 for operating the relay R1250. This relay immediately locks itself by way of its contacts 1252 to the grounded conductor 605CR29 and at the same time, at its contacts 1251, it applies the ground potential on the conductor 605CR29 to the conductor 1204SAL in order to retain the locking circuit for the operated ones of the party relays (FIG. 18). In the view of the foregoing, it will be appreciated that the relay R1250 will be operated immediately after the tenth digit is registered in the tenth digit register 1330.

If an additional eleventh digit is dialed by the calling subscriber and registered in the eleventh digit register 1340, then during the interdigital pause following the eleventh digit, the receive sequence switch 1010 will again advance its wipers an additional step.

In the switch illustrated in the drawings, the wipers 1013 to 1017 are shown as double ended wipers and it should be understood that when the wipers leave the eleventh contacts in the associated contact banks to take the additional step, the opposite ends of the wipers will reengage the initial contact 1. As soon as the wiper 1017 reengages the associated contact 1, it will recomplete the previously traced circuit including the wipers 1037 and 1028, the conductor 1069LHA extending to FIG. 12 in order to reoperate the long haul relay R1210. This relay upon being reoperated will again interrupt the point in the circuit including its contacts 1211 to indicate to the sender 1400 (in the manner to be described hereinafter) that the national toll call being handled by the director is one in which eleven digits have been dialed instead of the usual ten digits. The fact that the contacts 1212 are opened at this time by the relay R1210 is of no importance since the contacts 1251 are closed.

The control of the relays R1230 and R1240 in the digit register 1200 will be exercised subsequently when the call recorder 2000 portion of the director is placed in operation. These relays will transfer the marking ground potentials at their respective contacts from the registers in the call register 900 to the register in the digit register 1200 at the appropriate time.

*Operation of the sender 1400*

Referring now to the sender 1400 portion of the director shown in FIGS. 14 to 16, inclusive, it will first be recalled that the control relay R1670 operated over a circuit including the contact 1664 when the conductor 605CR29 was grounded upon the seizure of the controller 400 portion of the director. The relay R1670, at its contacts 1674, interrupts a point in the incomplete circuit including the conductor 1072TZ extending to FIG. 18 in order to prevent operation of the "0" operator relay R1850TZ in the coder 1800 portion of the director. Also, at the contacts 1671, the relay R1670 prepares a point in the incomplete circuit including the conductor 1602BA extending to FIG. 20 in order to prevent the call recorder 2000 portion of the director, as shown in FIGS. 19 to 21, inclusive, from being operated until after a predetermined number of digits have been transmitted by the sender 1400.

As soon as at least three digits have been registered in the call register 900 portion of the director, the director translator assigner X2800A, the codexer X2300A, and the translator X2700 were controlled to register routing digits in the route registers of the coder 1800 portion of the director. The route digits registered in the coder will be a translation of the first three digits that have been registered in the call register 900 portion of the director and that will be transmitted by the sender in order to control the switching apparatus to route the call in the direction of the destination determined by the digits dialed by the calling subscriber.

When the assignment start relay R550 was initially operated to cause the assignment of the codexer X2300A and the translator X2700 to the particular calling director, the relay completed, at its contacts 558, a circuit including the conductor 506ST extending to FIG. 15 in order to operate the start relay R1540 in the sender 1400 portion of the director.

Finally, when the route digits have been registered in the coder 1800 portion of the director by the translator X2700, the translation complete relay R710 operated to indicate that the translation has been completed and that the director translator assigner 2800A, the codexer X2300A and the translator X2700 should be disconnected from the calling director. During the sequence of the foregoing operations, the conductor 870TG is grounded and completes the previously described circuit for operating the auxiliary start relay R1530 in the sender 1400 portion of the director.

Referring now to the start relay R1540 (FIG. 15) it will be seen that as soon as the relay operates over the circuit including its lower winding, it immediately locks itself over a circuit including its upper winding and contacts 1544 to the grounded conductor 605CR19. At its contacts 1547, the relay R1540 completes a circuit from battery to the motor start conductor 1508 to start the schematically illustrated pulse generator 1509. This generator is arranged so that it will transmit pulses over a pulse conductor 1507 at the rate of approximately ten pulses per second to control the pulse relay R1570 when the circuit thereto is completed at the contacts 1545. As a further result of the operation of the start relay R1540, at its contacts 1542, it completes a circuit by way of the off-normal contacts 1423 on the send sequence switch 1420 and the interrupting springs 1422 in order to operate the magnet M1421 on the send sequence switch 1420. The remaining circuits controlled by other contacts on the start relay R1540 are of no particular importance at the present time but it should be noted that the pulse relay R1570 will operate and restore under control of the ten pulses per second transmitted over the pulse conductor 1507 by the pulse generator 1509.

As soon as the above-mentioned circuit is completed for the magnet M1421, the magnet operates and immediately interrupts its own circuit by opening its contacts 1422. As soon as the circuit for the magnet is interrupted, its wipers 1401 to 1407, inclusive, are advanced one step from the normal resting position shown in the drawing into engagement with the contacts 1 in the associated contact banks.

In illustrating the wipers and associated bank contacts of the send sequence switch 1420 (FIG. 14) the wipers are illustrated as though they would be moving downwardly to engage the successive contacts 1 to 25 each time the magnet M1421 is restored to normal. However, the actual construction of the send sequence switch 1420 is in the form of the conventional rotary stepping mechanism in which the bang contacts are in the form of an arc and the wipers are rotated by a shaft on the switching unit so that the wiper will engage the successive contacts as they are stepped in a rotary direction.

As soon as the wipers 1401 to 1407, inclusive, of the send sequence switch 1420 have been advanced one step from the illustrated off-normal positions into engagement with the contacts 1, the off-normal contacts 1423 will be opened to interrupt the above-mentioned initial operating circuit for the magnet M1421 and the off-normal contacts 1424 will be closed to prepare a point in the incomplete circuit for subsequently controlling the magnet M1421 to restore the wipers of the send sequence switch 1420 to their normal resting positions.

As soon as the wiper 1401 engages the contact 1 in the associated contact bank, it merely prepares a circuit which will subsequently be described, whereas the wiper 1402 in engaging the contact 1 connects ground potential over a circuit including the contacts 1681 for operating certain of the relays used in the digit sending operations of the sender 1420.

When the wipers 1404 to 1407, inclusive, engage the contact 1, the associated WXYZ11 marking conductors from the WXYZ route register in the coder 1800 portion of the director are connected by way of the conductors 1425 to 1428, inclusive, to the bank contacts on the send switch 1580. The send switch 1580 may now be operated to determine the code marking on the respective WXYZ conductors 1425 to 1428, inclusive, and thus determine, in accordance with the code markings, the numerical value of the particular digit that is registered in the WXYZ11 route register.

In the foregoing discussion, it was noted that the auxiliary start relay R1530 in the sender 1400 operated as a result of the registration of the route digits in the route registers of the coder 1800 portion of the director. The relay R1530 locks itself in its operated position over a circuit including its contacts 1534; at its contacts 1535, it completes the operating circuit for the pulse control relay R1510; and, at its contacts 1536, it completes a circuit for preenergizing the left-hand winding of the digit stop relay R1560. As a further result of the operation of the auxiliary start relay R1530, at its contacts 1531 and 1532, it prepares circuits for respectively connecting resistance battery and resistance ground potentials to the circuit including the right-hand winding of the digits stop relay R1560.

At the present time, ground potential is connected by way of the associated resistor and contacts 1532 through the right-hand winding of the digit stop relay R1560, then by way of the contact 1622 and 1623 to the conductor 269R extending to FIG. 9. This particular circuit is of importance because it is the circuit over which impulses will be transmitted for controlling the setting up of the connection through the switching apparatus of the present exchange. Accordingly, it should be noted that the circuit is further extended through FIG. 9 over a conductor 269R to FIG. 2, then by way of the wiper 254, conductor 303R, contacts 312 and 321 and the upper winding of the relay R330 to battery. Accordingly, the line relay R330 in the primary selector 300 operates to prepare the selector to receive the impulses of the first digit registered in the route register WXYZ11 in the coder 1800 portion of the director. Although the right-hand winding of the digit stop relay R1650 is included in the above-traced circuit for controlling the line relay R330 in the primary selector 300, the relay R1560 does not operate at the present time. In the present circuits for the relay R1560, the left-hand winding is in opposition to the right-hand winding so the relay will not operate.

Due to the fact that the pulse control relay R1510 is of the slow-to-release type, it is somewhat delayed in its operation after the contacts 1535 have been closed by the relay R1530. After a short delay, the relay R1510 operates and, at its contacts 1511, applies ground potential to the conductor 502DBC extending to FIG. 5 in order to retain the director busy relay R510 in the controller 400 portion of the director in its operated position. At its contacts 1512 and 1513, the relay R1510 prepares points in circuits to be described hereinafter. The circuit including the contacts 1513 may be considered a basic circuit in that it provides the operating ground potential for controlling the pulsing circuit of the director to subsequent switches in the switch train. At the contacts 1514, the relay R1510 interrupts a point in the initial operating circuit for the auxiliary start relay R1530 but the latter relay remains in its operated position over the locking circuit including its contacts 1534. Finally, at the contacts 1515 and 1516, the relay R1510 closes multiple circuits for respectively connecting the pulsing conductor 1507 to the pulse relay R1570 and the motor start conductor 1508 connected to battery potential.

At the present time, the sender 1400 is in condition to begin to transmit pulses for controlling the line relay R330 of the primary selector 300 in accordance with the first route digit registered in the WXYZ11 route register of the coder 1800 portion of the director. Accordingly, the relays R1670, R1540, R1530, and R1510 are in their operated positions the send sequence switch 1420 has all of its wipers in engagement with the contacts 1 in the associated bank contacts, and the relay R1570 is pulsing under control of the pulse generator 1509.

The first time that the relay R1510 restores to normal after the pulse control relay R1510 operates, a circuit will be completed for operating the pick-up relay R1630. This circuit may best be traced from battery through the winding of the relay R1630, contacts 11 normally engaged by the wiper 1691 of the digit space switch 1690, contacts 1625, 1546, 1572, 1653, 1513, 1533, and 1681, wiper 1402 and ground potential connected to the engaged contact 1 in the associated contact bank. The relay R1630, upon operating at its contacts 1632, prepares a circuit for operating the pulse transmission relay R1620. The latter relay is at the present time short-circuited as long as the contact 1572 on the pulse relay R1570 remains closed. As a further result of the operation of relay R1630, at its contacts 1633, it removes ground potential from the circuits for subsequently restoring the digit space switch 1690 and the send switch 1580 to normal.

In response to the next pulse transmitted by the pulse generator 1509 over the pulse conductor 1507, the pulse relay R1570 operates to close its contacts 1571 and to open its contacts 1572. The opening of the contact 1572 removes the short-circuit from around the winding of the pulse transmission relay R1620 so that the latter relay now operates in series with the pick-up relay R1630 over a circuit which may be traced from battery, winding of the relay R1630, wiper 1691, contacts 1632, winding of the pulse relay R1620, contacts 1653, and then over the previously-traced circuit to ground at the wiper 1402. The relay R1620 now operates and, at its contacts 1624, locks itself in series with the relay R1630 over a circuit which is independent of the contacts 1653. At its contacts 1625, the relay R1620 disconnects the initial operating circuit for the pick-up relay R1630 and, at its contacts 1626, it prepares a point in the circuit for operating the magnet M1583 of the send switch 1580 each time the pulse relay R1570 restores. Finally, at its contacts 1621 and 1623, the pulse conductor 269R extending to the line relay R330 of the primary selector 300 is now transferred through the contacts 1571 on the pulse relay R1570 to ground at the wiper 1402. It should be noted that the ground potential extended over the conductor 269R was initially supplied through the right-hand winding of the digit stop relay R1560 and resistance ground potential at contacts 1532. The transfer circuit for applying ground potential to the conductor 269R may best be traced from ground at the wiper 1402 in engagement with the contact 1 and then by way of the contacts 1681, 1533, 1513, 1624, 1571 (the pulse relay R1570 operated) contacts 1652 and 1621, and resistor 1627 to the conductor 269R.

The transfer of the above circuit from resistance ground at the contacts 1532 to ground potential at the wiper 1402 is made without removing the potential from the conductor 269R so that the line relay R330 in the primary selector 300 is retained in its operated position. Subsequent pulsing of the contacts 1571 and 1572 under control of the pulse relay R1570 will now transmit switch setting impulses to the line relay R330 over the circuit including the conductor 269R and it will simultaneously transmit pulses to the magnet M1583 so that the wipers 1581 and 1582 of the send sequence switch 1580 will be advanced step-by-step as each impulse is transmitted. It will be apparent from the subsequent description that the send sequence switch 1580 will connect the send stop relay R1550 to the WXYZ marking conductors 1425 to 1428, inclusive to determine the digit that has been marked thereon in code by the particular register that is selected by the wipers 1404 to 1407, inclusive, on the send sequence switch 1420. As soon as the value of the digit has been determined by the send switch 1580, the send stop relay R1550 will operate to terminate the transmission of the pulses over the conductor 269R.

In order to describe the foregoing impulse transmission by the pulse relay R1570, it will be noted that each restoration of the pulse relay R1570 after the pulse transfer relay R1620 has operated will interrupt the circuit, at its contacts 1571, to the remove ground potential at the wiper 1402 from the impulsing conductor 269R. Also, the contacts 1572 will be closed so that the ground potential at the wiper 1402 will now be extended over a circuit including the contacts 1681, 1533, 1513, 1624, 1572, 1546, 1626, and 1614 to operate the magnet M1583.

At the end of the transmission of the first pulse, the pulse relay R1570 will reoperate and interrupt at its contacts 1572 the above described circuit for the magnet M1583. The magnet immediately restores to normal and in so doing, advances its wipers 1581 and 1582 one step in a counterclockwise direction from the normal illustrated position of the wipers into engagement with the contacts 1. It should be noted that as soon as the wipers are moved from the normal illustrated positions, the rotary off-normal contacts 1586 will be opened and the off-normal contacts 1585 will be closed.

At the contacts 1571, the pulse relay R1570 will again complete the circuit for transmitting ground potential over a conductor 269R and it will thereby reoperate the line relay R330 in the primary selector 300. The restoration and reoperation of the line relay R330 will terminate the first pulse to the primary selector 300.

In view of the foregoing, it should be understood that upon each restoration of the pulse relay R1570 after the operation of relay R1620, the contacts 1571 will open the circuit including the pulse conductor 269R to terminate the transmission of another impulse to the primary selector 300. Also, each time the pulse relay R1570 opens its contacts 1572, it will terminate the transmission of a pulse to the magnet M1583 on the send switch 1580. Consequently, the send switch 1580 will take one step after the impulse transmitted over the conductor 269R. In this manner, the send switch 1580 can test the associated WXYZ marking conductors 1425 to 1428, inclusive, after each impulse is transmitted over the conductor 269R and determine whether or not the number of transmitted impulses corresponds with the value of the digit marked in code form on the marking conductors 1425 to 1428, inclusive.

In this connection it should be noted that the left-hand winding of the send-stop relay R1550 is connected by way of the wiper 1581 to circuits including respectively the WXYZ conductors 1425 to 1428, inclusive. As the wiper 1581 successively engages the different contacts, a test will be made for ground potential on the associated marking conductor. Also, the right-hand winding of the send-stop relay R1550 is connected by way of the wiper 1582 to the successive contacts to determine whether or not ground potential is applied to the marking conductors 1425 to 1428, inclusive, connected to the associated contact banks.

It will be recalled from the previously illustrated table that the WXYZ marking conductors will be grounded in accordance with the predetermined code so that whenever a digit is marked on the conductors corresponding to the number of steps taken by the wipers 1581 and 1582, the ground potential on the marking conductors will simultaneously complete circuits for energizing both the left and right-hand windings of the send-stop relay R1550. Unless both windings are energized in the same direction and at the same time, the relay R1550 will not operate. Inasmuch as the digits 7, 8, 9, and 0 are respectively marked by grounding the W conductor 1425, the X conductor 1426, the Y conductor 1427 and the Z conductor 1428, it is necessary to permanently mark the bank contacts 7, 8, 9, and 10 accessible to the wiper 1582 so that energizing circuits will be completed for the two windings of the relay R1550 whenever the digits 7, 8, 9, or 0 have been marked on the respective conductors.

Before describing the operations resulting from the energization of the send-stop relay R1550, it should be noted that as soon as the off-normal contacts 1585 are closed a circuit is completed for operating the digit step relay R1640. This circuit may best be traced from ground at contacts 1537 on the operated auxiliary start relay R1530, off-normal contacts 1585 and the upper winding of the digit step relay R1640 to battery. This relay upon operating immediately locks itself over the circuit including its upper winding, contacts 1655, 1643, and 1631 to ground so that the relay is retained in its operated position during the transmission of the impulses corresponding to the first digit and also during the interdigital pause between the transmission of successive digits. The only other operation performed by the relay R1640 that is of importance at the present time includes the contacts 1641 that completes an operating circuit for the magnet M1421 on the send sequence switch 1420. The magnet M1421, however, will be retained in its operated position until after the impulses of the digit of the present sending cycle have been transmitted.

As soon as the wipers 1581 and 1582 simultaneously encounter grounded bank contacts, the send-stop relay R1550 will operate and complete, at its contacts 1552, an obvious circuit for operating the stop-send relay R1610. The latter relay, at its contacts 1613, will immediately lock itself to ground potential at the contacts 1644 on the operated digit step relay R1640. As a further result of the operation of the send-stop relay R1550, at its contacts 1551, it completes a circuit for connecting resistance ground potential at the contacts 1532 to the pulsing conductor 269R in order to terminate further transmission of switch controlling impulses over this conductor. The last-mentioned circuit may be traced from ground by way of resistance 1626, contacts 1532, the right-hand winding of the digit stop-relay R1560, contacts 1551, and conductor 269R. This circuit obviously will prevent further impulses transmitted by the contacts 1571 from being sent over the conductor 269R.

As soon as the stop-send relay R1610 operates and locks itself as noted above, it also completes at its contacts 1611 a circuit that is in parallel with the contacts 1551 to further prevent transmission of additional pulses over the conductor 269R even though the send-stop relay R1550 should restore to normal. As a further result of the operation of the relay R1610, at its contacts 1612, it completes the operating circuit for the delay pulsing relay R1650; at its contacts 1614, it disconnects the pulsing circuit to the magnet M1583 so that the send switch 1580 cannot be controlled by additional pulses; and, at its contacts 1615, it connects the previously described pulsing circuit to the winding of the magnet M1692 on the digit space switch 1690.

The sender 1400 is now in condition to determine the interdigital pause between the transmission of successive digits. When the delay pulsing relay R1650 operates under control of the stop-send relay R1610, at its contacts 1652 it opens a point in the previously described pulsing circuit to the conductor 269R. At its contacts 1651, the relay R1650 connects battery potential through the resistor 1625, contacts 1531, 1651, and the winding of the digit stop relay R1560. In other words, both ground and battery potential are connected through the respective resistors 1625 and 1626 to the right-hand winding of the digit stop relay R1560 to prepare an operating circuit for the latter relay if ground potential is returned over the conductor 269R from the primary selector 300 or any other subsequent switch in the switch train including the selector 300. This circuit will be traced in greater detail hereinafter.

Figure 5:
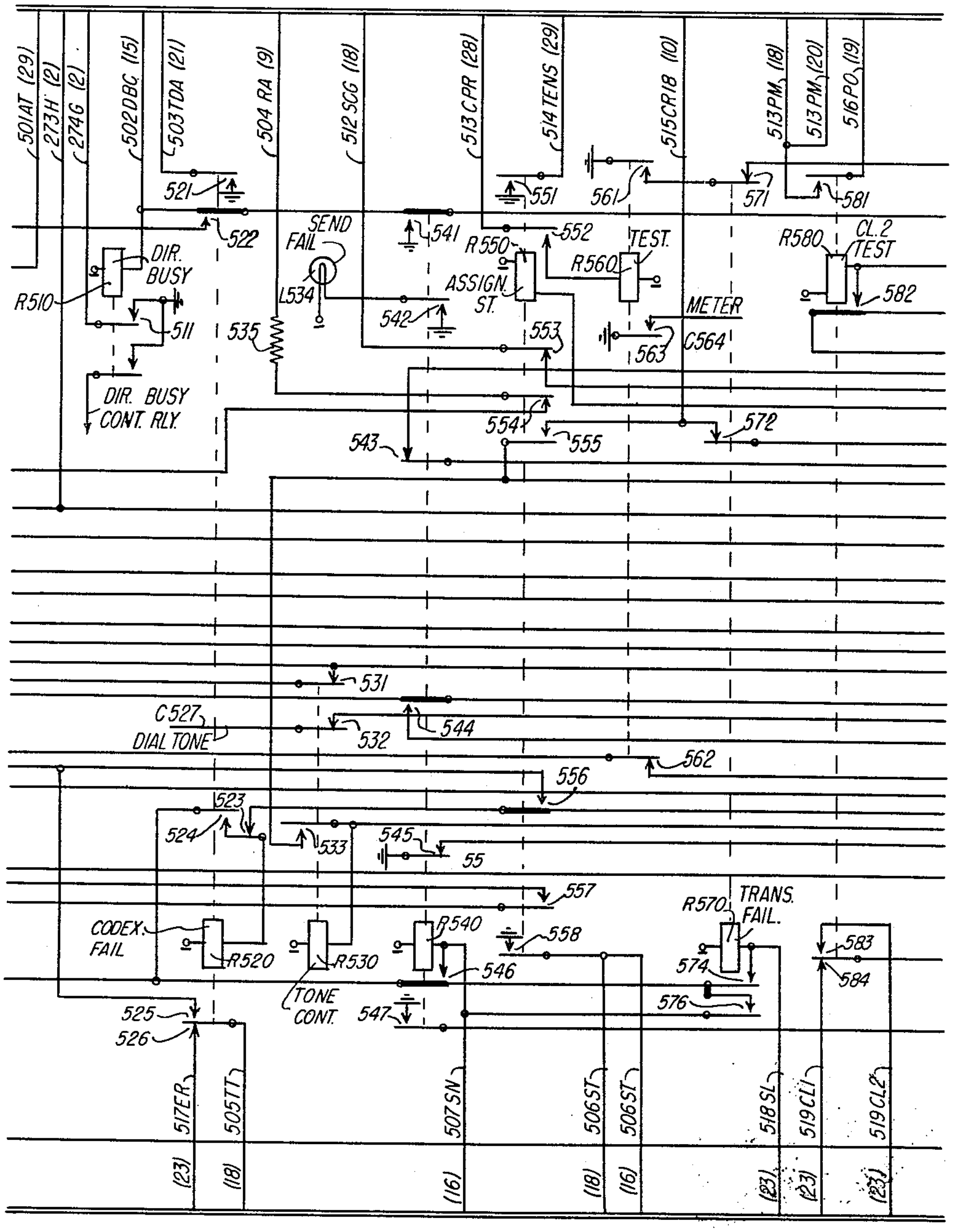

As a further result of the operation of relay R1650, at its contacts 1654, it interrupts a point in the circuit including the conductor 507SN extending to FIG. 5 to prevent operation of the send failure relay R540 in the controller 400 portion of the director. At its contacts 1655, the relay R1650 interrupts a point in the locking circuit for the digit step relay R1640 but the latter relay remains in its operated position under control of its initial operating circuit from ground at contacts 1537. At its contacts 1656, the relay R1650 interrupts a point in the incomplete circuit for controlling the magnet M1583 in order to prevent the restoration of the wipers of the send switch 1580 to normal. Also, at its contacts 1657, the relay R1650 prepares a point in the circuit for controlling the restoration of the wipers of the send switch 1580. Finally, at its contacts 1653, the relay R1650 interrupts a point in the initial operating circuit for the relays R1620 and R1630.

In the above-mentioned description it was pointed out that the right-hand winding of the digit stop relay is now included in the circuit from battery through the resistor 1625, contacts 1531, 1651, right-hand winding of the relay R1560, contacts 1551 and 1611 in multiple and the conductor 269R extending to the circuit including the upper winding of the line relay R330. This circuit will be retained during the interdigital pause in the sending cycle in order to receive a stop dial supervision if such supervision is returned from the primary selector 300 or any other subsequent switch in the switch train.

By referring to FIG. 3, it will be noted that as long as the line relay R330 is connected to the conductor 303R, resistance battery potential through the upper winding of the line relay will be returned over the conductor 269R. With resistance ground potential connected to the right-hand winding of the stop relay R1560, the digit stop relay cannot operate but during the interdigital pause between the transmission of impulses of successive digits the sender 1400 functions to connect resistance battery potential to the winding of the digit stop relay R1560 to condition the relay so that it will operate by substitution of ground potential on the conductor 269R. In other words, during the interdigital pause, the primary selector 300 may in responding to the first digit, raise its wipers 363 to 365, inclusive, to a level corresponding to the value of the number of impulses received and will then automatically rotate its wipers over the selected level to search for an additional trunk. When a delay is required for other switching equipment to prepare itself to receive the impulses of the next digit transmitted by the sender 1400 or when a busy path is encountered during the normal switching operations, a reverse battery stop dial supervision will be returned over the conductors 303R and 304T from the primary selector 300. The reverse battery supervisory signal consists of forwarding ground potential over the conductor 303R instead of the normal resistance battery potential. Consequently, in the sender 1400 the conductor 269R will receive the ground potential to complete the operating circuit for the right-hand winding of the digit stop relay R1560. The relay R1560 will upon operating complete, at its contacts 1561, a circuit for locking the stop-send relay R1610 in its operated position over a circuit including its lower winding. The latter relay will thereby prevent the sender 1400 from transmitting impulses of the next digit until the digit stop relay R1560 restores to normal as an indication that the reverse battery stop dial supervision has been removed from the conductor R269R. As a further result of the operation of relay R1560, at its contacts 1561, it extends ground potential by way of a circuit including thermistor 1517 in multiple with the variable resistor 1518, contacts 1524 and the upper and lower windings of the relay R1520 to battery. The thermistor 1517 has a negative temperature coefficient of resistance which causes the current flow to the winding of the relay R1520 to increase as the thermistor 1317 is heated. The thermistor 1517 and the parallel resistor 1518 are adjusted so that they will delay the operation of the timer relay R1520 for approximately 5 seconds.

If the reverse battery stop dial is removed so that resistance battery potential is again substituted for the ground potential on the conductor 269R within the 5 seconds before the primary relay R1520 operates, then the relay R1560 will restore to normal to release the stop-send relay R1610 and to open the timing circuit for operating the timer relay R1520. Consequently, the sender 1400 may now proceed to send the remaining digits as will be described hereinafter.

In the event that the reverse battery stop dial supervision retains the digit stop relay R1560 operated for a period greater than approximately 5 seconds, the timer relay R1520 will operate at described above. Upon operating, the relay R1520 will lock itself over a circuit including its upper winding and contacts 1523 to the grounded conductor 605CR29. Also, at the contacts 1521, the relay R1520 applies ground potential to the conductor 418KG extending to FIG. 4 in order to operate the fault seizure relay R660 in the controller 400 portion of the director. Operation of the latter relay will transmit a busy tone signal from the busy tone conductor 717 to the calling subscriber and it will cause the illumination of the fault seizure lamp L825 to indicate to the exchange attendant that the present call through the director can not be completed. At the contacts 1522, the relay R1520 disconnects the circuit including the conductor 870TG from the previously described circuit for the auxiliary start relay R1530 in order to restore the latter relay. The relay R1530 in turn, at its contacts 1535, releases the pulse control relay R1510 so that the sender 1400 will stop sending impulses and the circuit, including the conductor 269R, will be disconnected from the sender 1400.

More particularly, the pulse control relay R1510, at its contacts 1513, will open the circuit including the conductor 269R and will thereby cause the associated primary selector 300 or any other switching mechanism in the associated switch train to restore to normal. The busy tone signal transmitted from the controlled 400 portion of the director will signal the calling subscriber to indicate a busy condition. The subscriber will now release the connection in the usual way.

In the event that the reverse battery stop dial supervision signal is not received by the digit stop relay R1560, the relay will remain in its restored position during the interdigital pause. The pulse relay R1570, however, will continue to pulse under control of the pulse generator 1509 in the manner previously described and will now cause the magnet M1692 to step the wipers 1691 of the digit space switch 1690 over the contacts of the associated contact banks. This circuit may best be traced from battery through the winding of the magnet M1692, contacts 1615, 1626, 1546, 1572, 1624, 1513, 1533, and 1681, wiper 1402 and ground potential on the engaged contact 1 on the associated contact bank of the sender sequence switch 1420. Each time the pulse relay R1570 closes its contacts 1572, the above-mentioned circuit is completed for the magnet M1692 and each time the contacts are open by the relay R1570 the magnet M1692 restores. It should be noted, however that the circuit completed and interrupted by the contacts 1571 on the pulse relay R1570 is ineffective at the present time to transmit corresponding pulses over the conductor 269R inasmuch as the contacts 1652 have been opened by the delay pulsing relay R1650. The magnet M1692 operates each time the circuit is completed and it restores each time the circuit is interrupted by the contacts 1572. Upon each restoration of the magnet M1692, the wiper 1691 will be advanced one step in a counter-clockwise direction. On the first step of the wiper 1691 from engagement with the normal contact into engagement with the contact 1, the rotary off-normal contacts 1694 and 1695 will be closed. These contacts will remain in their closed position as the wipers are advanced over the contacts 1 to 10, inclusive, and they will be opened each time the wiper 1691 engages the eleventh or normal contact in the associated contact bank. As soon as the off-normal contacts 1695 are closed, a circuit is completed for the lower winding of the digit step relay R1640 in order to retain the relay in its operated position even though the circuit for the upper winding of relay is interrupted.

As a further result of the advancement of the wiper 1691 into engagement with the contact 1, the off-normal contact 1694 will be closed to prepare a self-interrupting circuit for the magnet M1692 which becomes effective when the pick-up relay R1630 restores to normal. Finally, the ground potential at the off-normal contacts 1695 is also extended by way of the contacts 1657, the off-normal contacts 1587 and the contacts 1584 for operating the magnet M1583.

The magnet M1583 operates and restores under control of the self-interrupting contacts 1584. Each time the magnet restores to normal, the wipers 1581 and 1582 are advanced an additional step in the counter-clockwise direction until the wipers are stepped from the tenth contacts into engagement with the eleventh or normal contacts in the associated contact bank. When this position is reached by the wipers of the send switch 1580, the off-normal contacts 1585 and 1587 are opened and the contacts 1586 are closed. The opening of the off-normal contacts 1587 will interrupt the above-traced self-interrupting circuit for the magnet M1583 to terminate further stepping of the wipers 1581 and 1582. Also, it should be noted that as soon as the wipers 1581 and 1582 are advanced from the engaged contacts over which circuits were completed for both windings of the send-stop relay R1550, the relay will immediately restore to normal and open its contacts 1551 and 1552. However, these contacts perform no circuit controls at the present time due to the fact that the stop-send relay R1610 is retained locked in its operated position from ground at contacts 1644 on the operated digit step relay R1640.

The digit space switch 1690 will continue to advance its wipers 1691 step-by-step over the associated contacts until the circuit to the pick-up relay R1630 is interrupted. It should be noted that the contacts 1 to 6, inclusive, are strapped together and included in the circuit for the pick-up relay R1630 so that the relay circuit is retained as the wiper is stepped over the contacts 1 to 6. With the contacts 1 to 6 strapped together in the manner illustrated, six pulses will be transmitted to the magnet M1692 by the contacts 1572 on the pulse relay R1570 before the wiper 1691 will be stepped to the seventh contact position. As soon as the wipers 1691 leaves the sixth contact position, the circuit for the pick-up relay R1630 will be interrupted. Since the pick-up relay R1630 and the pulse transfer relay R1620 are locked in their operated positions over a series circuit both relays will restore to normal as soon as the wiper 1691 leaves the sixth contact position.

In the present system, the pulse relay R1570 will take approximately 0.6 second to advance the wipers 1691 over the first six contacts in the associated contact banks. It will be seen from the subsequent description of operation that the interdigital pause between the transmission of successive digits therefore will be approximately 0.6 second. This interval of time may be increased or decreased by merely adjusting the strapping between the successive contacts accessible to the wiper 1691. In other words, if the interdigital pause should be increased to approximately 0.7 second, the first seven contacts accessible to the wiper 1691 should be strapped together.

In the above description, it was pointed out that the pulse transfer relay R1620 and the pick-up relay R1630 both restore to normal as soon as the wiper 1691 registers the sixth contact in the associated contact bank. The restoration of relay R1620 at the contacts 1622 and 1623 transfers the conductor 269R to the circuit including the right-hand winding of the digit stop relay R1560 and resistance ground potential at the contacts 1532. Also, at its contacts 1625, the relay R1620 reestablishes a point in the previously traced initial operating circuit for the pick-up relay R1630. However, the last-mentioned circuit includes the wiper 1691 and, consequently, the relay R1630 can not be operated until the wiper engages the normal contact and also until the delay pulsing relay R1650 restores and closes its contacts 1653.

As a result of the restoration of the pick-up relay R1630, at its contacts 1631, it opens an additional point in the initial energizing circuit for the upper winding of the digit relay R1640 but the latter relay is retained operated over a circuit including its lower winding and the off-normal contacts 1695. Also, at its contacts 1632, the relay R1630 interrupts a further point in the previously described circuit for locking the pick-up relay R1630 in series with the pulse transfer relay R1620. This circuit will be reestablished during the cycle of operation of the sender 1400 that transmits the impulses of the next digit. Finally, at the contacts 1633, the relay R1630 completes a circuit including the off-normal contacts 1694 and the self-interrupting contacts 1693 for controlling the magnet M1692. In other words, the contacts 1693 will interrupt the circuit for the magnet M1692 each time the circuit is completed and it will thereby cause the magnet to operate and restore until the wiper 1691 is advanced sep-by-step in a counter-clockwise direction into engagement with the eleventh or normal contact position. As soon as the wiper engages this position, the off-normal contacts 1694 will be opened to interrupt the circuit for the magnet M1692 and terminate the stepping of the wiper 1691 in engagement with the eleventh or normal contact position. Also, the off-normal contacts 1695 will be opened in order to interrupt the energizing circuit for the lower winding of the digit step relay R1640.

Since the send switch 1580 and the digit space relay R1640 have now restored to normal, the digit step relay R1640 has lost its last holding circuit and it will also restore to normal. As soon as the relay R1640 restores, it interrupts at its contacts 1641 the circuit for the magnet M1421. This magnet now restores to normal and advances all of its wipers 1401 to 1407, inclusive, an additional step into engagement with the contact 2 in the associated contact banks. At the contacts 1642, the relay R1640 again interrupts a point in the circuit including the conductor 507SN. At the contacts 1644, the relay R1640 interrupts the locking circuit for the stop-send relay R1610 to permit the latter relay to restore to its initial position.

The restoration of the stop-send relay R1610 opens, at its contacts 1612, the circuit for the delay pulsing relay R1650. At its contacs 1614, the relay R1610 prepares a point in the circuit for again controlling the magnet M1583 of the send switch 1580.

As soon as the relay R1650 restores to normal, as noted above, it reestablishes at its contacts 1652 and 1653 the previously described circuits whereby the ground potential on the wiper 1402 will be transmitted to the pick-up relay R1630 and then to the magnet of the send switch 1580.

The advancement of all of the wipers of the send sequence switch 1420 from engagement with the contacts 1 into engagement with the contacts 2 will disconnect the markings from the WXYZ11 marking conductors and will connect the WXYZ12 marking conductors extending to the corresponding route registers in the coder 1800 portion of the director. These conductors will now be connected by way of the wipers 1404 to 1407, inclusive, to the bank contacts accessible to the wipers 1581 and 1582 on the send switch 1580 so that a test can now be made as the wipers are now rotated over the associated contact banks to determine the value of the digit registered in the second route register, WXYZ12, of the coder 1800. It should be noted, however, that the wiper 1403 applies ground potential to the skip conductor SK12 extending to FIG. 17 to determine whether or not any digit has been registered in the WXYZ12 route register. By referring to FIG. 17, it will be noted that the schematically illustrated contact 1721, associated with the WXYZ12 route registers, will be in the closed position, if no digit is registered in the associated register, and will be opened if a digit has been registered in the associated registers.

It will first be assumed that no digit is registered in the WXYZ12 route register and, therefore, the ground potential connected to the skip conductor SK12 will now be extended by way of the contacts 1721, conductor 1203SKC extending to FIG. 16 in order to operate the skip relay R1680 in the sender 1400. Operation of the skip relay R1680, at its contacts 1682, connects the ground potential on the conductor 1203SKC to the circuit including the self-interrupting contact 1422 and the winding of the magnet F1421 to battery. This will cause the magnet M1421 to operate and open its contacts 1422 whereupon the magnet will restore to normal and advance its wipers into engagement with the next set of contacts. If a number of the route registers, for example, the route registers WXYZ13, WXYZ14, WXYZ15, and WXYZ16 are to be skipped, the ground potential at the wiper 1403 will be successively connected to the skip conductors SK13 to SK16, inclusive, as the wiper 1403 is skipped over the contacts 3 to 6, inclusive. Therefore, the skip relay R1680 will be retained in its operated position as the magnet M1421 is self-interruptedly operated to advance the wipers of the send sequence switch 1420 over the contacts 3 to 6, inclusive. In this manner, the send sequence switch 1420 will be controlled to skip the various route registers that do not have digits registered therein. Substantially the same circuits will be completed when the wiper 1403 engages the contacts 7 to 13, inclusive, if the corresponding skip conductors SK21 to SK27, inclusive, complete circuits to the skip common conductor 1203SKC and thereby complete the circuit for operating the skip relay R1680.

If it is assumed that a digit has been registered in the second route register WXYZ12, the above-described circuit, including the skip conductor SK12 can not be completed inasmuch as the contacts 1721 will be open to prevent the operation of the skip relay R1680. Since a digit has been registered in the second route register WXYZ12, it will now be marked on the corresponding marking conductors terminating in the contacts 2 accessible respectively to the wipers 1404 to 1407, inclusive, on the send sequence switch 1420.

The ground potential now applied to the wiper 1402 at the engaged contact 2 will complete the previously described circuit including the contacts 1681, 1533, 1513, 1653, 1572 (upon the next restoration of the pulse relay R1570), 1546, and 1625, wiper 1691 in engagement with the eleventh or normal contact and the winding of the pick-up relay R1630 to battery. This pulse initiates the second transmitting cycle of the sender 1400 to transmit impulses corresponding to the second digit registered in the second route register WXYZ12. More specifically, impulses corresponding to the value of the digit registered in the second route register will be transmitted over the conductor 169R to the primary selector 300 and since that switch has been operated and cut through to the next switching unit in the switch train, the impulses will be forwarded to control the next switching unit. As the above pulses are transmitted to the conductor 169R, a corresponding number of pulses will also be transmitted to the magnet M1583 on the send switch 1580. This will make the previously described test of the marking conductor 1425 to 1428, inclusive, whereby the send-stop relay R1550 will be operated to terminate further transmission of impulses when the number of transmitted impulses correspond to the value of the digit that has been registered in the second route register WXYZ12. The interdigital pause between the transmission of successive digits will be governed by the digit space switch 1690, as previously described, and upon the completion of the interdigital pause, the magnet M1421 of the send sequence switch 1420 will be advanced an additional step to transmit the digit registered in the third route register WXYZ13 or to skip that register if no digit is registered therein.

The foregoing cycle of operation of the sender 1400 will be repeated for each of the digits to be transmitted and the send sequence switch 1420 will be automatically controlled to advance the wipers 1401 to 1407, inclusive, step-by-step after each digit is transmitted or whenever a register is to be skipped by the sender 1400. As the wipers of the send sequence switch 1420 successively engage the contacts 1 to 6, inclusive, the digit registered in the respective route register WXYZ11 to WXYZ16 will be transmitted over the conductor 269R to the primary selector 300 and subsequent switches in the switch train. As soon as the wipers 1404 to 1407, inclusive, of the send sequence switch 1420 engage the contacts 7, the sender 1400 will be controlled to transmit the digit registered in the first digit register 1020 of the call register 900.

Referring now to the call register 900, it will be seen that the WXYZ21 to WXYZ23 marking conductors in the cable 1101 will be marked in accordance with the digits registered respectively in the first, second, and third digit registers 1020, 1030, and 1040. These are the first three digits that have been dialed by the calling subscriber. It should also be noted that when the send sequence switch 1420 positions its wipers 1404 to 1407, inclusive, into engagement with the contacts 7, the wiper 1403 simultaneously engages the contact 7 in the associated contact bank terminating the skip conductor SK21. Thus, ground potential is applied to this conductor by the wiper 1403 to ascertain whether or not the TA control relay R1860TA in the coder 1800 has been registered. The operations that now take place will depend upon the operated conditions of the control relays R1860TA, R1860TB, R1860TC, and R1860TD in the coder 1800.

The foregoing control relays will be selectively operated by the translate relay, such as R2701, that has been selected as a result of the registration of the first three digits of the call register 900. Consequently, the selected translate relay will be prewired to operate the particular one of the control relays of the coder 1800 that will cause the director to transmit impulses corresponding to only certain of the digits that have been dialed by the calling subscriber.

If it is assumed that the TA control relay R1860TA has been operated by the particular translate relay that has been selected as a result of the registration of the first three digits in the call register 900, it will immediately lock itself in its operated position over a circuit including its contact 1, conductor 1826, contacts 1812 and the locking conductor 615LGC which has been grounded at the contacts 641' by the seizure relay R640. At the contacts 2, 3, and 4 the relay R1860TA will disconnect the skip conductors SK21, SK22, and SK23 from the skip common conductor 1203SKC extending to FIG. 16 in order to prevent operation of the skip relay R1680.

Thus it will be seen that when the wiper 1403 of the send sequence switch 1420 applies ground potential to the skip conductor SK21 extending to FIG. 18, the operated condition of the TA control relay R1860TA will prevent application of ground potential to the skip common conductor 1203SKC extending to FIG. 16. At the contacts 3 and 4, the relay R1860TA will also interrupt points in the circuit including the skip conductors SK22 and SK23. Since the skip common conductor 1203SKC is not connected to ground during the time that the wiper 1403 engages the seventh, eighth, and ninth contacts in the associated contact banks, the sender 1400 will be able to transmit impulses corresponding to the digits marked on the marking conductors WXYZ21, WXYZ22, and WXYZ23 by the first, second, and third digit registers 1020, 1030, and 1040. During the sending cycle, impulses corresponding to the digit registered on the respective WXYZ marking conductors will be transmitted by the sender 1400. When the number of impulses corresponds to the value of the digit registered on the particular WXYZ marking conductors, the send stop relay R1550 will operate to terminate the sending cycle. Thereafter the magnet M1421 of the send sequence switch 1420 will be operated to advance its wipers an additional step into engagement with the next contact in the associated contact banks.

In the particular illustration described above, the TA control relay R1860TA in its operated position will control the sender 1400 to transmit one after another, all of the digits that have been registered in the seven digit registers of the call register 900 and then the digits registered respectively in the eighth to the eleventh digit registers in the digit register 1200. The latter registers, however, are only used in the event that the particular call being handled by the director is a national toll call requiring the dialing and registration of ten or eleven digits.

Under certain conditions, the selected translate relay in the translator X2700 may be prewired so that it will operate the TB control relay R1860TB instead of the TA control relay R1860TA. When this occurs, the relay R1860TB will lock itself by way of its contacts 1 over the previously described circuit to the grounded locking conductor 615LGC. Also, at its contacts 2, the relay R1860TB will disconnect the skip conductor SK23 from the skip common conductor 1203SKC in the same manner as the contacts 4 on the control relay R1860TA. However, since the control relay R1860TA remains in its restored position, the contacts 2 and 3 thereof will remain closed so that the skip conductors SK21 and SK22 will be connected to the skip common conductor 1203SKC. Under this condition the send sequence switch 1420 will be controlled when the wiper 1403 thereof engages the contacts 7, 8, and 9 in the associated contact banks to skip the digits registered in the corresponding digit registers 1020 and 1030 and to transmit the digit registered in the third digit register 1040. In other words, as the wiper 1403 of the send sequence switch 1420 applies ground potential to the skip conductors SK21 and SK22, the ground potential will be extended by way of the skip common conductor 1203SKC to operate the skip relay R1680 which in turn will control the magnet M1421 of the send sequence switch 1420 to advance its wipers over the contacts 7 and 8 without transmitting impulses corresponding to the digits marked on the corresponding WXYZ21 and WXYZ22 marking conductors. When the wipers engage the contacts 9, however, the corresponding skip conductor SK23 will be disconnected from the skip common conductor 1203SKC by the operated TB control relay R1860TB to permit the sender 1400 to transmit impulses corresponding to the digit marked on the WXYZ23 marking conductors by the third digit register 1040.

From the foregoing, it will be understood that the operation of the control relay R1860TB will control the sender 1400 so that it will skip the transmission of the first and second digits registered in the first and second digit registers 1020 and 1030 and it will permit the sender 1400 to then transmit all of the remaining digits registered in the digit registers of the call registers 900 and 1200.

Certain of the exchanges in the telephone system may be identified by the two digit office code and will include four digits identifying the particular called subscriber line. In other words, the subscriber is identified by a six digit number instead of the usual seven digit number. When this condition exists, the first and second digit registers 1020 and 1030 will register respectively the called office code digits dialed by the calling subscriber and the third, fourth, fifth, and sixth digit registers 1040, 1110, 1120, and 1130 will register respectively the four numerical digits identifying the called line. The first three digits in this case will include the two digits of the called office code followed by the thousand digits of the four numerical digits identifying the called line. These three digits will normally indicate that the number being dialed by the calling subscriber is a six digit number but under certain conditions a seventh digit may be dialed. The latter condition exists when an exchange having the two digit office code includes mixed six and seven digit numbers and the seven digit number has the same first three digits as a six digit number. In any event, when the first three digits of the six digit number is registered in the call register 900, the translator X2700 will be controlled in the manner previously described to select a particular translate relay which will register the appropriate route digits in the route register in the coder 1800 and it will also select the control relay R1860TC. The relay R1860TC upon operating, will lock itself by way of its contacts 1 to the conductor 868TCL extending to FIG. 8, then by way of the contacts 854, conductor 867LLC extending to FIG. 18, conductor 1826, contacts 1812 and the locking ground conductor 615LGC. It should be noted that the locking circuit for the relay R1860TC includes contracts 854 on the fourth numerical send relay R850 so that in the event that a seventh digit is dialed by the calling subscriber and registered in the seventh digit register 1140, the receive sequence switch 1010 will complete the operating circuit by way of its wiper 1015 and the conductor 804SGO to operate the fourth numerical send relay R850. If the seventh digit is dialed after a code indicative of a six digit number has been registered, the operation of the fourth numerical send relay R850 will interrupt at the contacts 854 the locking circuit for the control relay R1860TC.

If it is assumed that the control relay R1860TC remains locked over the above-mentioned locking circuit, it will close its contacts 2 so that the skip common conductor 1203SKC will be grounded by way of the skip conductor SK27 when the wiper 1403 engages the contact 13 in the associated contact bank. This will cause the sender 1400 to skip the seventh digit register 1140 in substantially the same manner as has been described previously. As a further result of the operation of the TC control relay R1860TC, at its contacts 4, it applies ground potential to the conductor 1802–6P extending to FIG. 20 in order to operate the six pull relay R2020 in the call recorder 2000. This will indicate to the call recorder 2000 that the particular called office code that has been dialed by the calling subscriber and that is subsequently to be recorded is one having only six digits instead of the usual seven digits. Also, at its contacts 5, the relay R1860TC prepares a circuit for operating the TD control relay R1860TD.

In view of the latter circuit, it should be noted that during the operation of the sender 1400 to transmit the different registered digits, the first three digits registered in the first, second, and third digit registers 1020, 1030, and 1040 will normally be skipped if the control relays R1860TA and R1860TB remain in their restored positions. If one or more of the first three digits dialed by the calling subscriber are to be transmitted by the sender 1400, then it is necessary to arrange the selected translate relay in the translator 2700 so that it will operate, for example, the TA or the TB control relays R1860TA or R1860TB at the same time it operates the control relay R1860TC. Operated condition of either the control relay R1860TA or R1860TB will control the send sequence switch 1420 of the sender 1400 in the manner described above.

As the wipers of the send sequence switch 1420 are advancing step-by-step over the contacts 7, 8, and 9, the corresponding digits marked on the WXYZ21, WXYZ22, and WXYZ23 code marking conductors may be transmitted or skipped depending upon the operated conditions of the control relay R1860TA and R1860TB. The send sequence switch will then advance its wipers step-by-step over the contacts 10 and 11 to transmit the hundreds and tens units registered respectively in the fourth and fifth digit registers 1010 and 1120 and marked on the WXYZ24 and WXYZ25 marking conductors. As soon as the sender 1400 has transmitted the fifth digit registered in the fifth digit register 1120 and marked on the WXYZ25 marking conductors, the send sequence switch 1420 will advance its wipers an additional step into engagement with the contacts 12 in associated contact banks. In this position, the wipers 1404 to 1407 of the send sequence switch 1420 will mark the sixth digit on the WXYZ26 code marking conductors in the banks of the send switch 1580. Also, the advancement of the wiper 1403 into engagement with the twelfth contact will extend ground potential over the skip conductor SK26 extending to FIG. 18, then by way of the contact 5 on the operated relay R1860TC to operate the relay R1860-TD. The relay R1860TD will now lock itself over a circuit including the contacts 1815, its own contacts 3, conductor 1826, contacts 1812 and the grounded locking conductor 615LGC. The sender 1400 will now transmit impulses corresponding to the sixth digit as registered in the sixth digit register 1130 and marked on the WXYZ26 code marking conductors.

However, in view of the fact that the control relay R1860TD has operated, it performs various controls, some of which are of no importance at the present time. The principal control exercised by the relay R1860TD when it is operated under control of the relay R1860TC is that the contacts 5 thereon complete a locking circuit for the relay R1860TC which is independent of the contacts 854 on the relay R850. The latter relay is only operated in the event that a seventh digit has been registered in the register 1140. Consequently, when the sender 1400 is in condition to transmit the sixth digit registered in the digit register 1130, the relay R1860TD is operated to lock the relay R1860TC in its operated position. If a seventh digit is now dialed by the calling subscriber, it will automatically be skipped by the sender 1400. On the other hand, if the seventh digit is dialed and registered in the seventh digit register 1140 to cause the operation of the fourth numerical send relay R850 prior to the transmission of the sixth digit by the sender 1400, then the contacts 854 will be opened to restore the control relay R1860TC so that the seventh digit may be transmitted.

In view of the foregoing, it will be understood that the relay R1860TC is operated under control of a translator whenever a six digit number is dialed by a calling subscriber and also when an office code identifying an exchange having mixed six and seven digit subscriber numbers is dialed. This relay can be operated in combination with either the control relay R1860TA or R1860TB which will control the sender 1400 in the manner previously described. However, if the control relay R1860TC is operated to indicate a six digit called number the control relay R1860TD will operate after the sixth digit is transmitted by the sender 1400 to prevent restoration of relay R1860TC if a seventh digit is thereafter dialed by the calling subscriber. If the seventh digit is dialed before the sender transmits the impulses of the sixth digit, then the control relay R1860TC will automatically be restored to normal as pointed out above by the operation of relay R850 and the call will be handled in the usual manner as a seven digit number.

Certain other conditions exist when it is necessary to operate the control relay R1860TD without operating any of the other control relays. This condition exists when certain predetermined three digit special service code numbers are registered respectively in the first three digit registers 1020, 1030, and 1040. Also, the TD control relay may be selectively operated by the "0" operator relay R1850TZ, the translation failure relay R1850-TT and the fault seizure intercept relay R1850TY.

In the event that three digit special code number is registered in the first three digit registers 1020, 1030, and 1040, the translator 2700 will be selected in the same manner as though these three digits identify a called office code and the selected translate relay in the translate 2700 will register whatever route digits are necessary to route the call to the special service telephone in the exchange in the WXYZ11 to WXYZ16 route registers and it will selectively control the operation of the control relay R1860TD.

When the TD control relay is operated, it will complete, at its contacts 6, a circuit including the conductor 506ST extending to FIG. 5, then by way of the conductor 506ST extending to FIG. 15 in order to control the operation of the start relay R1540 in the sender 1400. The last-mentioned circuit, however, is normally controlled from the contacts 558 on the assigner start relay 550 when the translator X2700 is involved in establishing the routing digits for the call. However, if the control relay R1860TD is operated by one of the relays R1850TZ, R1850TT, or R1850TY without requiring the use of the translator, then it is necessary to start the sender 1400 from the contacts 6 on the operated control relay R1860TD. As a further result of the operation of relay R1860TD, at its contacts 3, it completes a locking circuit for itself which includes the winding of the relay, contacts 1815, its own contacts 3, conductor 1826, contacts 1812, and the locking ground conductor 615LGC. At its contacts 1, 2, and 4, it prepares circuits for connecting the skip conductors SK24, SK26, and SK27 to the skip common conductor 1203SKC. Inasmuch as the control relay R1860TA is assumed to be in its restored position, the skip conductors SK21, SK22, and SK23 are also connected to the skip common conductor 1203SKC.

Under the foregoing conditions, the sender 1400 will transmit whatever digits are registered respectively in the WXYZ11 to WXYZ16 route registers (FIG. 17) and skip any of those registers that have no digits registered therein. Also, the wiper 1403 of the send sequence switch 1420 in advancing over the contacts 7 to 13, inclusive, will apply ground potential to the skip conductor SK21 to SK24 and SK26 and SK27. In this connection, it should be noted that the tenth and eleventh contacts accessible to the wiper 1403 are both connected to the skip conductor SK24 so that in both of the above positions, the wiper 1403 will transmit the skip controlling ground potential over the skip conductor SK24. This will permit the send sequence switch 1420 to skip all of the digit registers 1020, 1030, 1040, 1110, 1120, 1130, and 1140 having respectively the marking conductors WXYZ21 to WXYZ27, inclusive.

Referring to the send sequence switch 1420, it will be seen that when the wiper 1401 engages the contact 5, the position in which the sender transmits the route digit that may be registered in the fifth route register WXYZ15, it applies ground potential by way of the contacts 1671 on the operated control relay R1670 to the conductor 1602BA extending to FIG. 20 in order to prepare one point in the circuit for operating the code send relay R2040 in the call recorder 2000.

The above-mentioned circuit, which is prepared at the contact 5 accessible to the wiper 1401 on the send sequence switch 1420, is arbitrarily selected inasmuch as after four digits have been transmitted by the sender 1400 a toll ticket repeater, such as the repeater X2300 (FIG. 1) will be included in the connection established through the primary selector 300. The inclusion of the ticket repeater X2300 will return a signal to the call recorder 2000 to indicate that the latter circuit may begin to transmit various items of information which are to be recorded in connection with the present telephone call. The operation of the call recorder 2000 is thus delayed until after the fourth digit has been transmitted by the sender 1400 in the establishment of a connection and guarantees that sufficient switch apparatus in the switch train has been included in the connection to select a toll ticket repeater, such as X2300. The foregoing circuit for applying ground potential to the conductor 1602BA is retained as the wiper 1401 is advanced over the contacts 5 to 20, inclusive, in the associated contact bank.

In addition to the foregoing, it should be noted that the send sequence switch 1420 is arranged so that the wiper 1402 will encounter ground potential as the wipers of the switch are advanced over the contacts 1 to 9, inclusive. Thus, the ground potential at the contacts 1402 will control the previously described circuit for the pick-up relay R1630 as the wipers of the send sequence switch 1420 are advanced over the contacts 1 to 9, inclusive. During this time, the send sequence switch 1420 will transmit, or skip, each of the five route registers WXYZ11 to WXYZ16, inclusive. Also, the send sequence switch 1420 will then transmit or skip, as necessary, the digits marked on the WXYZ21, WXYZ22, or WXYZ23 marking conductors by the first, second, and third registers 1020, 1030, and 1040. When the wiper 1402 of the send sequence switch 1420 engages contact 10, a test is made to determine whether or not the sender 1400 has reached a point in the transmission of the impulses corresponding to the digits registered in the call register 900 which correspond to a numerical register that is being controlled from the calling subscriber dial.

In other words, if the calling subscriber should register the first three digits identifying a particular called office code and should then delay in dialing the thousands digit of the numerical portion of the called subscriber number, it is possible for the sender 1400 to transmit all of the route digits that have been registered as a result of the transmission of a called office code followed by the three digits of the registered called office code. The sender then attempts to send out the digit registered in the first numerical register 1110 at a time when the register has not been operated by the calling subscriber. When this condition exists, the send sequence switch 1420 will prevent operation of the pick-up relay R1630 until the subscriber dials and registers the thousands digit of the called subscriber number in the first numerical register 1110. It may be well to mention, however, that if the subscriber delays in the dialing of any of the digits for more than a predetermined length of time as determined by the timer 490, the director is arranged so that it will automatically route the call to an intercept operator position.

When the send sequence switch 1420 advances its wipers into engagement with the contact 10, the wiper 1402 will engage the conductor 861CR6 extending to FIG. 8 to determine whether or not a digit has been registered in the first numerical register 1110. In FIG. 8, it will be seen that the conductor 861CR6 is connected to contacts 823 on the first numerical send relay R820 and unless this contact is closed, the associated conductor cannot be grounded.

Referring now to the call register 900 (FIGS. 9 to 11, inclusive) it will be seen that during the time the calling subscriber is dialing the fourth digit, the receive sequence switch 1010 will have its wipers in engagement with the contacts 4 to complete the circuit for the magnet M1111. At the end of the digit, the receive sequence switch 1010 advances its wipers from engagement with the contacts 4 into engagement with the contacts 5 in order to prepare circuits to register the fifth dialed digit in the fifth digit register 1120. As soon as the wiper 1015 engages the contact 5, in the associated contact bank, a circuit is completed from the grounded conductor 871LGR, wiper 1015, conductor 801SDO extending to FIG. 8 in order to operate the first numerical send relay R820. This relay operates and, at its contacts 821, locks itself to a circuit including contacts 647 and 666 to ground. In other words, as soon as a digit has been registered in the fourth digit register 1120, the receive sequence switch 1010 advances an additional step to complete the above-mentioned circuit for operating the first numerical send relay R820. This will indicate to the controller 400 portion of the director that the fourth digit has been registered and may now be transmitted by the sender switch 1400. As a further result of the operation of the relay R820, it applies ground potential at its contacts 823 to the conductor 861CR6 extending to FIG. 14 and then by way of the wiper 1402 to control the sender 1400 to transmit the digit registered in the fourth digit register 1110.

Finally, at the contacts 822, the relay R820 applies ground potential to the conductor 805SD extending to FIG. 19 in order to ground the bank contacts 1 to 4, inclusive, accessible to the wiper 1951 on the code send switch 1950. This will signal the call recorder 2000 that a digit has been registered in the fourth digit register 1110 in the call register 900 portion of the director.

Before proceeding with the description of the operation which occurs to send out the digit registered in the fourth register 1110, it should be understood that the second, third, and fourth numerical send relays R830, R840, and R850 are successively operated over circuits that are substantially identical to the circuit described above for operating the first numerical send relay R820. These relays are successively operated as the wiper 1015 of the send sequence switch 1010 engages the contacts 6, 7, and 8 after the registration of the fifth, sixth, and seventh digits in the registers 1120, 1130, and 1140. Each of the above-mentioned relays will be locked in the operated position over the same circuit which locks relay R1820 and each of the relays will complete circuits at their contacts 833, 842, and 855 for grounding the respective conductors 806SE, 807SF, and 808SG extending to FIG. 19 to indicate to the call recorder 2000 that the fifth, sixth, and seventh digits have been registered in the call register 900.

The contacts 834 on the second numerical send relay R830 will apply ground potential to the conductor 862CR7 extending to FIG. 14 to mark the eleventh contact in the bank accessible to the wiper 1402. The eighth and ninth contacts terminate the conductors 863CR8 and 864CR9 which are connected to the contacts 843 and 853 on the respective third and fourth numerical send relays R840 and R850. The above-mentioned contacts connect the conductors 863CR8 and 864CR9 to the conductors 865CG1 extending to FIG. 20 and 866CG2 extending to FIG. 19.

In FIGS. 19 and 20 it will be seen that these conductors will normally be grounded at the contacts 2022 and 2013 if the relays R2020 and R2010 remain in their restored positions. Normally, however, the AB toll relay R2010 will be operated whenever a recording is to be made of a telephone call and removes ground potential from the conductor 866CG2. Also, the relay R2020 will be operated whenever the called office code registered in the call register 900 indicates that the subscriber number is a six digit number instead of the usual seven digit number. The ground potential for the conductors 865CG1 and 866CG2 will be supplied from the wiper 1952 when the relays R2010 and R2020 are operated.

In view of the foregoing, it will be appreciated that as the wiper 1402 of the send sequence switch 1420 engages the contacts 10, 11, 12, and 13, the sender 1400 will not attempt to transmit any switch controlling impulses unless the conductors terminating the above-mentioned contacts have been grounded in the manner described above.

Since the conductors 863CR8 and 864CR9 are grounded under control of the circuits in the call recorder 2000 (FIGS. 19 to 21, inclusive) the sender 1400 cannot send out the last two digits registered in the sixth and seventh digit registers 1130 and 1140 until the call recorder 2000 has performed all of its operations. Returning again to the sender 1400 portion of the director, it will now be assumed that seven digits have been dialed by the calling subscriber and it will also be assumed that the call recorder 2000 portion of the director has performed all of its operations in transmitting items of record information to the toll ticket repeater X2300 (FIG. 1) so that the sender is able to send out all of the impulses of the different digits registered in the digit registers of the call register 900. It should be understood, however, that certain of the digits as registered in the digit register 900 may have been skipped during the transmission period of the sender 1400 depending upon the operated conditions of the various control relays R1860TA to R1860TD, inclusive. In any event, as soon as the wiper 1403 of the send sequence switch 1420 in the sender 1400 engages the associated bank contact 14, ground potential is extended by way of the conductor 1441Y extending to FIG. 16, contacts 1661, conductor 1601CR31, contacts 2011 (relay R2010 having been restored to normal), conductor 701CR22 extending to FIG. 9, conductor 701CR22 extending to FIG. 7 and the winding of the director release relay R680 to battery. Operation of the director release relay R680 in the controller 400 portion of the director will control the restoration of the director in the manner to be described hereinafter.

It may be well to mention at this time that when the call register 1200 (FIGS. 12 and 13) is utilized in conjunction with the call register 900 in order to register respectively the eighth, ninth, and tenth and possibly the eleventh digit dialed by a calling subscriber who desires a national toll connection, the above-traced circuit for operating the director release relay R680 will not be completed until the wiper 1403 of the send sequence switch 1420 is finally stepped into engagement with the contact 18. In the latter event, the ground potential on the wiper 1403 is directly connected to the conductor 701CR22 extending to FIG. 9 to complete the operating circuit for the director release relay R680.

During the period of time when the wipers 1404 to 1407 of the send sequence switch 1420 successively engage the contacts 14 to 17, inclusive, the digits marked in code form on the WXYZ28 to WXYZ31 code marking conductors by the registers 1310, 1320, 1330, and 1340 will be transmitted by the sender 1400 in the manner previously described. In order to retain the wiper 1402 of the send sequence switch 1420 grounded as it steps over the contacts 14 to 17, inclusive, the conductor 1442CG3 will be grounded from the contacts 2133 on the wiper switching relay R2130 in the call recorder 2000.

Before discussing the above-mentioned operation of the sender 1400 to transmit the digits registered in the digit register 1200 (FIGS. 12 and 13) the operations of the call recorder 2000 that must be performed before the release of the director will now be described.

*Operation of the call recorder 2000*

A description will now be given of the mode of operation of the call recorder 2000 illustrated in FIGS. 19 to 21, inclusive. Before proceeding with this description, it should be noted, however, that in FIG. 19, the detector 1900 and the detector assigner 1910 have been illustrated in block diagram form since they are shown and described in detail in the previously-mentioned Coleman patent.

Reference should be made to the above-mentioned Coleman patent for a detailed description of the operation of the detector 1900 and the detector assigner 1910. It should be understood, however, that any well known type of detector may be employed to detect the identity of a calling subscriber line and to register the directory number of such a line in the call recorder 2000 so that the information concerning the identity of the calling subscriber substation may subsequently be recorded on the toll ticket that is automatically produced of each telephone connection. Such a detector may, for example, be of the type disclosed in the Ostline Patent No. 2,639,330, granted May 19, 1953. Regardless of the type of the detector that is employed in the present system, it will be appreciated that it is first necessary to associate the common detector with the particular director that is calling for the identity of the particular calling subscriber substation. It is for this purpose that the detector assigner 1910 is provided.

In the above-mentioned Coleman patent, the detector assigner 1910 is an all-relay type assigner that will be controlled from the call recorder 2000 portion of a calling director to cause the detector assigner 1910 to associate the detector 1900, when it becomes available, to the exclusive use of the call recorder 2000. When this association is made, the detector 1900 will identify the numerical portion of the directory number of the calling subscriber substation on a terminal per station basis. Identification of a calling subscriber on a terminal per station basis means that each subscriber substation on a party line is identified by a different directory number and is selected as a called station from different terminals in the banks of the connectors having access to the subscriber lines. The numerical portion of the directory number of the calling subscriber line will be registered respectively on the code storage relay WXYZ1 to WXYZ5, inclusive. These registers are shown in block diagram form in FIG. 19 and each register includes four relays which are selectively operated over four WXYZ conductors in various combinations or individually to register any one of the digits 1 to 9 and 0 in the manner described hereinbefore. It may be well to mention at this time that the WXYZ1 register will register the exchange number corresponding to the third digit of the called subscriber directory number. For example, if the calling subscriber line has the directory number FL31234 corresponding to the FLorida 3 exchange, the digit 3 will be automatically registered in the WXYZ1 register and the digits 1234 identifying the numerical portion of the calling subscriber directory number will be registered respectively in the WXYZ2 to WXYZ5, inclusive, registers in FIG. 19.

The call recorder 2000 is also provided with a code send switch 1950 which is arranged to transmit in code form to the toll ticketing repeater that has been included in the connection, various items of information which have been stored either in the call recorder 2000 or which have been stored in the call registers 900 and 1200.

Continuing now with the operation of the call recorder 2000, it will be recalled that the translator 2700 operated to register appropriate route digits in the route registers of the coder 1800. Also, the translator X2700 applied ground potential to certain of the TA, TB, TC, TD, and ABT control conductors in the cable 1701 whereby the corresponding control relays in the coder 1800 operated to govern the sending operation of the director. The application of ground potential to the ABT conductor, extending to the coder 1800, completed the previously described circuit for operating the AB toll relay R2010 in the recorder 2000. This relay is operated whenever the translator X2700 determines that the call recorder 2000 is required in conjunction with making a permanent record of the items of information pertaining to a telephone connection. The relay R2010 upon operating, at its contacts 2012', locks itself to the grounded locking conductor 605CR29 extending to FIG. 6.

If the particular called exchange dialed by the calling subscriber is a six digit exchange, the relay R2020 will be operated over the six pull conductor 1802–6P by the control relay R1860TC in the coder 1800. Operations controlled by the 6 PULL relay R2020 will be explained in further detail hereinafter.

As soon as the AB toll relay R2010 operates in the manner described above, it closes its contacts 2019 to complete an obvious circuit for operating the relay R2150. At its contacts 2014 it completes an obvious circuit for illuminating the ABT lamp L2025 to indicate that an AB toll call is being handled by the particular director. At its contacts 2013, the relay R2010 removes ground potential from the conductor 856CG2 extending to the controller 400 portion of the director (FIG. 8) and, at its contacts 2016, it prepares a point in the circuit for sending coded information corresponding to the various items of information over the conductor 271T to the particular toll ticket repeater that is included in the established connection.

At the contacts 2015 and 2017, the relay R2010 prepares circuits for controlling the detector assigner 1910 whereby the common detector 1900 will be connected to the call recorder 2000. In this connection it should be noted that at the contacts 2015, ground potential at the contacts 2161 will be extended by way of the contacts 2062 and 2015 to ground the tens conductor C2026 extending to the detector assigner 1910 to mark the 0 tens group of directors as calling to the detector assigner 1910. The ten directors in the exchange having the tens digit 0 will thus be marked as calling. At the contacts 2017, the relay R2010 connects the winding of the marginal detector test relay R2180 by way of the contacts 2162, 2065, and 2017 to the cross-point return conductor C2027 extending to the detector assigner 1910. The application of the resistance battery potential through the winding of the relay R2180 to the cross-point return conductor C2027 will selectively mark the units digit 1 of the particular calling director 01 to the detector assigner 1910. Thus, the assigner 1910 has been informed that the "01" director in the exchange is the only calling director that should now be connected to the common detector 1900.

In the above-mentioned circuits controlled by the AB toll relay R2010, it was pointed out that it caused the operation of relay R2150. This relay, at its contacts 2151, interrupts a point in the pulsing circuit for the pulse relay R2050 to prevent premature pulsing by this relay, at the contacts 2052, over the conductor 271T. Also, at the contacts 2152, the relay R2150 prepares a point in the circuit including the conductor 444MS4 for forcibly controlling the operation of the code send relay R2040 if the relay R2150 has not been released within a predetermined interval of time.

The detector assigner 1910 will now control the connection of the call recorder 2000 portion of the calling director (01) to the detector 1900. As soon as the detector is available, a circuit will be completed from the detector assigner 1910 over the above cross-point return conductor C2027 to complete the above-mentioned circuit for operating the marginal detector test relay R2180. Operation of the relay R2180 completes, at its contacts 2181 a circuit including the contacts 2061, the conductor 513PM extending to FIG. 5, conductor 513PM extending to FIG. 18 and then by way of contacts on operated ones of the party station relays shown in FIG. 18 to one of the conductors 1891P1 to 1896POX extending to FIG. 19 to mark one of these conductors to the detector 1900. The marking potential on one of the above-mentioned conductors will indicate to the detector 1900 the particular class of the calling subscriber station that has been registered in the party station relays of FIG. 18.

As a further result of the operation of relay R2180, at its contacts 2185, it completes a circuit including ground at contacts 2063 and the conductor 1963BR3 extending to FIG. 19 in order to operate the director detector connect relay R1910. This relay is a multi-contact relay that is individual to the call recorder 2000 portion of the calling director "01" and when it is operated, it connects all of the conductors of the call recorder 2000 to the corresponding conductors extending to the detector 1900. It should be understood, however, that all of the conductors extending to the detector 1900 are multiply connected to all of the corresponding contacts on the detector connect relays of each of the directors in the system. The particular connect relay R1910 is operated due to the fact that the detector assigner 1910 (FIG. 19) has completed circuits therethrough (not shown) whereby the marginal detector test relay R2180 is operated. As long as the relay R2180 is directly controlled by the detector assigner 1910, no other director detector connect relay, such as R1910, can be operated by the detector assigner 1910 to connect another director to the detector 1900.

As a further result of the operation of relay R2180, at its contacts 2184, it completes a circuit including the winding of the detector signal relay R2170, contacts 2067 and ground at contacts 2011' on the operated AB toll relay R2010. Finally, at its contacts 2182 and 2183, the relay R2180 disconnects the circuit for the relay R2190 from the conductor 443MS3 extending to FIG. 4 and instead connects the above-mentioned conductor to the circuit including the winding of the detector failure relay R2160.

At the present time, the director detector connect relay R1910 is operated to interconnect the detector 1900 to the call recorder 2000 and the latter circuit is arranged so that it will respond to and register the code signals corresponding to the identity of the calling subscriber line registered in the WXYZ1 to WXYZ5 registers. If the present call originated on a party line, the identity of the position of the station on that line is registered in the party station relays of FIG. 18. These relays will mark certain of the conductors 1891P1 to 1896POX extending to the detector 1900 so that the detector will operate to identify the numerical portion of the directory number of only the particular calling station on the party line.

As soon as the detector signal relay R2170 operates, it disconnects the ground potential at the contacts 2172 from the conductor 272LS extending to FIG. 2. It was previously pointed out that the ground potential applied to this conductor is extended by way of the wiper 257 of the director hunter 250 (FIG. 2), conductor 305LS, contacts 317 and 309, conductor C246 through the line finder 240 in order to retain the latter switch in its operated position and also by way of the wiper 236 and conductor C232 to retain the line circuit 205 in its operated position and then by way of the C conductor in the cable 204 to the bank contacts of the connectors having access to the particular calling party line to busy the same and prevent other calls from being extended thereto. As soon as the contacts 2173 are closed, the 90 volt positive potential booster battery is extended over the above-traced circuits in order to retain the line finder 240 and the line circuit 205 in its operated position and to retain the busy marking conductor in the C conductor in the cable 204. Also, this positive 90 volt booster battery potential is extended over the "S" lead individual to the particular calling subscriber line to the detector 1900, schematically illustrated in block diagram form in FIG. 19.

The above-mentioned positive 90 volt booster battery potential in addition to the negative 50 volt regular exchange battery potential giving a total differential of plus 140 volt D.C. causes the detector to identify the particular numerical portion of the directory number of the calling subscriber line. The detailed operations of the detector to determine the directory number of the particular calling subscriber station on a party line or any other class of line is described in detail in the above-mentioned copending Coleman patent, as well as in the above-mentioned Ostline Patent No. 2,639,330, granted May 19, 1953. Actually, the detector 1900 is selectively controlled by the positive booster battery potential applied to the particular calling subscriber line and will transfer in code form the digital values of the thousands, hundreds, tens, and units digits of the numerical portion of the calling subscriber directory number to the WXYZ2 to WXYZ5 registers schematically illustrated in FIG. 19. The digit corresponding to the numerical identification of the particular exchange in which the calling subscriber is terminated (the third digit of the calling exchange code) is prewired in the detector 1900 and is registered in the WXYZ1 register in FIG. 19. It should be understood that it is not necessary to identify the first two digits corresponding to the calling exchange name inasmuch as this information is prewired in the toll ticketing apparatus that is installed in the corresponding exchange.

When the detector 1900 has completed the identification of the numerical portion of the calling subscriber directory number, it applies ground potential to the conductor 1961EB extending to FIG. 20 to cause the operation of the detection complete relay R2060. Thus, an indication is given that the detection operation by the detector 1900 has been completed. In response to the operation of relay R2060, at its contacts 2068, it completes an obvious circuit including its upper winding whereby the relay is locked in its operated position to ground potential at the contacts 2011'.

At the contacts 2067, the relay R2060 interrupts the above-mentioned circuit for the detector signal relay R2170 in order to restore the latter relay. Also, at its contacts 2065, the relay R2060 interrupts a point in the previously described circuit for the marginal detector test relay R2180 thereby to cause the restoration of the latter relay. At its contacts 2061, the relay R2060 interrupts a point in the previously described circuit including the conductor 513PM extending to FIG. 5 in order to remove the marking ground potential from the contacts of the operated party station relays in FIG. 18. At its contacts 2062, the relay R2060 removes ground potential from the conductor C2026TENS extending to FIG. 19 thereby to release the detector assigner 1910 so that it can now be utilized by the call recorder portion of any other director in the exchange. At the contacts 2063, the relay R2060 removes ground potential from the conductor 1963BR3 extending to FIG. 19 in order now to restore the director detector connect relay R1910 individual to the call recorder 2000 portion of the director. Restoration of the relay R1910 automatically disconnects all of the conductors in the call recorder 2000 from the corresponding conductors extending to the detector 1900. Finally, at its contacts 2064, the relay R2060 connects a circuit including the upper winding of the code send relay R2040 to the conductor 271T extending to FIG. 2.

Referring now to FIG. 2, it will be seen that the conductor 271T is further extended by way of the wiper 256, conductor 304T, contacts 315 and 324, wiper 364, conductor 2301T in the cable C2302 extending to the toll ticket repeater X2300 in the AB toll equipment of FIG. 22. The above-mentioned circuit is prepared at this time so that coded signals corresponding to the items of information stored in the call recorded 2000 and in other parts of the calling director may be transmitted by the call recorder 2000 to the ticket repeater X2300. Before describing these operations, however, it will first be necessary to note the controls exercised by the restoration of the detector signal relay R2170 and the detector test relay R2180.

Referring now to the detector signal relay R2170, it is apparent that as soon as it restores to normal, it interrupts the circuits including its contacts 2173 and 2174 in order to remove the positive 90 volt booster battery detection signal from the conductor 272LS and to reestablish the direct ground potential at the contacts 2172 on the conductor 272LS. As soon as the relay R2180 restores to normal it interrupts, at its contacts 2185, a further point in the previously described circuit including the conductor 1963BR3 extending to FIG. 19 and, at its contacts 2181, it interrupts a further point in the previously described circuit including the conductor 513PM extending to FIG. 5. The detection cycle whereby the detector 1900 is connected to the called recorder 2000, detects the identity of the calling subscriber directory number and registers the same in the call recorder 2000 is now completed and the detector 1900 rendered available for use by other call recorders.

Before leaving the description of operation of the detector 1900, it should be noted that the conductor 1962INC terminating in one of the contacts on the director detector connect relay R1910 is provided so that the detector 1900 can signal the call recorder 2000 whenever the detector fails to complete the detection of the calling subscriber directory number. This operation is described in detail in the above-mentioned Coleman patent and it it also included in the description of the operation of the detector shown in the Ostline Patent No. 2,639,330. It should therefore be understood that upon the failure of the detector to detect the calling subscriber, it will apply ground potential to the conductor 1962INC extending to FIG. 21. in order to operate the detector failure relay R2160. As soon as the relay R2160 is operated in the manner described above or, for example, by a ground potential applied to the conductor 443MS3 by the timer 490 (FIG. 4) it immediately locks itself over a circuit including its contacts 2165 and ground potential at the contacts 2011'. It will be apparent from the foregoing description that if the relay R2160 is operated, as noted, the detection complete relay R2060 cannot possibly be operated. Consequently, the relay R2160 is provided with the contacts 2161 and 2162 which will perform the same controls as those previously described in conjunction with the contacts 2062 and 2065 on the relay R2060. Thus, the detection failure relay R2160 will control the detector 1900 to disconnect the call recorder 2000 from the detector assigner 1910. Also, at its contacts 2163, it opens a circuit including the condutor 443MS3 in order to prevent the timer 490 from controlling certain relays in the call recorder 2000. At its contacts 2164, the relay R2160 will apply the ground potential on the conductor 605CR29 to the conductor 1207DR extending to FIG. 16 thereby to operate the incomplete detection relay R1660 in the sender 1400. The operation of the latter relay as will be subsequently described causes the director to release whatever connection it has established through the primary selector 300 and, subsequent switches in the switch train, and to reestablish a new connection to an operator position under control of routing digits that are preregistered in the coder 1800. As a further result of the operation of the relay R2160, at its contacts 2166, it completes a circuit including the contacts 2113 for operating the no detection alarm relay R2110. The relay R2110 in turn locks itself by way of its X contacts 2111 to ground potential at the no detection reset key K2116. At its contacts 2119, the relay R2110 now completes an obvious circuit for illuminating the no detection alarm lamp L2117 thereby to indicate that a no detection condition has been encountered by the call recorder 2000.

Finally, at its contacts 2114, the relay R2110 completes a circuit including the resistor 2115 for dimly illuminating the lamp L2118 to indicate the fact that the call recorder 2000 is involved in a detection failure condition.

*Transfer of the items of information from the call recorder 2000 to the toll ticket repeater*

In the foregoing description of the operation of the director, it will be recalled that the call recorder 2000 was operated to cause the detection of the calling subscriber directory number as soon as a translation is made by the translator X2700 of the first three digits dialed by the calling subscriber. The various routing digits that have been determined by the selection of a particular translate relay in the translator X2700 have been registered in the route registers (FIG. 17) of the coder 1800 portion of the director. These route digits are then transmitted one at a time by the send sequence switch 1420 of the sender 1400. It should be apparent from the foregoing that the call recorder 2000 and the detector 1900 are functioning to identify the directory number of the calling subscriber line at substantially the same time that the send sequence switch 1420 of the sender 1400 is transmitting the first four digits including the routing digits registered in the coder 1800 and any additional digits that may be registered in the call register 900. It will also be appreciated that the calling subscriber may still be dialing some of the digits of the called subscriber directory number into the numerical registers of the call register 900 and the numerical registers of the call register 1200. In any event, when the call sender 1400 under control of the send sequence switch 1420 has completed the sending of the fourth digit, the wiper 1401 of the send sequence switch 1420 will engage the contact 5 in the associated contact bank (FIG. 14) and apply ground potential to a circuit including the contacts 1671 of the operated control relay R1670, conductor 1602BA extending to FIG. 20, upper winding of the code send relay R2040, contacts 2043, 2064, and 2016 to the conductor 271T in order to control the ticket repeater X2300 that has been included in the connection thus far established by the digits transmitted by the sender 1400.

As soon as the ticket repeater X2300 included in the connection is available to receive the items of information that have been stored in the director in conjunction with the present connection, a low resistance battery potential is returned over the above-mentioned circuit to the conductor 271T thereby to complete an operating circuit for the upper winding of the code send relay R2040. Ground potential is retained on the conductor 1602BA as the wiper 1401 of the send sequence switch 1420 is advanced step-by-step over the contacts 5 to 20, inclusive, in the associated contact bank. In other words, all of the digits that can be possibly stored in the director in use will be transmitted before ground is removed from the conductor 1602 BA.

The battery potential returned over the conductor 271T by the connected toll ticket repeater X2300 will operate the code send relay R2040, as noted above. As soon as the relay R2040 operates, it closes its X contacts 2042 before it interrupts its contacts 2043 in order to complete the operating circuit for the lower winding of the relay. This locking circuit includes the ground potential at the contacts 2011' on the operated AB toll relay R2010. Operation of the relay R2040 over its lower winding will interrupt at the contacts 2043 its initial operating circuit. At the contacts 2041, the relay R2040 prepares a point in the incomplete circuit for controlling the pulse relay R2050.

Finally, at its contacts 2044, a circuit is completed for controlling the magnet M1957 of the code send switch 1950 to advance the wipers 1951 to 1955, inclusive, one step in a counter-clockwise direction from the normal home contact position into engagement with the contacts 1 in the associated contact banks. This circuit may be traced by way of battery to the winding of the magnet M1957, contacts 1958, 2044, 2035, and off-normal contacts 1959B. The magnet M1957 now operates and immediately opens its own circuit, at its contacts 1958, to restore to normal and advance its wipers one step in the counter-clockwise direction. As soon as the wipers 1951 to 1955, inclusive, have been advanced from the normal home contact position (contact 26 of the banks accessible respectively to the wipers 1951 and 1952) the off-normal contacts 1959B will be opened and the off-normal contacts 1959A will be closed. The latter contacts will now remain in the closed position until the wipers are again rotated into engagement with the home contact position in the associated contact banks. When this occurs, the off-normal contacts 1959B will again be closed and the contacts 1959A will be opened.

As soon as the off-normal contacts 1959A are closed, ground potential is extended by way of the contacts 2013' and 2032 to complete the operating circuit for the pulse start relay R2030. The relay R2030 immediately locks itself by way of its contacts 2033 to ground potential at the contacts 2011'. It should be noted, however, that the operation of the relay R2030 completes a circuit at its contacts 2034 whereby the initial operating ground potential for the relay R2030 is further extended over a circuit including the contacts 2084 in order to operate the relay R2070. As long as the initial operating ground potential is retained on the circuit for the relay R2070, the locking circuit for the relay including the relay R2080 is temporarily short-circuited. Thus, the first wiper switching circuit R2080 can not immediately operate.

Referring again to the pulse start relay R2030, it will be noted that at its contacts 2035 it interrupts a further point in the initial operating circuit for the magnet M1957 and, at its contacts 2031, it completes a circuit for energizing the lower winding of the control relay R2150. This relay is also energized at this particular time over a circuit including its upper winding from ground at contacts 2019. The relay R2150 is differentially wound so that the upper and lower windings oppose one another and will operate or be retained in its operated position only when an energizing circuit is completed for one of its windings. At the present time, however, the energizing circuits simultaneously completed for both windings of the relay will oppose one another and, accordingly, cause the relay to restore its contacts 2151 and 2152 to the position illustrated in the drawings. The closing of the contacts 2151 by the restoration of the relay R2150 now completes a circuit for operating the self-interrupted pulse generating relay R2050. This circuit includes battery, lower winding of the relay, self-interrupting contacts 2051, contacts 2131, 2151, and 2041 to ground. The relay is also provided with an upper winding that is included in a circuit of an adjustable condenser to ground. This condenser is schematically illustrated and has sufficient capacity to cause the pulsing relay R2050 to operate and restore at approximately 13 to 15 pulses per second to provide a 65% to 75% pulse at the contacts 2052. The discharge condenser associated with the upper winding of the relay R2050 will govern the pulsing rate of the relay and it will be understood by those skilled in the art that if the capacity of the condenser is increased, the pulsing rate of the relay will be reduced and if the capacity of the condenser is decreased, it will increase the pulsing rate of the relay.

Each time the pulse relay R2050 operates, it closes its contacts 2053 in order to complete an obvious circuit for operating the magnet M1957 on the code send switch 1950. Each time the above-mentioned relay restores to normal, the contacts 2053 will be opened in order to interrupt the circuit of the magnet M1957 whereupon the magnet will advance its wipers 1951 to 1955 an additional step in the counter-clockwise direction. Also, at the contacts 2052, the relay R2050 will connect resistance ground potential through the resistor 2142 or direct ground potential through the contacts 2141 to the conductor 271T extending to FIG. 2. It should be noted that the mark relay R2140 will close its contacts 2141 to apply the direct ground potential to the above-mentioned conductor and simultaneously it short-circuits the resistor 2142. The operated or unoperated condition of the mark relay R2140 will be governed by the ground or absence of ground potential encountered by the wipers 1953, 1954, or 1955 as they successively become effective during rotation over the associated contact banks. Markings on the associated conductors will be governed in accordance with the particular item of information that is to be transmitted to the toll ticket repeater as the wipers of the code send switch 1955 are advanced over the associated contact banks. It should be noted that each time the contacts 2052 are opened, the ground or resistance ground potential will be removed from the conductor 271T.

When the wipers 1951 to 1955, inclusive, of the code send switch 1950 engage the contacts 1 in the associated contact banks, the mark relay R2140 will be operated if the corresponding contact in the bank accessible to the wiper 1953 is grounded. At this point, it will be noted that the WXYZ6, WXYZ7, and WXYZ8 code marking conductors terminate respectively in the contacts 1 to 12, inclusive, accessible to the wiper 1953. These conductors are also connected at the opposite ends to terminals provided on the terminal block TB1953 and will be jumpered to the ground terminal thereon in accordance with a three digit number identifying the particular call recorder 2000 that is now being used. In the previous description, it was pointed out that the director being used is the "01" director, for the purpose of describing the operations involving the translator assigner X2800. It will be assumed that this director is identified on the terminal block TB1953 as the "001" director, but it should be noted that the first 0 of the three digit number may be omitted, if desired. The above-mentioned WXYZ6 to WXYZ8 code marking conductors will be marked in code form in accordance with the previously described WXYZ marking code. Thus, the first digit 0 will be marked on the WXYZ6 marking conductors by grounding only the conductor Z6. The second 0 will be marked on the WXYZ7 marking conductors by grounding only the conductor Z7 and the digit 1 will be marked on the WXYZ8 code marking conductors by grounding the conductors W8 and X8. Consequently, as the wiper 1953 is advanced step-by-step over the contacts 1 to 12, inclusive, it will operate the mark relay R2140 when the wiper 1953 engages the bank contact terminating the grounded W6, the grounded W7 and the grounded W8 and X8 code marking conductors. This will cause the contacts 2141 to transmit a direct ground pulse over the conductor 271T. In the other positions, the wiper 1953 will engage ungrounded contacts during the stepping action and will consequently transmit the ground potential through the resistor 2142 to the conductor 271T.

In view of the foregoing, it will be understood that upon each operation of the code pulse relay R2050, the magnet M1957 will be operated and restored to advance its wipers step-by-step and depending upon the operated or restored relay R2140, either a ground or a resistance ground pulse will be transmitted over the conductor 271T extending to FIG. 2. This conductor, as previously described, completes a circuit through the director hunter 250, the primary selector 300 by way of its wiper 364 and the conductor 2301T to the toll ticket repeater X2300 schematically illustrated in FIG. 22.

The above-mentioned toll ticket repeater and associated switching apparatus including the toll ticket repeater selector X2700 and other record producing equipment schematically illustrated in FIG. 22 is shown and described in detail, for example, in the Ostline Patent No. 2,678,353. It may be well to mention, however, that as the relay R2050 pulses its contacts 2052 to transmit either the resistance ground or direct ground pulses over the conductor 271T to the connected toll ticket repeater X2300, a receiving switch in that repeater is stepped in unison with the code sequence switch 1950. Each direct ground pulse transmitted over the circuit to the toll ticket repeater X2300 will cause the registration circuits in the ticket repeater to register a corresponding indication on the associate code registers. On the other hand, each time the resistance ground potential through the resistor 2142 (1000 ohms) is transmitted, no registration will be made in associate code registers. In view of the foregoing, it will be appreciated that the WXYZ code markings on each of the different sets of code marking conductors accessible to the wipers of the code send switch 1950 will be transferred by means of the direct ground and resistance ground pulses to the associated toll ticketing repeater X2300 and registered therein.

The wiper 1953 of the code send switch 1950 will be advanced step-by-step over the associated contacts 1 to 25, inclusive, to transmit in code form the items of information registered on the associated WXYZ markings, as follows:

| Contact position | Code marking | Information transmitted |
|---|---|---|
| 1 | W6 | |
| 2 | X6 | Director identity |
| 3 | Y6 | (Hundreds digit). |
| 4 | Z6 | |
| 5 | W7 | |
| 6 | X7 | Director identity |
| 7 | Y7 | (tens digit). |
| 8 | Z7 | |
| 9 | W8 | |
| 10 | X8 | Director identity |
| 11 | Y8 | (units digit). |
| 12 | Z8 | |
| 13 | | Not used. |
| 14 | W21 | |
| 15 | X21 | Called number, first digit |
| 16 | Y21 | (called office or national toll code). |
| 17 | Z21 | |
| 18 | W22 | |
| 19 | X22 | Called number, second digit |
| 20 | Y22 | (called office or national toll code). |
| 21 | Z22 | |
| 22 | W23 | |
| 23 | X23 | Called number, third digit |
| 24 | Y23 | (called office or national toll code). |
| 25 | Z23 | |
| 26 | ---------- | Stepping pulse. |

From the above table, it will be understood that the identity of the calling director as marked on the terminal block TB1953 will first be transmitted to the associated toll ticket repeater and, thereafter, the code markings on the WXYZ21, WXYZ22, and WXYZ23 conductors as marked thereon by the first, second and third digit registers 1020, 1030, and 1040 will be transmitted to the ticket repeater. As previously described, these three digits of the called number may either be the first three digits of a called office code or the first three digits of a national toll code.

After the wipers 1951 to 1955, inclusive, engage the contact 26 position in the associated contact banks, the off-normal contact 1959A will be open and the off-normal contact 1959B will be closed. When this occurs, the ground potential will be removed from the above-described circuit including the contacts 1959A, 2013', 2034, 2084, and the winding of the relay R2070 in order to permit the above-mentioned relay to lock itself over the circuit including the contacts 2071, winding of the first wiper switching relay R2080 and ground at contacts 2011'. In other words, the relay R2080 is permitted to operate in series with the relay R2070 as soon as the ground potential is removed at the contacts 1959A. The closing of the off-normal contacts 1959B performs no control at the present time.

Referring now to the relay R2080, it will be seen that at its contacts 2081 and 2082, it transfers the circuit for the mark relay R2140 from the wiper 1953 to the wiper 1954 of the code send switch 1950. The latter circuit may be traced from the winding of the relay R2140, contacts 2082 and 2134 to the wiper 1954. As a further result of the operation of the first wiper switching relay R2080, at its contacts 2084, it interrupts a point in the previously described initial operating circuit for the relay R2070 and, at its contacts 2083, it prepares a point in the circuit for operating the relay R2120 as soon as the off-normal contacts 1959A are again closed.

Inasmuch as the pulse relay R2050 continues to operate and restore in the cyclic manner previously described, it will control its contacts 2052 and 2053 to continue to transmit either direct ground or resistance ground pulses over the conductor 271T and to transmit pulses to control the operation and restoration of the magnet M1957. Consequently, during the time the wipers 1951 to 1955, inclusive, are rotating during the first stepping cycle, the wiper 1953 is effective to control the transmission of the direct ground or resistance ground pulses over the conductor 271T. However, as soon as the wipers reach the 26th contact position, the first wiper switching relay R2080 is operated so that the wiper 1954 will be effective during the second stepping cycle.

The next time the pulse relay R2050 restores and interrupts the circuit, at its contacts 2053, for the magnet M1957, the wipers 1951 to 1955, inclusive, will be advanced into engagement with the contacts 1 in the associated contact banks. As a result thereof, the off-normal contacts 1959A will again be closed to complete a circuit including the contacts 2013', 2034, 2083, and 2136 for operating the relay R2120. For this purpose, a point in the circuit, including the contacts 2121, is completed whereby the second wiper switching relay R2130 may be operated at the completion of the second stepping cycle of the code send switch 1950.

The wipers 1951 to 1955, inclusive, will now be advanced step-by-step over the contacts in the associated contact banks but only the wiper 1954 will be effective to control the mark relay R2140 in accordance with the code markings on the associated bank contacts. In this connection, it will be recalled that the WXYZ1 to WXYZ5 registers have been controlled respectively to register the third, fourth, fifth, sixth, and seventh digits of the directory number of a calling subscriber line. The four relays (not shown) of each of the above-noted registers are arranged to be operated in code form in the manner previously described and operated ones of the relays will be locked in their operated position to ground potential at the contact 2011'. Also, ground potential will be applied to the different WXYZ1 to WXYZ5 code marking conductors in accordance with the respective digits that have been registered.

In view of the foregoing, it will be understood that the various items of information stored in the registers WXYZ1 to WXYZ5 will be transmitted to the associated toll ticket repeater X2300 as the wiper 1954 advances over its associated contacts in the following manner:

| Contact position | Code marking | Information transmitted |
|---|---|---|
| 1 | | Not used. |
| 2 | | |
| 3 | | |
| 4 | | |
| 5 | W1 | Calling station directory No. (third office code digit). |
| 6 | X1 | |
| 7 | Y1 | |
| 8 | Z1 | |
| 9 | W2 | Calling station directory No. (thousands digit). (thousands digit). |
| 10 | X2 | |
| 11 | Y2 | |
| 12 | Z2 | |
| 13 | W3 | Calling station directory No. (hundreds digit). |
| 14 | X3 | |
| 15 | Y3 | |
| 16 | Z3 | |
| 17 | W4 | Calling station directory No. (tens digit). |
| 18 | X4 | |
| 19 | Y4 | |
| 20 | Z4 | |
| 21 | W5 | Calling station directory No. (units digit). |
| 22 | X5 | |
| 23 | Y5 | |
| 24 | Z5 | |
| 25 | | Not used. |
| 26 | | |

In view of the foregoing table, it will be appreciated that during the second stepping cycle of the wipers of the code send switch 1950, the third digit of the calling office code and the four digits of the numerical portion of the directory number of the calling station will be transferred from the registers in the call recorder 2000 to corresponding registers provided in the associated toll ticket repeater X2300.

At the end of the second stepping cycle of the wipers 1951 to 1955, inclusive, the off-normal contacts 1959A on the code send switch 1950 will again be open. As a result thereof, the short-circuit around the second wiper switching relay R2130 will be removed therefrom so that a circuit is now completed from the winding of the relay R2120, contacts 2121, second wiper switching relay R2130 and ground at contacts 2011' so that the relay R2130 will operate in series with the relay R2120. At this time the relay R2130 disconnects the circuit of the mark relay R2140 from the wiper 1954, at its contacts 2134, and at its contacts 2135 the mark relay R2140 is connected to the wiper 1955 of the code send switch. Also, at its contacts 2133, the relay R2130 applies a controlled ground potential to the wiper 1952. At its contacts 2131 the relay R2130 disconnects the operating ground potential at the contacts 2041 from the pulse relay R2150 and, at its contacts 2132, it connects the pulse relay R2050 to a circuit including the wiper 1951. The latter circuit is arranged so that the pulse relay R2050 con not be self-interruptedly operated unless the wiper 1951 supplies the operating ground potential from conductors terminating in associated bank contacts. As a final result of the operation of relay R2130 it interrupts, at its contacts 2136, the initial energizing circuit for the relay R2120. However, the latter relay remains in its operated position in series with the relay R2130.

Since the wipers 1951 to 1955, inclusive, are in engagement with the contact 26 position in the associated contact banks, the wiper 1951 will not supply ground potential for reoperating the pulse relay R2050 unless the conductor 805SD is grounded. This conductor is multiply connected to the contacts 1 to 4 and 26 in the associated contact bank so that it will govern the pulsing of the relay R2050 as the wipers of the switch advance step-by-step over these contacts. During this particular cycle of operation of the code send switch 1950, only the wipers 1951, 1952, and 1955 will be effective.

Referring now to the controller 400 (FIGS. 4 to 8, inclusive) it will be recalled that the first numerical send relay R820 is operated as soon as a digit is registered in the fourth digit register 1120. Also, the remaining numerical send relays R830, R840, and R850 are sequentially operated if each digit is registered respectively in the fifth, sixth, and seventh digit registers 1120, 1130, and 1140. At the respective contacts 822, 833, 842, and 852, these relays will apply ground potential to the conductors 805SD, 806SE, 807SF, and 808SG extending to FIG. 19 thereby to apply ground potential to predetermined contacts accessible to the wiper 1951 on the code send switch 1950. Thus, if a digit has not been registered in the fourth register 1110, the pulse relay R2050 cannot continue to pulse. Consequently, the call recorder 2000 will withhold transmission of information in code form to the toll ticket repeater X2300 until a digit has been registered in the fourth digit register 1110. This withholding action to prevent operation of the pulse relay R2050 will also be effective for each of the remaining digits to be registered in the fifth, sixth, and seventh digit registers 1120, 1130, and 1140.

In FIG. 19, it will be seen that as soon as the conductor 805SD is grounded in the manner noted above, the wiper 1951 in engagement with the contacts 26 will complete a circuit including the contacts 2132 and 2051 for again operating the pulse relay R2050. As a result of the foregoing, the wipers of the code send switch 1950 will be advanced into engagement with the contacts 1 in the associated contact banks in the same manner as has been described previously. As soon as these wipers leave the contacts 26 and engage the contact 1, the off-normal contacts 1959A are again closed but no circuit is completed at this time due to the fact that the last wiper switching relay R2130 in the previously described circuit chain has been operated. The circuit for continuing the operation of the pulse relay R2050 is controlled by the ground potential on the conductor 805SD as the wipers of the code send switch 1950 are stepped over the contacts 1 to 4, inclusive. It will be apparent from the above description that as the wipers engage the contacts 5 to 8, 9 to 12, and 13 to 16 during the stepping action of the code send switch 1950, the continuous operation of the pulse relay R2050 will be governed by the ground potential applied respectively to the conductors 806SE, 807SF, and 808SG as previously described.

During the third rotary stepping cycle of the code send switch 1950, the wiper 1955 will cooperate with the WXYZ24, WXYZ25, WXYZ26, and WXYZ27 code marking conductors extending to the fourth, fifth, sixth, and seventh digit registers 1110, 1120, 1130, and 1140 to transmit the digits registered therein in code form over the previously described circuit including the conductor 271T to the connected toll ticket repeater X2300.

In view of the foregoing, it will be understood that the various items of information stored in the fourth, fifth, sixth and seventh digit registers 1110, 1120, 1130, and 1140 will be transmitted to the associated toll ticket repeater X2300 as the wiper 1955 advances over its associated bank contacts in the following manner:

| Contact position | Code marking | Information transmitted |
|---|---|---|
| 1 | W24 | Called number fourth digit (first called office code digit or first numerical digit). |
| 2 | X24 | |
| 3 | Y24 | |
| 4 | Z24 | |
| 5 | W25 | Called number fifth digit (second called office code digit or second numerical digit). |
| 6 | X25 | |
| 7 | Y25 | |
| 8 | Z25 | |
| 9 | W26 | Called number sixth digit (third called office code digit or third numerical digit). |
| 10 | X26 | |
| 11 | Y26 | |
| 12 | Z26 | |
| 13 | W27 | Called number seventh digit (first numerical or fourth numerical digit). |
| 14 | X27 | |
| 15 | Y27 | |
| 16 | X27 | |
| 17 | ---------- | Sixth digit called number, if grounded, and seventh digit number if not brounded. |
| 18 | ---------- | Not used. |
| 19 | ---------- | |
| 20 | ---------- | |
| 21 | ---------- | |
| 22 | ---------- | |
| 23 | ---------- | |
| 24 | ---------- | |
| 25 | ---------- | |
| 26 | ---------- | |

In the subsequent description, it will be seen that the contacts 1 to 16, inclusive, are utilized during the third stepping cycle of the code send switch 1950 to transmit the items of information marked on the WXYZ24 to WXYZ27 code marking conductors by the registers 1110, 1120, 1130, and 1140 and that during a fourth stepping cycle of the code send switch 1950, the items of information marked in code form on the WXYZ28 to WXYZ31 code marking conductors by the eighth, ninth, tenth, and eleventh digit registers 1310, 1320, 1330, and 1340 will be transmitted to the selected toll ticket repeater. This is controlled in the present system by applying the marking ground potential through the particular registers 1110 to 1140, inclusive, during the third stepping cycle of the code send switch 1950 and then subsequently applying the marking ground potentials to these conductors through the wipers of the registers 1310 to 1340, inclusive. Of course, if the national toll facilities are not required in an exchange, the digit register 1200 (FIGS. 12 and 13) including the relays and separate registers therein need not be provided. In the latter case, the marking ground potential will be directly applied to the wipers of the registers 1120 to 1140.

Referring now to FIG. 11, it will be seen that the wipers 1114 and 1115 of the fourth digit register 1110 may be directly connected to ground potential, as noted above, by connecting the dotted strap A and disconnecting the strap B. The same facilities are provided for the wipers 1124—1125, 1134—1135, and 1144—1145 of the fifth, sixth, and seventh digit registers 1120, 1130, and 1140. However, the present system is arranged so that ground potential will be applied to these wipers at selected times, first during the third stepping cycle of the code send switch 1950 and will be applied to the wipers of the different registers in the digit register 1200 during the fourth stepping cycle of the code send switch 1950. This is accomplished by means of the contacts on the relays R1230 and R1240 provided in the digit register 1200. Thus, ground potential at the contacts 1233, 1243, 1235, 1245, 1237, 1247, 1239, and 1249 is connected to the conductors 1101CW4 to 1108BW7 in order to apply ground potential by way of the B straps to the different wipers of the registers 1110 to 1140, inclusive. Thus, the position of the wipers in these registers will extend the ground potential to the different code marking conductors WXYZ24 to WXYZ27 in the cable 1101 extending to FIG. 14 so that the wipers 1955 in stepping over the contacts in the associated contact banks will control the mark relay R2140 in the previously described manner. The digits registered in the fourth, fifth, sixth, and seventh digit registers 1110 to 1140, inclusive, will be transmitted in code form to the toll ticket repeater X2300 and registered therein.

As soon as the wiper 1955 engages the contact 17, it will complete the operating circuit for the mark relay R2140 if the 6 PULL relay R2020 has been operated to close its contacts 2024. As previously noted, the 6 PULL relay R2020 is operated if the called subscriber is a six digit number but it will not be operated if the called subscriber number is a seven digit number or is a national toll code number.

In view of the foregoing, it will be understood that the mark relay will transmit a direct ground pulse over the conductor 271T if the call is a six digit number and it will transmit a resistance ground pulse if the call is a seven digit number. The indication as to the number of digits in the called number will consequently be registered in the connected toll ticket repeater X2300.

As noted above, the wiper 1955 in engagement with the contact 17 determines whether or not the six digit indication should be transmitted to the connected toll ticket repeater X2300. At this time, the wiper 1952 is also in engagement with the contact 17 and applies the ground potential at the contacts 2133 to the conductor 866CG2 extending to FIG. 8. In FIG. 8, this conductor is connected by way of the contacts 853 (if the fourth digit has been registered by the calling subscriber to operate relay R850) to the conductor 864CR9 extending to FIG. 14 to permit the sender 1400 to transmit the digit that is registered in the seventh digit register 1140. Thus, the wiper 1402 on the send sequence switch 1420 in the sender 1400, when engaging the contact 13 in the associated contact bank will only encounter a ground potential on the conductor 864CR9 if a digit has been registered in the seventh digit register 1140. The sender can now transmit the last digit of a seven digit called subscriber number.

In passing, it may be well to note at this time that the conductors 861CR6, 862CR7, and 863CR8 terminating in the contacts 10, 11, and 12 accessible to the wiper 1402 of the send sequence switch 1420 will be grounded to permit the sender 1400 to send the corresponding digit only in the event that the respective digits are registered in the call register 900. The sender 1400 will now control the send sequence switch 1420 to advance its wipers into engagement with the contacts 14 in the associated contact banks. Consequently, the wiper 1403 will apply ground potential to the conductor 1441Y extending to FIG. 16, then, by way of the contacts 1661, conductor 1601CR31 extending to FIG. 20, contacts 2012 to contact 18 accessible to the wiper 1951 and in multiple therewith by way of the contacts 1923 to contacts 17 accessible to the wiper 1951. Inasmuch as the wiper 1951 is in engagement with the contacts 17 at this particular moment, the operating ground potential will again be extended to the pulse relay R2050. Thus, the pulse relay R2050 will control the magnet M1957 to advance the wipers of the code send switch 1950 into engagement with the contact 18. In this position, ground potential will again be encountered by the wiper 1951 to cause the pulse relay R2050 to advance the wipers an additional step into engagement with the contact 19.

The wiper 1952 in engagement with the contact 19 in the associated contact bank now extends the ground potential at the contacts 2133 to complete the operating circuit for national test relay R1930. The operations which now occur will depend on whether or not the call being handled by the director is a national toll call in which ten or eleven digits have been dialed by the calling subscriber.

As soon as the relay R1930 operates, as noted above, it closes its contacts 1934 in order to lock the relay R1930 in its operated position if ground potential is encountered by the conductor 1201LHL extending to FIG. 12. This conductor is only grounded in the event that a national toll code has been dialed by the calling subscriber. At the present moment, it will be assumed that no ground potential is applied to the conductor 1201LHL because no national toll code has been dialed. As a further result of the operation of relay R1930, at its contacts 1935, it completes an obvious operating circuit for the relay R1920, and, at its contacts 1932 and 1933, it disconnects the conductor 701CR22 which extends to the winding of the director release relay R680 (FIG. 6) from the contact 20 to the contact 18 accessible to the wiper 1952.

As soon as the relay R1920 operates, it closes its contacts 1925 to extend the ground potential on the conductor 1601CR31 by way of a circuit including the contacts 2012 and 1925 to the contact 19 engaged by the wiper 1951, contacts 2132 and 2051 to the winding of the pulse relay R2050. This will control the pulse relay in order to advance the wipers of the code send switch 1950 an additional step into engagement with the contact 20 in the associattd contact banks. When this occurs, the wiper 1952 will disengage itself from the associated contact 19 and thus interrupt the circuit of the national test relay R1930. This relay will immediately restore to normal and open the circuit of the relay R1920 which also restores to normal. As a further result of the restoration of the relay R1930 it disconnects the conductor 701CR22 from the bank contact 18 accessible to the wiper 1952, at its contacts 1933 and, at its contacts 1932, it connects the conductor 701CR22 to the contact 20 accessible to the wiper 1952. This completes a circuit from ground at contact 2133 by way of the wiper 1952, engaged contact 20, contacts 1932, conductor 701CR22 extending to FIG. 9, conductor 701CR22 extending to FIG. 7 and the winding of the director release relay R680 to battery. The latter relay now operates and, at its contacts 687, locks itself to a circuit including ground potential at contacts 649 on the operated seizure relay R640 in the controller 400 portion of the director. The operation of relay R680 will initiate the release of the director in the manner to be described hereinafter as a result of the dialing of a seven digit number by the calling subscriber.

It is convenient at this time to discuss the operation of the call recorder 2000 when it has been controlled by a selected translate relay to indicate that the call being handled is of the six digit variety instead of the seven called number. Under these conditions, the relay R2020 is in its operated position. Normally, the relay R2020, at the contacts 2022, applies ground potential to the conductor 865CG1 extending to FIG. 8. If a sixth digit of a subscriber number is then registered, the ground potential will be further extended by way of the contacts 843 on the operated third numerical send relay R840 and conductor 863CR8 extending to FIG. 14 to apply ground potential to the twelfth contact in the bank accessible to the wiper 1402 on the send sequence switch 1420. In other words, the sender 1400 will be controlled to continue the sending operation when it reaches a point in the transmission of digits corresponding to the third numerical digit. If this digit is registered, then the above-mentioned circuit will be completed so that the sender 1400 can transmit the next digit. If, however, the 6 PULL relay R2020 is operated indicating that the particular call in question is to a station having a six digit directory number, the contact 2023 will connect the conductor 865CG1 to the contacts 17 accessible to the wiper 1952 on the code send switch 1950.

At its contacts 2021, the contacts 13 to 16, inclusive, accessible to the wiper 1951, are connected by way of the contacts 1921, conductor 808SG and contacts 2021 to the skip SK26 conductor extending to FIG. 14. In FIG. 14, the skip SK26 conductor terminates in contacts 12 accessible to the wiper 1403 on the send sequence switch 1420. Finally, at the contacts 2024, the relay R2020 applies ground potential to the contacts 17 accessible to the wiper 1955 so that the code send switch 1950 during the third stepping cycle of operaton will transmit the sixth digit indication to the connected toll ticket repeater X2300.

In the above description it was noted that the skip conductor SK26 terminated in contact 12 accessible to the wiper 1403 on the sender sequence switch 1420. This position is reached by the above-noted switch when it is in a position to start impulse transmission corresponding to the sixth digit dialed by the calling subscriber which is registered in the sixth digit register 1130. Also, the call recorder 2000, by means of its code send switch 1950, will not be able to transmit the information corresponding to the sixth digit during its third stepping cycle unless ground potential is applied to the conductor 807SF.

If it is assumed that the subscriber has dialed the sixth digit and it has been registered in the sixth digit register 1130, the third numerical send relay R840 will be in its operated position. If it is also assumed that the send sequence switch 1420 has transmitted the information corresponding to the fifth digit, the wipers 1401 to 1407 of the switch will then advance into engagement with the contacts 12 in the associated contact bank. In other words, after the fifth digit has been sent by the director, the wiper 1403 of the send sequence switch 1420 will apply ground potential to the skip conductor SK26 extending to FIG. 19 and then by way of the contacts 2021 and 1921 to contacts 13 to 16, inclusive, accessible to the wiper 1951. Inasmuch as the third numerical send relay R840 is operated, it applies ground potential, at its contacts 842, to the conductor 807SF extending to FIG. 19. This will ground the contacts 9 to 12, inclusive, accessible to the wiper 1951 so that the pulse relay R2050 will be operated in the manner previously described. In other words, the grounding of the conductor 807SF will cause the pulse relay R2050 to advance the wipers of the code send switch 1950 over the contacts 9 to 12, inclusive, to transmit, in code form, the sixth digit marked on the WXYZ26 code marking conductors. Therefore, the call recorder 2000 will transmit the sixth digit of a called subscriber number to store the same in the toll ticket repeater X2300 before the sender 1400 is controlled to transmit switch controlling impulses to the switching apparatus in accordance with the sixth digit.

As soon as the wiper 1951 engages the contacts 13, it will encounter the grounded skip conductor SK26 which will now control the pulse relay R2050 as the wipers of the code send switch are advanced over the contacts 13 to 16, inclusive. Since it is assumed that no seventh digit has been dialed by the calling subscriber, the wiper 1955 of the code send switch 1950 will not encounter any marking potentials on the WXYZ27 code marking conductors. This fact will be indicated to the connected toll ticket repeater X2300 by the transmission of resistance ground pulses over the conductor 271T.

When the wiper 1952 engages the contacts 17, ground at contacts 2033 is extended by way of the contacts 2023, conductor 865CG1 extending to FIG. 8, contacts 843 on the operated third numerical send relay R840, conductor 863CR8 extending to FIG. 14 where it terminates in the contacts 12 accessible to the wiper 1402 on the send sequence switch 1420. At this time, the wiper 1402 is in engagement with the above-mentioned contact so that the sender 1400 is controlled to now transmit the sixth digit registered in the sixth digit register 1130 in the manner previously described.

As soon as the sender 1400 has transmitted the sixth digit, it will immediately advance the wipers of the send sequence switch 1420 an additional step into engagement with the contacts 13 in the associated contact banks thereby to attempt in a normal manner to transmit a seventh digit registered in the seventh digit register 1140. However, since the present call is assumed to be a sixth digit instead of a seven digit call, the control relay R1860TC in the coder 1800 portion of the director is operated. Therefore, when the wiper 1403 of the send sequence switch 1420 engages contact 13, ground potential is applied by way of the skip conductor SK27 extending to FIG. 18, contacts 2 on the operated control relay R1860TC, conductor 1203SKC extending to FIG. 16 to operate the skip relay R1680. This relay, as previously described, will automatically control the magnet M1421 so that the send sequence switch 1420 will advance its wipers an additional step into engagement with the contacts 14. In this position, the wiper 1402 applies ground potential by way of the conductor 1441Y extending to FIG. 16, contacts 1661, conductor 1601CR31 extending to FIG. 20, contacts 2012 and 1923, contacts 17 engaged by the wiper 1951, contacts 2132 and 2051 and the winding of the pulse relay R2050 to battery. The pulse relay R2050 will now advance the wipers of the code send switch 1950 an additional step into engagement with the contacts 18 and in doing so will have transmitted the sixth digit called number indication over the conductor 271T to the connected toll ticket repeater X2300.

As soon as the wiper 1951 engages the contact 18, it again encounters the grounded conductor 1601CR31 to cause the pulse relay R2050 to control the code send switch 1950 to advance its wipers into an additional step into engagement with the contacts 19. At this time, the wiper 1952 completes the operating circuit for the national test relay R1930. The latter relay performs the same functions, as previously described, inasmuch as the subscriber has not dialed a national toll code whereupon the relay R1920 will operate and connect the grounded conductor 1601CR31 by way of the contacts 1925 to the bank contact 19 engaged by the wiper 1951. This will cause the wipers of the code send switch 1950 to advance an additional step into engagement with the contacts 20 to restore both the relays R1930 and R1920 in the order named and to extend the ground potential on the wiper 1952 by way of the contacts 1932 and conductor 701CR22 extending to FIGS. 9 and 7. This will cause the operation of the director release relay R680, as previously described.

From the foregoing description, it will be apparent that when a sixth digit instead of a seventh digit directory number is dialed by a calling subscriber, the call recorder 2000 will transfer the items of information in code form to the connected toll ticket repeater X2300 in the same manner as has been previously described. The principal difference in operation occurs, however, when the sender 1400 and its associated send sequence switch 1420 are in a position to start the transmission of the fifth dialed digit. Also, the fact that a six digit number has been dialed is recorded in the call recorder 2000 by the operated condition of the 6 PULL relay R2020. This will alter the control of the code send switch 1950 so that it will complete the transmission of all six digits dialed by the called subscriber, it will then skip the seventh register which would normally register a seventh dialed digit and it then transmits an indication to the connected toll ticket repeater X2300 to indicate that the particular call in question is to a subscriber having a six digit number instead of a seven digit number. Thereafter, the call recorder 2000 will control the national test relays R1930 and R1920, in the order named, to make the usual test to see whether or not a national toll code has been dialed. Obviously, in the case of a six digit called subscriber number no national toll code will be dialed, but nevertheless these relays R1930 and R1920 must perform their operating cycle to control the advancement of the wipers of the code send switch 1950 to the twentieth bank contact accessible to the wiper 1952 and thereby send the necessary signal to the controller 400 portion of the director to cause it to release in a normal manner.

In the above discussion of the operation of the call recorder 2000, a description was first given of its operation when a seven digit number was dialed and registered in the call register 900 and an additional description was given regarding its operation as the result of the dialing and registration of a six digit number in the call register 900. The operation of the call recorder 2000 when a national toll call is registered, will now be described. All of the operations of the call recorder 2000 and the code send switch 1950 are exactly the same as has been previously described in that the wiper 1953 will be effective during the first stepping cycle, the wiper 1954 will be effective during the second stepping cycle and the wiper 1955 will be effective during the third stepping cycle of the code send switch 1950. All other operations are the same as though a seven digit number has been dialed.

When the wipers of the send switch during the third stepping cycle engage the contact 17 in the associated contact banks, the ground potential at the contacts 2133 will be extended by way of the wiper 1952, conductor 866CG2 extending to FIG. 8, contacts 853 on the operated fourth numerical send relay R850, conductor 864CR9 extending to FIG. 14 and terminating in the contact 13 accessible to the wiper 1402. The send sequence switch 1420 in this position will cause the sender 1400 to transmit the seventh digit registered in the register 1140 in the usual manner described hereinbefore whereupon the wipers 1401 to 1407, inclusive, will then be stepped into engagement with the contacts 14. In position 14, the wiper 1402 of the send sequence switch 1420 will not encounter ground potential on the conductor 1442CG3 until the latter conductor is subsequently grounded by the wiper 1952 on the code send switch 1950. Accordingly, the sender 1400 is now prevented from transmitting any of the digits registered in the registers 1310 to 1340, inclusive (FIG. 13) of the digit register 1200. This delay in the sending operation of the sender 1400 to transmit the last four possible digits of a national toll call is retained until after the call recorder 2000 has transmitted these digits to the connected toll ticket repeater X2300 for recording purposes.

The wiper 1403 of the send sequence switch 1420 in engagement with the contacts 14 extends ground potential by way of the conductor 1441Y, contacts 1661, conductor 1601CR31 extending to FIG. 20, contacts 2012 on the operated AB toll relay R2010, contacts 1923, bank contacts 17 engaged by wiper 1951 in order to complete the previously described circuit for operating the pulse relay R2050. The relay R2050 in turn will cause the code send switch 1950 to advance its wipers into engagement with the contacts 18 in the maner previously described. In this position, the wiper 1951 will again encounter the ground potential, conductor 1601CR31 and will, accordingly, reoperate the pulse relay R2050 so that the wipers of the code send switch 1950 will automatically advance into engagement with the contacts 19.

As soon as the wiper 1952 engages contact 19, the previously described circuit is completed for operating the national test relay R1930. In the present example, it is assumed that the national toll code has been dialed by the calling subscriber and, consequently, the relay R1930 upon operating will lock itself over a circuit including its contacts 1934, conductor 1201LHL extending to FIG. 12 to ground at contacts 1226. As a further result of the operation of relay R1930, at its contacts 1932, it disconnects the director release control conductor 701CR22 from the contact 20 accessible to the wiper 1952. Also, at its contacts 1935, an obvious circuit is completed for operating the relay R1920. At the contacts 1926, the relay R1920 applies ground potential to the conductor 1205LHC extending to FIG. 12 and then by way of the contacts 1228 and the windings of the relay R1230 and R1240 in series to battery. These relays now operate to disconnect ground potential from the various conductors 1101CW4 to 1108BW7 extending to the wipers of the registers 1110 to 1140, inclusive, in the call register 900. The digits registered on these registers have both been transmitted by the sender 1400 portion of the director to a next switching point that has been established through the operation of the automatic switching apparatus provided in the present exchange and these digits have also been transmitted by the code send switch 1950 to the toll ticket repeater X2300 included in the connection and stored therein for recording purposes. The relays R1230 and R1240 also apply ground potential to the various wipers of the eight, ninth, tenth, and eleventh digit registers 1310 to 1340, inclusive.

Referring now to the digit register 1200 (FIGS. 12 and 13) it will be noted that at the contacts 1232 and 1242, the relays R1230 and R1240 will apply ground potential to the wipers 1314 and 1315 of the eighth digit register 1310. These wipers will be positioned in accordance with the digit dialed into the eighth digit register 1310 so that the marking conductors WXYZ28 will be marked in code form in accordance with the registered digit. The remaining contacts 1234, 1236, 1238, 1244, 1246, and 1248 on the relays R1230 and R1240 apply ground potential to the corresponding wipers of the ninth, tenth, and eleventh digit registers 1320, 1330, and 1340 so that the associated marking conductors WXYZ29, WXYZ30, and WXYZ31 are also marked in code form in accordance with the respective digits registered in these registers. The WXYZ28 to WXYZ31 code marking conductors extend to FIG. 14 where they terminate respectively in the contacts 14 to 17, inclusive, accessible to the wipers 1404 to 1407, inclusive, on the send sequence switch 1420. Thus, the digits registered in the digit register 1200 are now marked in code form in the bank contacts accessible to the wiper of the send sequence switch 1420.

The above-mentioned WXYZ28 to WXYZ31 code marking conductors are also multiply connected to the bank contacts accessible to the wiper 1955 on the code send switch 1950. Thus, the code marking conductors WXYZ24 to WXYZ27, inclusive, and WXYZ28 to WXYZ31, inclusive, terminate respectively on the same bank contacts 1 to 16, inclusive, accessible to the wiper 1955 on the code send switch 1950. As pointed out previously, however, only one set of the above-mentioned conductors will be effective at any particular time.

As a further result of the operation of relay R1920, at its contacts 1925, it connects the circuit including the grounded conductor 1601CR31 by way of the contacts 1925, bank contact 19 engaged by the wiper 1951 in order again to control the pulse relay R2050. As a result thereof, the wipers of the code send switch 1950 are advanced from engagement with the contacts 19 into engagement with the contacts 20.

In the previous description it was noted that when a call was not a national toll call, the wiper 1952, in leaving the contact 19, interrupted the circuit of the relay R1930. This relay restored to normal so that when the wiper 1952 engaged the contact 20, ground potential was extended by way of the contacts 1932 to the director release conductor 701CR22. However, on a national toll call the relay R1930 remains in its operated position over the previously-traced locking circuit, including the conductor 1201LHL, after the wiper 1952 leaves the contact 19. Consequently, bank contact 20 is ineffective when the wiper 1952 is in engagement therewith. The wipers 1951 to 1955, inclusive, of the code send switch 1950 will remain in engagement with the contact 20 until ground potential is applied to the conductor 1206LHS multiply connected to the bank contacts 20 to 25, inclusive, accessible to the wiper 1951.

In order to understand the operation whereby ground potential is applied to the conductor 1206LHS by the digit register 1200, it will be recalled that the receive sequence switch 1010 in engagement with the contacts 8, 9, 10, and 11, will successively transmit the dialed impulses to the magnets of the eighth, ninth, tenth, and eleventh digit registers 1310, 1320, 1330, and 1340 over the respective conductors 1062 to 1065, inclusive. Under certain conditions only ten instead of eleven digits may be dialed by the calling subscriber because the called subscriber directory number on the national toll code includes the three digits identifying the national code zone, followed by the called office code comprising two letters and a digit and then followed by the four numerical digits of the subscriber line number in the particular called exchange. This makes a total of ten instead of eleven digits.

In some exchanges, however, still in use, the eleventh or fifth numerical digit of a called subscriber directory number must be utilized to determine the particular ringing signal that is to be utilized to signal the particular called subscriber substation. Accordingly, it will be understood that when the wipers 1013 to 1017, inclusive, of the receive sequence switch 1010 are in engagement with the contacts 10 in the associated contact banks, the tenth dialed digit will be transmitted to the tenth digit register 1320 by way of the wiper 1014. As soon as this transmission is completed, the wipers of the receive sequence switch 1010 will be advanced into engagement with the contact 11 so that the eleventh dialed digit may be received and registered in the eleventh digit register 1340. At the same time, ground potential on the conductor 871LGR connected to the wiper 1015 is now extended over the conductor 1071LHE to FIG. 12 and then by way of the contacts 1227 in order to operate the relay R1250 in the digit register 1200. This relay will operate and immediately lock itself by way of its contacts 1252 to the conductor 605CR29 which is grounded at the contacts 642' on the seizure relay R640 (FIG. 6). Also, at the contacts 1251, the relay R1250 connects the grounded conductor 605CR29 to the conductor 1204SAL in multiple with the contacts 1212. The multiple circuits are provided to apply ground potential on the conductor 1204SAL extending to FIG. 18 in order to retain the operated ones of the particular party station relays R1870, etc., in their operated positions. If an eleventh digit is dialed and, consequently, registered in the eleventh digit register 1340, the wipers of the receive sequence switch 1010 will be advanced from engagement with the contacts 11 into engagement with the contact 1.

In position 1, the wiper 1017 of the receive sequence switch 1010 will again complete a circuit including the wipers 1037 and 1028 (a national toll code having been previously registered), conductor 1069LHA extending to FIG. 12 in order again to operate the long haul relay R1210. This relay, at its contacts 1211, will now open the circuit including the conductors 1202SK and 1203SKC so that the sender will not automatically skip the transmission of the eleventh digit registered in the eleventh digit register 1340. If the relay R1210 is not operated to indicate the fact that the send sequence switch 1010 has not received the impulses corresponding to the eleventh digit of a number, the sender 1400 will automatically skip the eleventh digit register 1340.

As soon as the relay B1250 in the digit register 1200 operates, it also completes, at its contacts 1253, a circuit including the contacts 1241 and 1231 for applying ground potential by way of the conductor 1206LHS extending to FIG. 19 to the contacts 20 to 25, inclusive, accessible to the wiper 1951 on the code send switch 1950. Ground potential on this conductor will automatically control the pulse relay R2050 in the manner previously explained so that the magnet M1957 will automatically advance its wipers step-by-step over the contacts 20 to 25, inclusive, and into engagement with the contacts 26 without performing any additional controls in the call recorder 2000. However, as soon as the wiper 1951 engages the contact 26, it will also encounter ground potential that has been previously applied to the conductor 805SD and control the pulse relay R2050 in the usual manner. Now the wipers of the code send switch 1950 will automatically advance into engagement with the contacts 1. It should be noted that the off-normal contacts 1959A and 1959B will open and close in the manner previously explained but at this stage in the cyclic stepping of the wipers of the code send switch 1950, they perform no controls. The code send switch 1950 is now in condition to start the fourth stepping cycle of its operation thereby to transmit impulses in code form corresponding to the digits that have been marked on the WXYZ28 to WXYZ31 code marking conductors by the eighth, ninth, tenth, and eleventh digit registers 1310 to 1340, inclusive.

The ground potential for controlling the pulsing action of the pulse relay R2050 so that the wipers of the code send switch 1950 are advanced step-by-step over the contacts 1 to 16, inclusive, is controlled from the corresponding contacts accessible to the wiper 1951. Thus, the conductors 805SD, 806SE, and 807SF which were previously grounded by operation of the relays R820, R830, and R840 in the controller 400 portion of the director will maintain the pusing relay R2050 operated as the wiper is advanced over the contacts 1 to 12, inclusive. As soon as the wiper 1951 engages the contacts 13, 14, 15, and 16, the circuit for controlling the relay R2050 is again completed if the conductor SK26 is grounded by the wiper 1403 on the send sequence switch 1420 (FIG. 14). At the present time, the wipers 1401 to 1407, inclusive, of the send sequence switch 1420 are in engagement with the contacts 14 to delay the sending by the sender 1400 of switch controlling impulses corresponding to the digits registered in the eighth, ninth, tenth, and eleventh digit registers 1310 to 1340, inclusive. Therefore, at the present moment the conductor SK26 is not grounded. As a further result of the wipers of the send sequence switch 1950 engaging the contacts 13, the wiper 1952 thereof will apply ground potential at the contacts 2133 to a circuit including the contacts 1931 and the conductor 1442CG3 extending to FIG. 14. In FIG. 14 the conductor 1442CG3 terminates in the bank contacts 14 to 17, inclusive, accessible to the wiper 1402. Since the wiper 1402 is in engagement with the contacts 14, the pulsing controls of the sender 1400 are reinitiated so that it will transmit in numerical form the pulses corresponding to the digit registered in the eighth digit register 1310 and marked in code form on the WXYZ28 code marking conductors accessible to the wipers 1404 to 1407, inclusive.

As soon as the impulses corresponding to the digit registered in the eighth digit register 1310 have been sent by the sender 1400 over the selected switching paths to the next switching center, the wipers 1401 to 1407, inclusive, of the send sequence switch 1420 will be automatically controlled to advance an additional step into engagement with the contacts 15. Ground potential is still retained on the conductor 1442CG3 so that the sender 1400 will transmit switch controlling impulses in accordance with the ninth digit registered in the digit register 1320 and marked in code form on the WXYZ29 code marking conductors terminating in the contacts 15 accessible to the wipers 1404 to 1407, inclusive. When this digit is transmitted, the send sequence switch 1420 will again be controlled to advance its wipers into engagement with the contacts 16 in the associated contact banks. In this position, the sender 1400 will now transmit numerical impulses in the manner previously explained corresponding to the digit that is registered in the tenth digit register 1330 and marked in code form on the WXYZ30 code marking conductors terminating in the contacts 16 accessible to the wipers 1404 to 1407, inclusive.

As soon as the foregoing operation is performed by the sender 1400, the send sequence switch is again controlled to advance its wipers an additional step into engagement with the contacts 17 in the associated contact banks. At this time a test is made to determine whether or not the conductors WXYZ31 individual to the eleventh digit register 1340 must be skipped because no digit has been registered in this particular register or whether or not the digit is registered therein and must be transmitted. For this purpose the wiper 1403 in engaging the contact 17 in the associated contact bank applies ground potential to the conductor 1202SK extending to FIG. 12 to the contacts 1211 in the digit register 1200.

As previously pointed out, the long haul relay R1210 will be operated if a digit has been transmitted to and registered in the eleventh digit register 1340 but this relay will be in its restored position if the eleventh digit has not been dialed by the called subscriber. In the latter case, the ground potential on the conductor 1202SK is further extended by the contacts 1211, conductor 1203SKC extending to FIG. 16 in order to operate the skip relay R1680 in the sender 1400. This relay, as previously noted, at its contacts 1681 will interrupt the circuit including the wiper 1402 so that the ground potential applied to the conductor 1442CG3 can not cause the sender 1400 to start an additional impulsing cycle. Also, the ground potential applied to the conductor 1203SKC will be extended by way of the contacts 1682 and 1422 to operate and restore the magnet M1421 whereby the wipers of the send sequence switch 1420 will advance an additional step into engagement with the contacts 18 in the associated contact banks. The advancement of the wiper 1403 from contact 17 will remove ground potential from the conductor 1202SK and thereby cause the restoration of the skip relay R1680. As a result of the advancement of the wiper 1403 into engagement with the contacts 18, the ground potential is now applied to the skip conductor SK26 extending to FIG. 19, then by way of the contacts 1922 to the bank contacts 13 to 16, inclusive, accessible to the wiper 1951 on the code send switch 1950. This conditions the call recorder 2000 so that it can advance the wipers of the code send switch 1950 over the contacts 13 to 16, inclusive, in the manner previously described.

As the wiper 1955 passes over the contacts 13 to 16, inclusive, code markings on the WXYZ31 code marking conductors will be extended to the mark relay R2140 in the usual manner. Thus, the contacts 2141 in conjunction with the contacts 2052 on the pulse relay R2050 will transmit direct ground or resistance ground pulses over the conductor 271T in the manner previously described. In other words, the eleventh digit registered in the eleventh digit register 1340 and marked on the code marking conductors WXYZ31 will be transferred to the connected toll ticket repeater X2300 and stored therein for recording purposes.

After the wipers 1951 to 1955, inclusive, of the code send switch 1950 are advanced step-by-step over the contacts 13 to 16, inclusive, during the fourth stepping cycle, the wipers will then engage the contacts 17 in the associated contact banks. In this position, the wiper 1952 will again apply ground potential to the conductors 865CG1 and 866CG2 extending to FIG. 8 in the same manner that occurred during the third stepping cycle. At the present time, this control performs no function in the send sequence switch 1420 associated with the sender 1400. When the wiper 1951 engages the contacts 17 during the fourth stepping cycle, the ground potential applied to the skip conductor SK26 by way of the contacts 1924 will control the pulse relay R2050 so that the code send switch 1950 will advance its wipers into engagement with the contacts 18.

Figure 7:
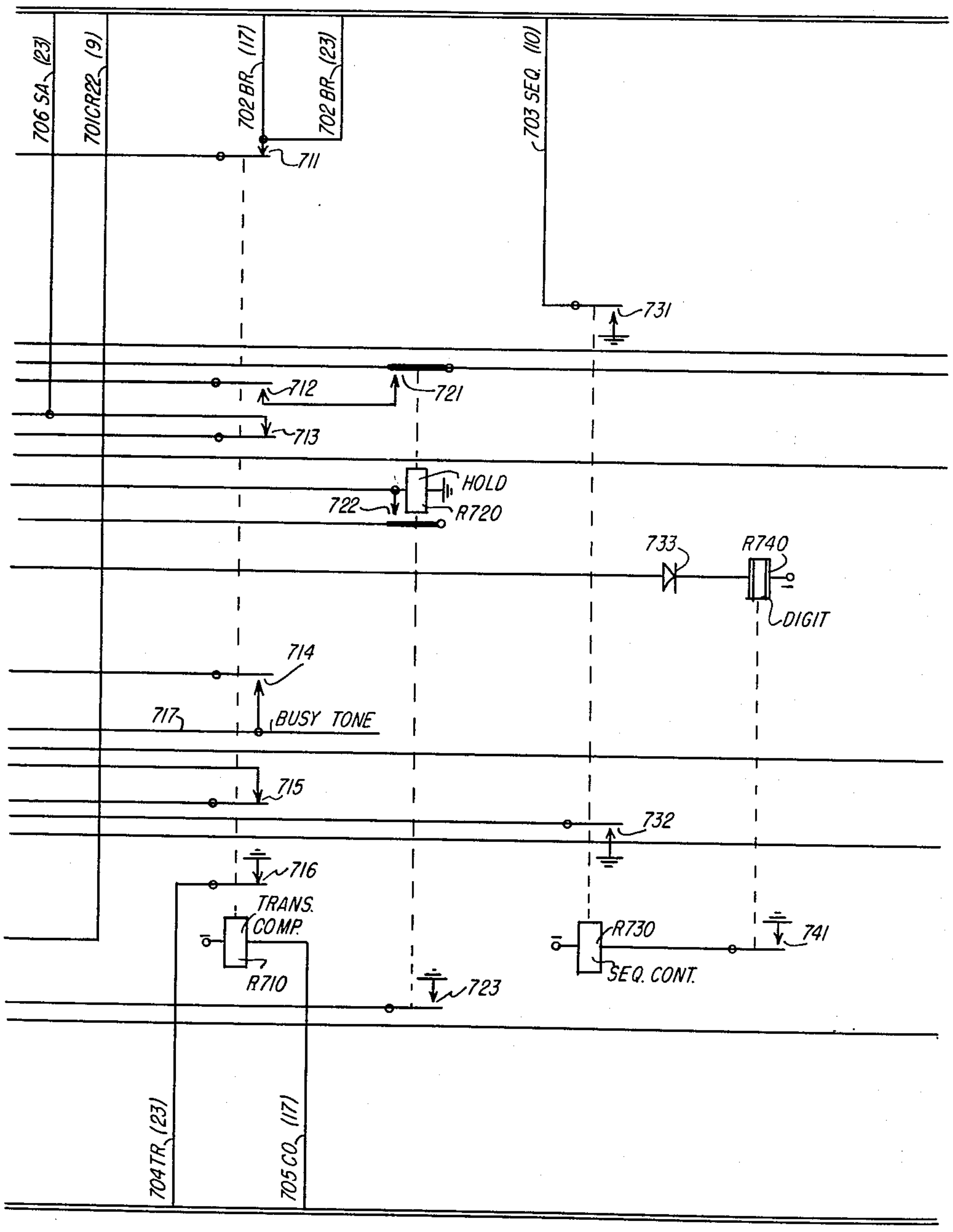

When the wiper 1952 of the code send switch 1950 engages the contacts 18, ground potential at the contacts 2133 is extended by way of the contacts 1933, conductor 701CR22 extending to FIG. 9 and to FIG. 7 in order to operate the director release relay R680 in the controller 400 portion of the director. This will initiate the release of the director in the manner to be described hereinafter. At the same time that the above-mentioned circuit is completed by way of the wiper 1952 in engagement with the contact 18, the wiper 1951 also engages its associated contact 18. However, ground potential will not be encountered by the wiper 1951 to control the pulse relay R2050. Accordingly, the wipers are brought to rest in engagement with the contact 18. In this connection, it should be noted that the contacts 1923 on the relay R1920 are open, the contacts 1925 are closed but this has no effect on the application of ground potential to the contact 18 accessible to the wiper 1951. Another circuit including the contacts 2012 and conductor 1601CR31 is also connected to the contact 18 accessible to the wiper 1951 but this conductor is not grounded at this time because the wiper 1403 of the send sequence switch 1420 is at the present time standing in engagement with the contact 18 in the associated contact banks. Until the director release relay R680 is operated and the seizure relay R640 is restored in the controller 400 portion of the director, the above-named wipers or both the code send switch 1950 and the send sequence switch 1420 will remain in engagement with the contacts 18 in the associated contact banks.

In view of the foregoing description of the operation of the call recorder 2000, it will be understood that during the third stepping cycle of the wipers of the code send switch 1950 a test is made through the wipers 1951 and 1952 to ascertain whether or not the digit register 1200 has been employed to handle a national toll call involving ten or eleven digits. If it is determined that ten or eleven digits of a national toll code have been dialed by the calling subscriber, the code send switch 1950 is controlled as described above to advance its wipers through a fourth stepping cycle.

In view of the foregoing, it will be understood that during the fourth stepping cycle of the code send switch 1950, the various items of information stored in the eighth, ninth, tenth, and eleventh digit registers 1310, 1320, 1330, and 1340 will be transmitted to the associated toll ticketing repeater X2300 as the wiper 1955 advances over its associated bank contacts in the following manner:

| Contact position | Code marking | Information transmitted |
|---|---|---|
| 1 | W28 | Called number eighth digit (second numerical). |
| 2 | X28 | |
| 3 | Y28 | |
| 4 | Z28 | |
| 5 | W29 | Called number ninth digit (third numerical). |
| 6 | X29 | |
| 7 | Y29 | |
| 8 | Z29 | |
| 9 | W30 | Called number tenth digit (fourth numerical). |
| 10 | X30 | |
| 11 | Y30 | |
| 12 | Z30 | |
| 13 | W31 | Called number eleventh digit (fifth numerical, if used). |
| 14 | X31 | |
| 15 | Y31 | |
| 16 | Z31 | |
| 17 to 26 | ---------- | Not used. |

It may be well to mention at this time that when the relay R680 in the controller 400 portion is operated in the manner described above, it will ultimately cause the seizure relay R640 to restore and thereby remove the holding ground potential from the conductor 605CR29 extending to the call recorder 2000. As a result thereof, the AB toll relay R2010 restores to normal and interrupts holding circuits for all other relays in the call recorder 2000 so that such relays will now release. The releasing circuit for the code send switch 1950 may be traced from the winding of the magnet M1957, self-interrupting contacts 1958, contacts 2014′ (closed when the relay R2010 restores to normal incident to the release of the call recorder 2000) and ground at the off-normal contacts 1959A. Thus, the self-interrupting circuit for the magnet M1957 is completed thereby the magnet intermittently operates and restores to advance its wipers 1951 to 1955, inclusive, step-by-step until the bank contact position 26 is reached. When this occurs, the off-normal contacts 1959A are opened to terminate further stepping of the wipers 1951 to 1955, inclusive, in engagement with the contacts 26 in the associated contact banks. The code send switch 1950 of the call recorder 2000 is now in the original starting position so that it can be used in a subsequent call involving the associated director.

*Release of the director*

Referring now to the director release relay R680 (FIG. 6) it will be recalled that this relay may be operated at various times during the control of the director. It will be recalled that the relay R680 was operated when the digits dialed by the calling subscriber indicated that the call was a local call and did not require the full use of the director. The relay R680 may be operated in the middle of a call because a translated routing was not required or because the calling subscriber abandoned the connection before it is completed. Also, the relay R680 may be operated to released the director from the connection after it has transmitted the necessary impulses to complete a connection to a six digit called subscriber number, a seven digit called subscriber number and a national toll call involving either ten or eleven digits.

Referring now to the director release relay R680, as soon as it is operated, it completes a locking circuit including the contacts 687 either to ground at the contacts 649 on the seizure relay R640 or to ground at contacts 673 on the release relay R670. At its contacts 682, the relay R680 completes a circuit for retaining the busy director relay R510 in its operated position so that the instant director is marked busy until the releasing operations thereof have been completed. At its contacts 686, the relay R680 interrupts a point in the impulsing circuit including the conductor 604CR19 so that the subsequent release of the call registrations 900 and 1200 will not be interfered with. At its contacts 681, the relay R680 connects the grounded conductor 603KOC to the conductor 275S extending to FIG. 2. The latter conductor terminates in the bank contacts of the director hunter 250 and the ground potential thereon will be extended by way of the wiper 260, conductor 308S, contacts 314' and 321' to energize the winding of the magnet M251. Thus, the stepping magnet of the director hunter 250 is energized so that upon the subsequent interruption of the above-traced circuit will cause the magnet to restore and automatically advance its wipers 253 to 260, inclusive, an additional step. This will cause the wipers to disconnect from the particular director that has been used in the present connection. As a further result of the operation of the relay R680, at its contacts 685, it applies direct ground potential to the grounded winding of the relay R720 thereby to cause the latter relay to slowly restore. It is the shunting action of the ground potential on the winding of the relay R720 that causes it to slowly restore to normal.

Referring again to the above-traced circuit for energizing the magnet M251 of the director hunter 250 (FIG. 2) it will be seen that as soon as the magnet operates, it opens its contacts 252 to interrupt the locking circuit for the director test relay R310 in the primary selector 300. The director test relay R310 now restores to normal and performs a switch-over operation whereby the calling subscriber line is disconnected from the director and connected to the established connection set up under control of the director through the primary selector 300 and subsequent switches in the switch train. In this manner, the director is disconnected from the primary selector 300.

Referring now to the director test relay R310, it will be seen that when this relay restores to normal, the contacts 311, 312, 314, 315, 317, 312', and 314' are opened and the contacts 313, 316, 318, and 313' are closed. Consequently, the conductors C244, C245, and C246 extending from the line finder 240 are disconnected from various conductors extending to the director by way of the director hunter 250 and are instead connected through the primary selector 300 to the subsequent switches in the switch train including the toll ticket repeater X2300 to the called destination. Thus, the connection between the calling and called subscriber is now established and the director is disconnected from the circuits including the primary selector 300.

As a further result of the restoration of the director test relay R310, it should be noted that at the contacts 314', it interrupts a point in the above-described circuit for operating the magnet M251. Consequently, the magnet M251 restores to normal to advance the wipers of the director hunter 250 an additional step. At this time, the director in use is disconnected from the circuit including the wipers of the director hunter 250. The above-described step-ahead action of the director hunter 250 as a result of the operation of the director release relay R680 in the controller 400 portion of the director will automatically prevent reselection of the same director by the line finder 240 and the primary selector 300. In other words, step-ahead action of the director hunter 250 will prevent the same line finder and primary selector 300 from being connected to a director that may be in faulty operating condition.

Consequently, if repeated attempts are made to originate a call, the step-ahead action of the director hunter 250 will prevent a defective director from being re-seized.

The hold relay R720 slowly restores to normal and, at its contacts 721, disconnects the grounded conductor 512SCG from the circuit for the call send relay R810 and from other circuits in the controller 400 portion of the director. Finally, at its contacts 722, the relay R720 disconnects ground potential from the conductor 273H extending to the bank contacts accessible to the wipers of the director hunter 250 (FIG. 2).

The advancement of the wipers of the director hunter 250, during the operation whereby the director is disconnected from the line finder 240 and the primary selector 300, interrupts the previously described circuit for the line relay R450 in the director controller 400. This relay is normally held in its operated position over the loop circuit including the calling subscriber line and is either released as a result of the above-described step-ahead action of the director hunter 450 or as the direct result of the abandonment of a call by the calling subscriber. In either event, the line relay R450 will restore to normal and interrupt at its contacts 451 the circuit for the hold relay R430 which also restores to normal. At the contacts 435, the restoration of the hold relay R430 opens the circuit for the seizure relay R640 which restores to normal to interrupt various locking circuits for certain of the relays in the director and to complete a circuit whereby the release relay R670 and the director release relay R680 are both held in their operated positions until the director has fully restored to normal. Consequently, various contacts on the seizure relay R640 will remove holding ground potentials from various locking conductors whereby the remaining operated relays and switches in the director will automatically restore to their normal positions.

More specifically, it will be seen that at the contacts 641, the relay R640 interrupts a point in one of the multiple circuits for holding the director busy relay R510 operated. This relay, however, will remain operated over circuits including ground potential controlled by contacts on the relays R670 and R680. Furthermore, at the contacts 642, the relay R640 removes ground potential from circuits for locking the relays R580 or R610 in their operated positions and for interrupting the circuit for the send call relay R810, the class control relay R650 and the fault seizure relay R660. Operated ones of the foregoing relays that have been locked to the ground potential at the contacts 642 will now restore to normal. At the contacts 643, the relay R640 opens the point in the locking circuit for the tone control relay R530 so that the latter relay can restore to normal if it is in its operated position. At the contacts 647, the relay R640 interrupts a point in the locking circuits for the operated ones of the relays R820, R830, R840, and R850, and, simultaneously therewith, it removes ground potential from the conductor 871LGR extending to FIG. 10.

As a further result of the restoration of the seizure relay R640, at its contacts 643', it disconnects the two second pulse conductor C656 from the previously described circuit for controlling the magnet M491 of the timer 490. At its contacts 648, the relay R640 completes a circuit including the ground potential at contacts 545, and the winding of the release relay R670 whereby the latter relay will operate and remain in its operated position until the timer 490 has restored to normal, the various registers in the call register 900, as well as the registers in the call register 1200 have all restored to their normal positions.

Finnaly, at its contacts 642', the relay R640 removes ground potential from the conductor 605CR29 extending respectively to the digit register 1200 of FIG. 12, to the sender 1400 of FIGS. 14 to 16, inclusive, and to the call recorder 2000 of FIGS. 19 to 21, inclusive. All relays in the above-mentioned portions of the director that are locked in their operated positions to the ground potential applied to the conductor 605CR29 will now restore to normal. It should be noted, however, that although no mention has been made of the circuit, including contacts 644, it should be understood that these contacts will open the circuit including the hold relay R720 to restore the latter relay when the call is abandoned by the calling subscriber at a time when the director is in its normal operating cycle.

In discussing the restoration of the seizure relay R640, it was pointed out that the contacts 648 completed a circuit for operating the relay R670 and that the latter relay remained in its operated position until all of the register switches restored to normal.

Starting with the contacts 545, a circuit is completed by way of the contacts 648, winding of the relay R670, off-normal contacts ON498, contacts 414 and 492 and the winding of the magnet M491 to battery. In this circuit, the relay R670 operates in series with the magnet M491 and the magnet interrupts its operating circuit at the contacts 492 so that the magnet is self-interruptedly operated to advance its wipers step-by-step in the clockwise direction until the wipers restore to the illustrated home contact positions. When this occurs, the off-normal contacts ON498 are opened to interrupt the self-interrupting circuit for the magnet M491 and the off-normal contacts ON497 are closed to transfer the above-mentioned circuit for the relay R670 to the conductor 419CR20 extending to FIG. 11. In FIG. 11, the conductor 419CR20 terminates in the wiper 1143 of the seventh digit register 1140. If this wiper is in an off-normal position, the above-described circuit, including the winding of the release relay R670 will be completed through the self-interrupting contacts 1142 and the winding of the magnet M1141 to battery. The magnet M1141 will be self-interruptedly operated to advance the wipers 1143 to 1145, inclusive, step-by-step in a counter-clockwise direction back to the illustrated home contact position. When the home contact position is reached, the circuit including the conductor 419CR20 is transferred by way of the wiper 1143 to the wiper 1133 and to the circuit including the winding of the magnet M1131 on the sixth digit register 1130. This magnet will accordingly be self-interruptedly operated until its wipers are restored to the illustrated home contact position and it will then transfer the restoring circuit to the wiper 1123 to control the self-interruptions of the magnet M1121 on the fifth digit register 1120. This magnet, in turn, will self-interruptedly operate and advance its wipers to the home contact position in order to transfer the restoring circuit to the magnet M1111 on the fourth digit register 1110. The wipers of the fourth digit register 1110 will be self-interruptedly restored to the illustrated home contact position under control of the magnet M1111 and when the home contact position is reached, the restoring circuit will be transferred to the conductor 1109 extending to FIG. 13.

In FIG. 13, the restoring circuit will sequentially control the self-interrupting action of the magnets on the respective eleventh digit register 1340, the tenth digit register 1330, the ninth digit register 1320 and the eighth digit register 1310 in the order named, so that the wipers of these switches are all restored to their illustrated home contact positions.

When the eighth contact register 1310 finally restores its wipers 1313 to 1315, inclusive, to the illustrated home contact positions, the restoring circuit, including the winding of the magnet M1311 and the winding of the release relay R670 is interrupted. All of the registers in the digit register 1200 (FIGS. 12 and 13) and all of the digit registers shown in FIG. 11 of the call register 900 and the timer 490 (FIG. 4) will be in their restored positions. The release relay R670 would normally restore at this time but a multiple circuit may now be traced which includes ground at contacts 545 and 648, winding of the relay R670, contacts 646, conductor 601CR21 extending to FIG. 10 and the wiper 1043 on the third digit register 1040 (FIG. 10). As a result thereof, the relay R670 may still be held in its operated condition over the last-mentioned circuit to battery potential by way of one of the magnets of the registers 1040, 1030, or 1020 or the magnet M1011 of the receive sequence switch 1010. The magnets of the above-noted registers will be self-interruptedly operated as long as the associated wipers are grounded and are in engagement with any contacts other than the illustrated home contact positions. Thus, the magnets of the above-mentioned registers and the receive sequence switch 1010 will be self-interruptedly operated in the same manner as has been described previously to restore the associated wipers to their illustrated home contact positions. As soon as the wiper 1013 of the receive sequence switch 1010 restores to its home contact position, the restoring circuit, including the conductor 601CR21, is transferred to the conductor 1061 extending to FIG. 14 where it terminates in the off-normal contacts 1424 on the send sequence switch 1420 (FIG. 14). The send sequence switch will normally have its wipers in engagement with the contacts 25 if the sender 1400 has been operated to complete the connection to the called destination. However, if the call is abandoned or released prior to the time that the wipers of the send sequence switch 1420 are in engagement with the contacts 25, they will automatically be restored to the illustrated home positions under control of the magnet M1421.

More specifically, when the restoring circuit is completed to the conductor 1061, it will further be extended by way of the off-normal contacts 1424, contacts 1422 and the winding of the magnet M1421 to battery on the send sequence switch 1420. The magnets M1421 and the release relay R670 will cooperate in the same manner as has been described hereinbefore whereby the magnet M1421 is self-interruptedly operated until its wipers restore to the illustrated home contact position and thereby cause the off-normal contacts 1424 to open the restoring circuit. As soon as the off-normal contacts 1424 are opened, the stepping circuit for the magnet M1421 is interrupted and the release relay R670 will restore to normal.

In view of the two multiple circuits for progressively releasing the wipers of the different rotary switches included in the various portions of the director, it will be apparent that the relay R670 will be held in its operated position until the last one of the two multiple circuits is interrupted. When this occurs, the release relay R670 will restore to normal and interrupt, at its contacts 673, a point in a locking circuit for the director release relay R680. At its contacts 672, the relay R670 now interrupts the circuit for the release lamp L688 which is extinguished to indicate to the exchange attendant that the rotary stepping switches included in the director have fully restored to normal.

Finally, at its contacts 671, the relay R670 opens a multiple point in the circuit for holding the director busy relay R510 in its operated position.

In the above description it was noted that the contacts 673 will interrupt the locking circuit for the director release relay R680. This relay will normally restore to normal when the locking circuit is interrupted. However, the relay R680 may still be held in its operated position over the conductor 701R22 extending to FIG. 9. This conductor will be grounded until the wiper 1403 is advanced from the contacts 25 during the restoring operation of the send sequence switch 1420. Also, the conductor 701CR22 will be grounded from the code send switch until the call recorder 2000 is fully restored to normal. Normally, however, the ground potential will be removed from the conductor 701CR22 before the release relay R670 has had sufficient time to restore to normal.

Referring now to the call recorder 2000, it will be understood that the AB toll relay R2010 is locked in its operated position over a circuit including the contact 2012' and the conductor 605CR29 which is grounded at the contacts 642' while the seizure relay R640 remains in its operated position. This relay, as previously noted, will remove the ground potential as soon as the director is disconnected by the director hunter 250 or until the director is abandoned by the calling subscriber. As soon as the ground potential is removed from the conductor 605CR29, the AB toll relay R2010 will restore to normal and remove, at its contacts 2011', the locking circuit for the start pulse relay R2030, the code send relay R2040, the detection complete relay R2060 and all other relays that are locked to this conductor will be restored to normal. As soon as the relay R2130 restores, it will remove ground potential at the contacts 2133 from the wiper 1952. If the latter wiper is in engagement with the contact 20, then ground potential will be removed from the conductor 701R22 to permit the director release relay R680 to restore to normal. As a result of the restoration of the AB toll relay R2010, at its contacts 2014', it completes a self-interrupting circuit for the magnet M1957 which includes the contacts 1958, 2014', and the off-normal contacts 1959A. Consequently, the magnet M1957 will be self-interruptedly operated to restore its wipers to the illustrated home contact positions whereat the off-normal contacts 1959A are opened to terminate further step of the wipers. The wipers of the code send switch 1950 will now be in the home contact position.

Referring to the director release relay R680 (FIG. 6) it will be seen that at the contacts 681, it disconnects the grounded conductor 603KOC from the conductor 275S extending to FIG. 2 so that another director hunter, such as 250, may now seize the director. Also, at the contacts 682, the relay R680 removes the last holding ground potential from the circuit of the directory busy relay R510 so that the latter relay can now restore to normal and remove the busy marking ground potential from the conductor 274G. Therefore, the director is now marked in the bank contacts on the director hunters, such as 250, having access thereto as an idle director which may be used in connection with another call.

In view of the foregoing description of the mode of operation of the releasing of the various portions of the director which has been utilized in the setting-up of the present connection, it should be understood that the director is now fully restored to its normal position and is available for use in a new call.

What is claimed is:

1. In a telephone system, a party line, a plurality of stations on said party line, a calling device at each of said stations, each calling device being selectively operable a number of times to transmit over said calling line during a single operation thereof both a variable number of switch controlling impulses corresponding to a selected digit of a telephone number, and a fixed number of station identifying impulses corresponding to a code identifying the individual calling station on said party line, whereby said calling devices at said stations transmit over said party line different station identifying codes during each operation thereof, digit register means for successively registering each of said switch controlling digits transmitted by a calling device, code register means for registering the impulses of the station identifying code transmitted during the operation of the calling device at a calling station, means controlled by the impulses of said switch controlling digits for operating said digit register means to successively register the said digits of a called number as they are transmitted by the calling device at a calling station, means normally controlled during the registration of a particular one of said digits for controlling said station identifying code register means in response to the receipt of said station identifying impulses to register the code identifying the said calling station, and means controlled in response to the registration of a predetermined number of digits of predetermined values in said digit register means for discarding the station identifying code registered in said code register means and for rendering said normally controlled means effective during the registration of another one of said digits of said called number to again control said station identifying code register means in response to the receipt of said station identifying impulses to register the code identifying said calling stations.

2. In a telephone system, a party line, a plurality of stations on said party line, a calling device at each of said stations, each calling device being selectively operable a number of times to transmit over said party line during a single operation thereof both a variable number of switch controlling impulses corresponding to a selected digit of a telephone number and a fixed number of station identifying impulses corresponding to a code identifying the individual calling station on said party line, whereby said calling devices at said stations transmit over said party line different station identifying codes during each operation thereof, digit register means for successively registering each of said switch controlling digits transmitted by a calling device, code register means for registering the impulses of the station identifying code transmitted during the operation of the calling device at a calling station, means controlled by the impulses of said switch controlling digits for operating said digit register means to successively register the said digits of a called number as they are transmitted by the calling device at a calling station, means controlled in response to the registration of the first of said digits for rendering said station identifying code register means effective to register the code identifying said calling station on said party line as the second of said digits is registered in said digit register means, means governed in accordance with the values of said digits registered in said first and said second digit registers for removing the registered code identifying said calling station from said code register means when certain digit values are registered, and means thereafter controlled in response to the registration of a subsequent digit of said called number in said digit register means for rendering said code register means again effective to register the code identifying said calling station as another digit as registered in said digit register means.

3. In a telephone system, a party line, a plurality of stations on said party line, a calling device at each of said stations, each calling device being selectively operable a number of times to transmit over said party line during a single operation thereof both a variable number of switch controlling impulses corresponding to a selected digit of a telephone number and a fixed number of station identifying impulses corresponding to a code identifying the individual calling station in said party line, whereby said calling devices at said stations transmit over said party line different station identifying codes during each operation thereof, digit register means for successively registering each of the said switch controlling digits of a called number transmitted by a calling device, code register means for registering the impulses of the station identifying code transmitted during the operation of the calling device at a calling station, means controlled by the impulses of said switch controlling digits for operating said digit register means to successively register said digits as they are transmitted by the calling device at a calling station, means normally controlled during the registration of one of said digits for controlling said station identifying code register means in response to the receipt of said station identifying impulses to register the code identifying said calling station, a sequence switch controlled in response to the registration of a first digit in said digit register for preparing said digit register to register a second digit and for conditioning said code register means so that it will register the code identifying said calling station as said second digit of said called number is registered in said digit register means, means jointly controlled by the registration of said first and said second digits in said digit register for either retaining or discarding said station identifying code registered in said code register means depending upon the values of said registered first and second digits, and means operated under control of said sequence switch in the event said last-mentioned means is controlled to discard said station identifying code registered in said code register means for again rendering said code register means effective to reregister the code identifying said calling station during the registration of still another digit of said called number in said digit register means.

4. In a telephone system, a party line, a plurality of stations on said party line, a calling device at each of said stations, each calling device being selectively operable a number of times in accordance with the digits of a called number to transmit over said party line during each single operation thereof both a variable number of switch controlling impulses corresponding to a selected digit of a telephone number and a fixed number of station identifying impulses corresponding to a code identifying the individual calling station on said party line, whereby said calling devices at said stations transmit over said party line different station identifying codes during each operation thereof, digit register means for registering each digit transmitted by a calling device at a calling station, a station register for registering the station identifying code transmitted during the operation of the calling device at a calling station, a called station identified by a plural digit exchange code and a plural digit line number, a remote toll zone identified by a plural digit toll code, means controlled by the transmission of impulses from the calling device at a calling station corresponding to such digits for operating said digit register means to successively register said digits as they are transmitted, means controlled during the registration of a second one of said digits for controlling said station register to register the identifying code of the calling station, means only controlled in response to the registration of the digits of said toll code in said digit register means for discarding the station identifying code of the calling station registered in said station register, and means controlled in response to the registration of one of the digits of a called exchange code, following the toll code, identifying a remote toll zone for reoperating said station register to again register the identifying code of the calling station.

5. In a telephone system, a party line, a plurality of stations on said party line, means at each station for transmitting over said party line variable numbers of switch controlling impulses corresponding to selected digits of a telephone number, digit register means for successively registering each of said switch controlling digits transmitted over said party line, means controlled by the switch controlling impulses transmitted over said party line by a calling station thereon for operating said digit register to successively register said digits as they are transmitted, station identity means at each station for transmitting over said party line a station identification code corresponding to the identity of the calling station, code register means for registering the identification code transmitted over said party line, means for normally operating said code register means to register the station identification code transmitted by said station control means of said calling station only during the transmission of a particular one of said switch controlling digits of the telephone number, means responsive to the registration of a predetermined number of digits of predetermined values in said digit register means for removing the registration of said station identification code from said code register means, and said station identity means again effective to control the reoperation of said code register means to reregister the calling station identification code during the transmission of the impulses of a subsequent one of said digits of the telephone number.

6. In an automatic nationwide distant dialing telephone system wherein each subscriber telephone line is assigned a directory telephone number having office code digits designating the telephone office terminating said subscriber line, wherein the telephone offices are arranged in area groups with each area group being assigned area code digits in accordance with the national geographic locations of the respective area groups, wherein a calling subscriber first dials the office code digits in calling a called subscriber line terminating in a telephone office located in the same area group as said calling line, and wherein a calling subscriber first dials the area code digits followed by the dialing of the office code digits in calling a distant called subscriber line terminating in a telephone office located in a different area group than that of said calling line, a predetermined number of digit registers for registering a predetermined number of the first dialed digits dialed by a calling subscriber in extending a call to a called subscriber line, a plurality of stations on each subscriber line and each station on said line having an identification code, station register means for registering the identification code of a calling station, control means responsive to a calling station on one of said lines first dialing the office code digits of a called line located in the same area group as said calling line for operating said predetermined number of digit registers to register the dialed office code digits of said called line and for operating said station register means to register the identification code of said calling station, said control means being effective in case said calling station first dials the area code digits of a called distant subscriber line located in a different area group from that of said calling line for operating said predetermined number of digit registers to register the area code digits of said distant called line and for operating said station register means to register the identification code of said calling station, canceling means for removing said calling station identification code registration from said station register means only in response to the registration of said area code digits in said predetermined digit registers, and said canceling means being ineffective to remove said station identification code registration from said station register means in case the digits of an office code are first registered on said predetermined digit registers.

7. In an automatic nationwide distant dialing telephone system wherein each subscriber telephone line is assigned a directory telephone number having office code digits designating the telephone office terminating said subscriber line, wherein the telephone offices are arranged in area groups with each area group being assigned area code digits in accordance with the national geographic locations of the respective area groups, wherein a calling subscriber first transmits the office code digits in calling a called subscriber line terminating in a telephone office located in the same area group as that of said calling line, and wherein a calling subscriber first transmits the area code digits followed by the office code digits in calling a distant called subscriber line terminating in a telephone office located in a different area group than that of said calling line, a plurality of stations on each subscriber line and each station on said line having an assigned identification code, calling station controlled means for transmitting over a calling one of said lines area digits, office digits, and the calling station identification code during the initiation of a call from a calling station on said calling line to a called subscriber line, station register means for registering the calling station identification code transmitted by said calling station controlled means of said calling station, and register controlled means for controlling the registration of said station identification code on said station register means in response to the receipt of the second dialed digit of the office code in case said calling station initiates a call to a called line located in the same area group as that of said calling line by transmitting only the office code digits, and for controlling the registration of said station identification code on said station register means after receipt of said area code digits and in response to the receipt of the following first dialed digit of the office code in case said calling station initiates a call to a distant called line located in a different area group than that of said calling station by first dialing said area code digits followed by the dialing of said office code digits.

References Cited in the file of this patent

UNITED STATES PATENTS

| | | |
|---|---|---|
| 2,586,704 | Ostline | Feb. 19, 1952 |
| 2,631,195 | Ostline | Mar. 10, 1953 |
| 2,848,543 | Breed | Aug. 10, 1958 |